US008683242B2

(12) United States Patent
Shye et al.

(10) Patent No.: US 8,683,242 B2
(45) Date of Patent: Mar. 25, 2014

(54) SYSTEM AND METHOD FOR LEVERAGING HUMAN PHYSIOLOGICAL TRAITS TO CONTROL MICROPROCESSOR FREQUENCY

(75) Inventors: Alex Shye, Evanston, IL (US); Yan Pan, Evanston, IL (US); Benjamin Scholbrock, Evanston, IL (US); J. Scott Miller, Chicago, IL (US); Gokhan Memik, Evanston, IL (US); Peter A. Dinda, Evanston, IL (US); Robert P. Dick, Chelsea, MI (US)

(73) Assignee: Northwestern University, Evanston, IL (US)

( * ) Notice: Subject to any disclaimer, the term of this patent is extended or adjusted under 35 U.S.C. 154(b) by 729 days.

(21) Appl. No.: 12/796,887

(22) Filed: Jun. 9, 2010

(65) Prior Publication Data
US 2010/0313048 A1 Dec. 9, 2010

Related U.S. Application Data

(60) Provisional application No. 61/185,372, filed on Jun. 9, 2009.

(51) Int. Cl.
G06F 1/32 (2006.01)
G06F 1/26 (2006.01)
G06F 1/08 (2006.01)

(52) U.S. Cl.
USPC ........... 713/320; 713/300; 713/310; 713/321; 713/322; 713/323; 713/324

(58) Field of Classification Search
None
See application file for complete search history.

(56) References Cited

U.S. PATENT DOCUMENTS

| 6,148,408 | A | 11/2000 | Shimoda | |
| 6,526,159 | B1 * | 2/2003 | Nickerson | 382/117 |
| 6,601,179 | B1 | 7/2003 | Jackson et al. | |
| 7,124,312 | B2 * | 10/2006 | Casebolt et al. | 713/323 |
| 7,379,560 | B2 * | 5/2008 | Bradski et al. | 382/103 |
| 2002/0178440 | A1 * | 11/2002 | Agnihotri et al. | 725/10 |
| 2005/0071698 | A1 | 3/2005 | Kangas | |
| 2005/0148887 | A1 * | 7/2005 | Reiter et al. | 600/508 |
| 2006/0192775 | A1 | 8/2006 | Nicholson et al. | |
| 2007/0033634 | A1 * | 2/2007 | Leurs et al. | 725/143 |
| 2007/0050650 | A1 | 3/2007 | Conroy et al. | |
| 2008/0301474 | A1 * | 12/2008 | Bussa et al. | 713/300 |
| 2008/0307240 | A1 | 12/2008 | Dahan et al. | |

OTHER PUBLICATIONS

Alex Shye et al., "Power to the People: Leveraging Human Physiological Traits to Control Microprocessor Frequency," Department of Electrical Engineering and Computer Science, Northwestern University, Evanston, IL, USA, Nov. 2008, entire document, pp. 1-10, sections 1-9, Retrieved from Internet: http://www.empathicsystems.org/Papers/micro08.pdf.
Notification of transmittal of the International Search Report and the Written Opinion of the International Searching Authority, or the Declaration in International Application No. PCT/US10/37896 dated Aug. 6, 2010.

* cited by examiner

*Primary Examiner* — Fahmida Rahman

(57) ABSTRACT

A system and method for leveraging physiological traits to control microprocessor frequency are disclosed. In some embodiments, the system and method may optimize, for example, a particular processor-based architecture based on, for example, end user satisfaction. In some embodiments, the system and method may determine, for example, whether their users are satisfied to provide higher efficiency, improved reliability, reduced power consumption, increased security, and a better user experience. The system and method may use, for example, biometric input devices to provide information about a user's physiological traits to a computer system. Biometric input devices may include, for example, one or more of the following: an eye tracker, a galvanic skin response sensor, and/or a force sensor.

20 Claims, 61 Drawing Sheets (a)

(b)

(c)

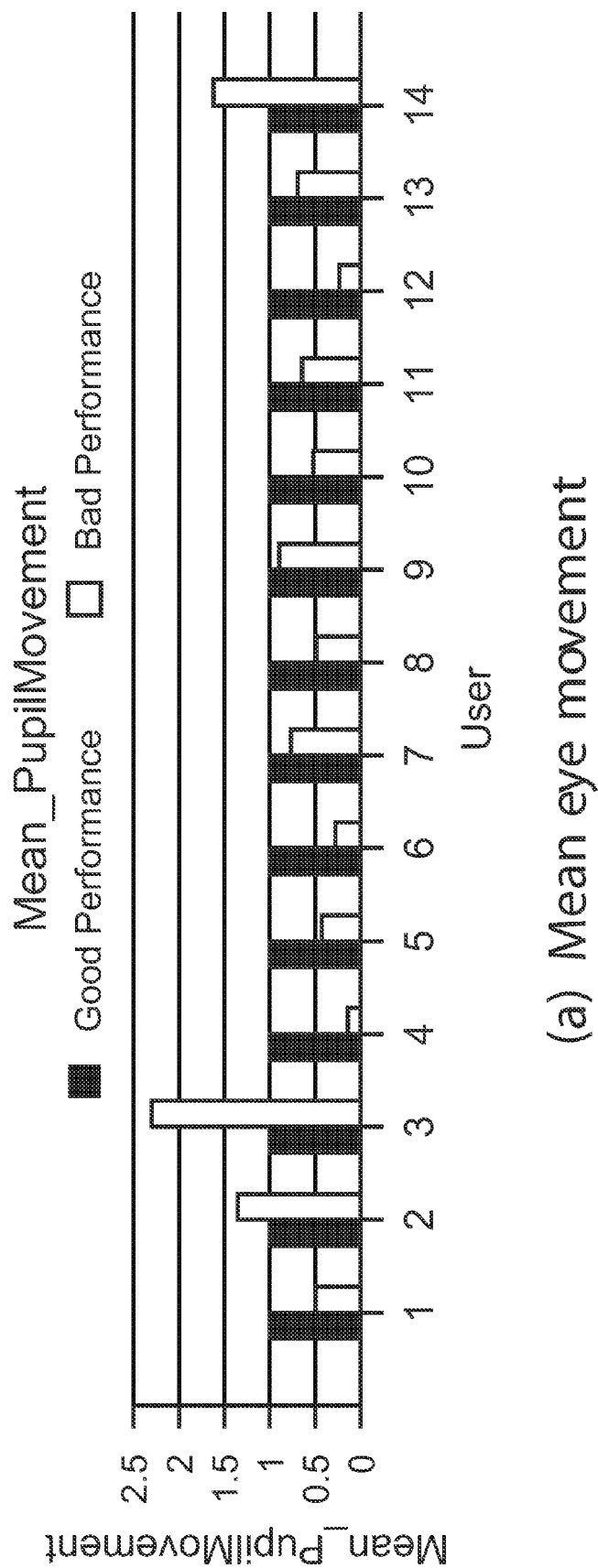
Figure 3a (a) Mean eye movement (b) Maximum force on the arrow keys.

(c) Maximum delta GSR.

(c) Max_MaxArrow

Figure 7. Frequency that aPTP and cPTP settle on for the Need for Speed, Tetris, and Word applications.

(a) Need for Speed (c) Microsoft Word.

(a) Need for Speed

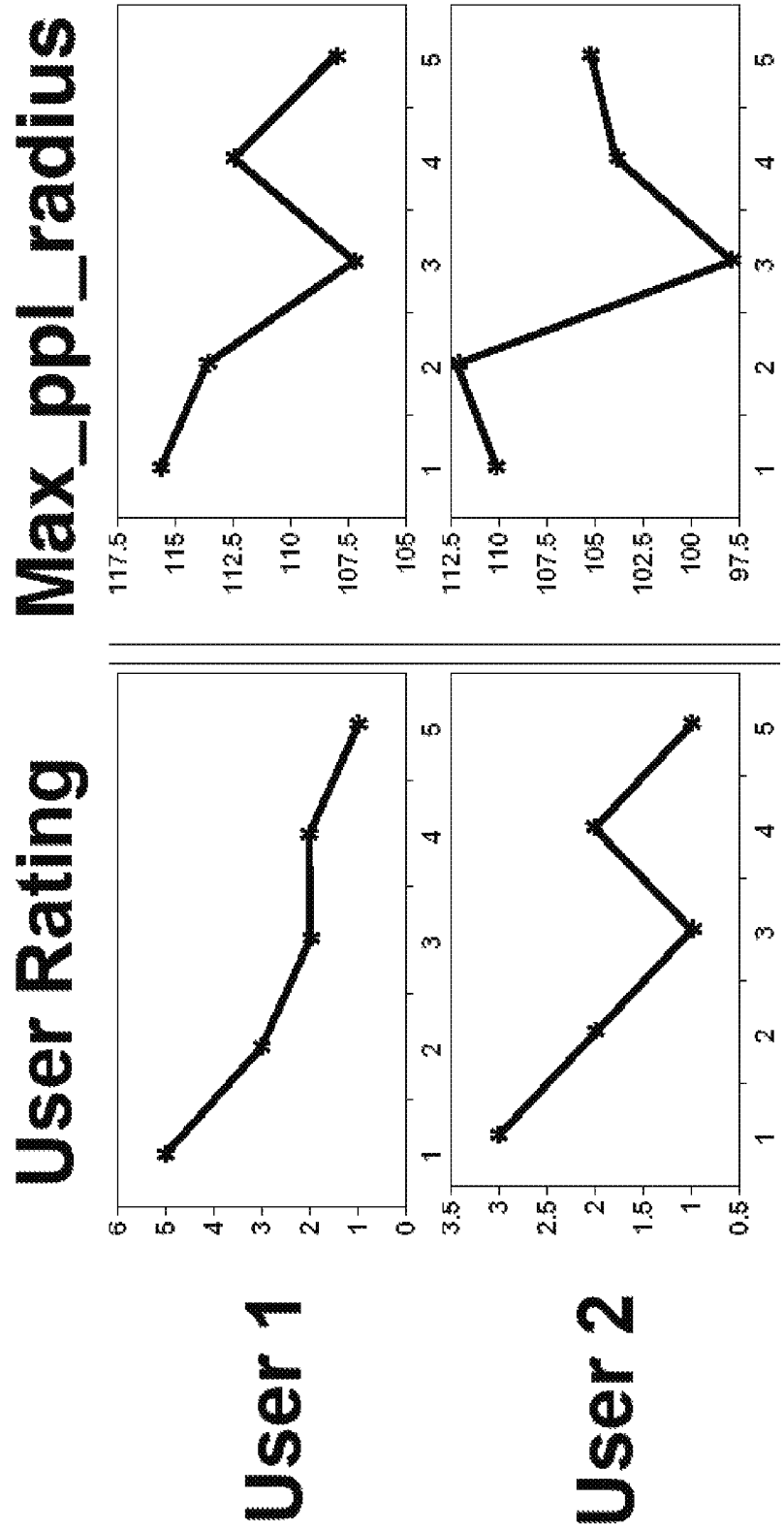
Figure 10-a1

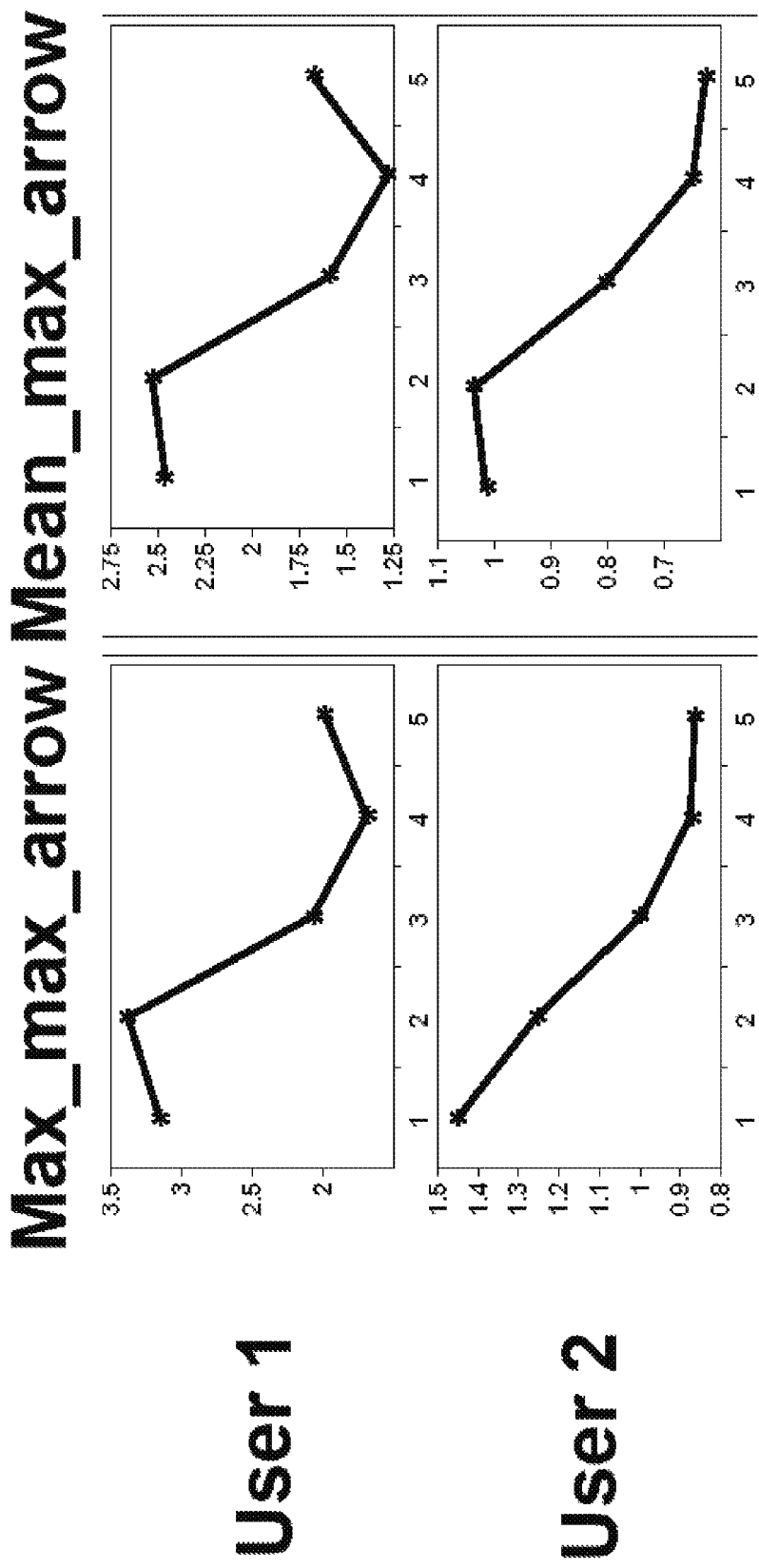
Figure 10-a2

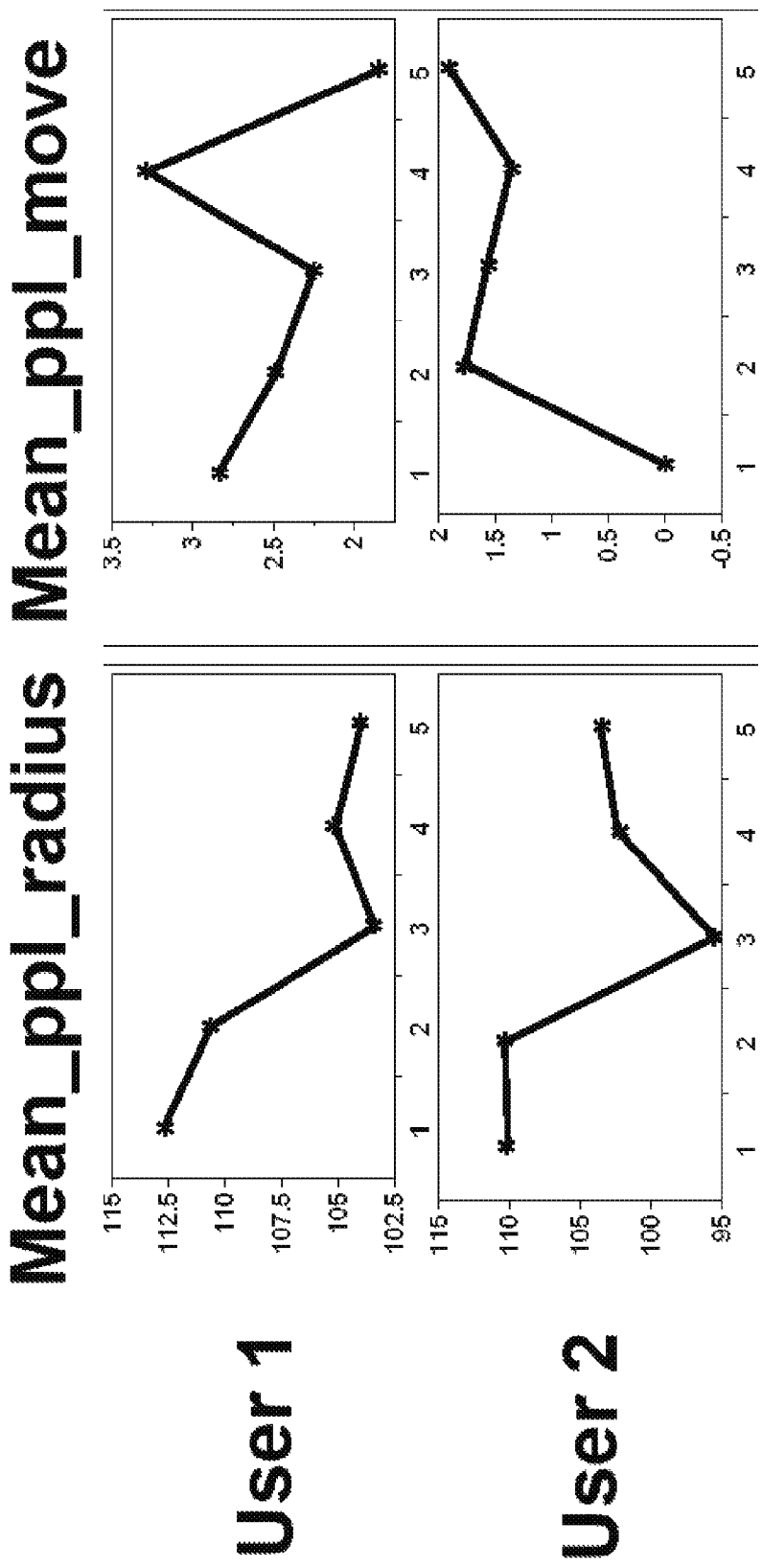
Figure 10-a3

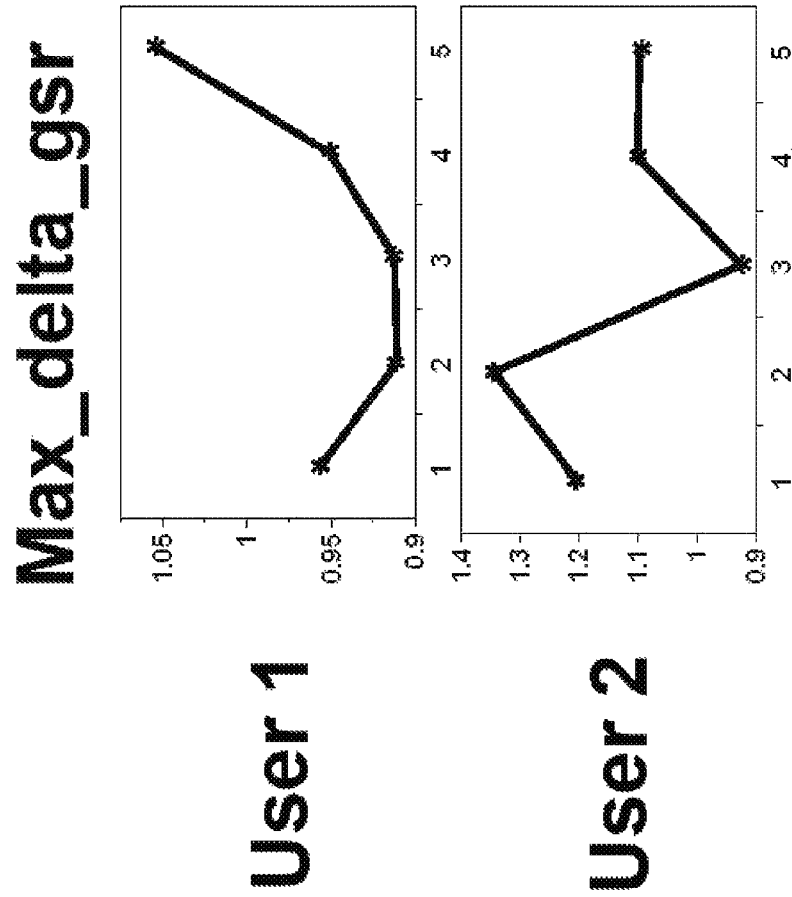
Figure 10-a4

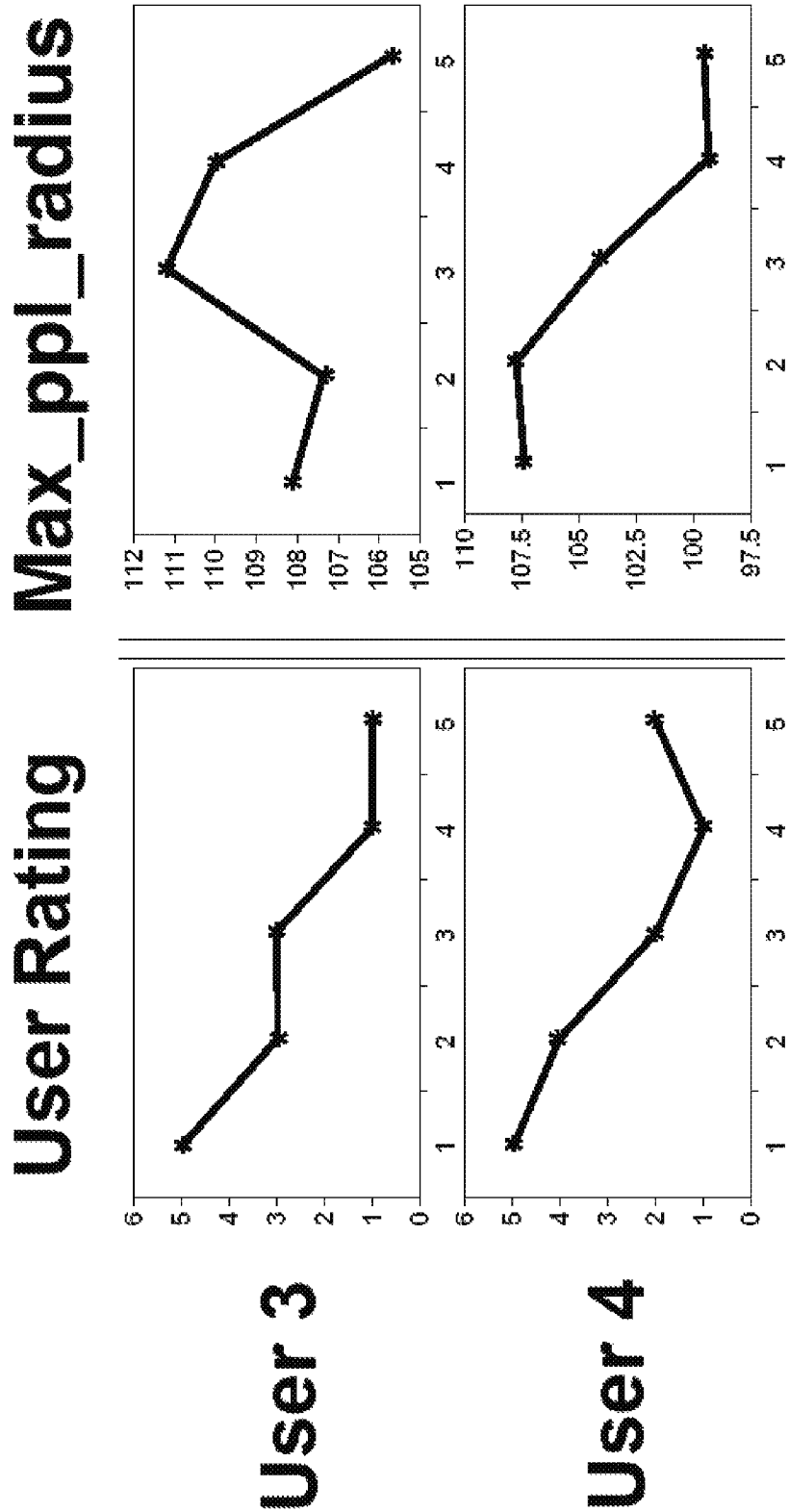
Figure 10-b1

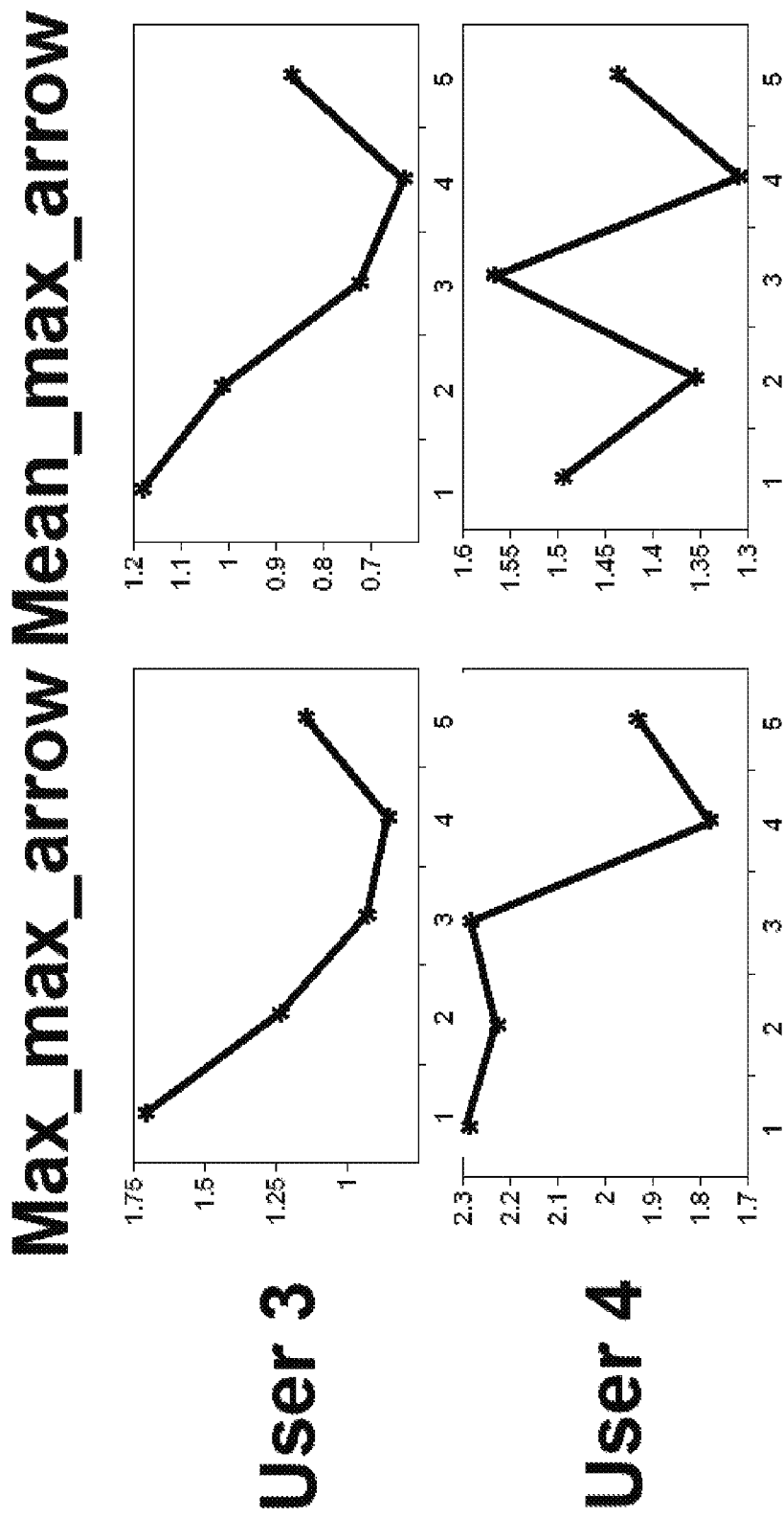
Figure 10-b2

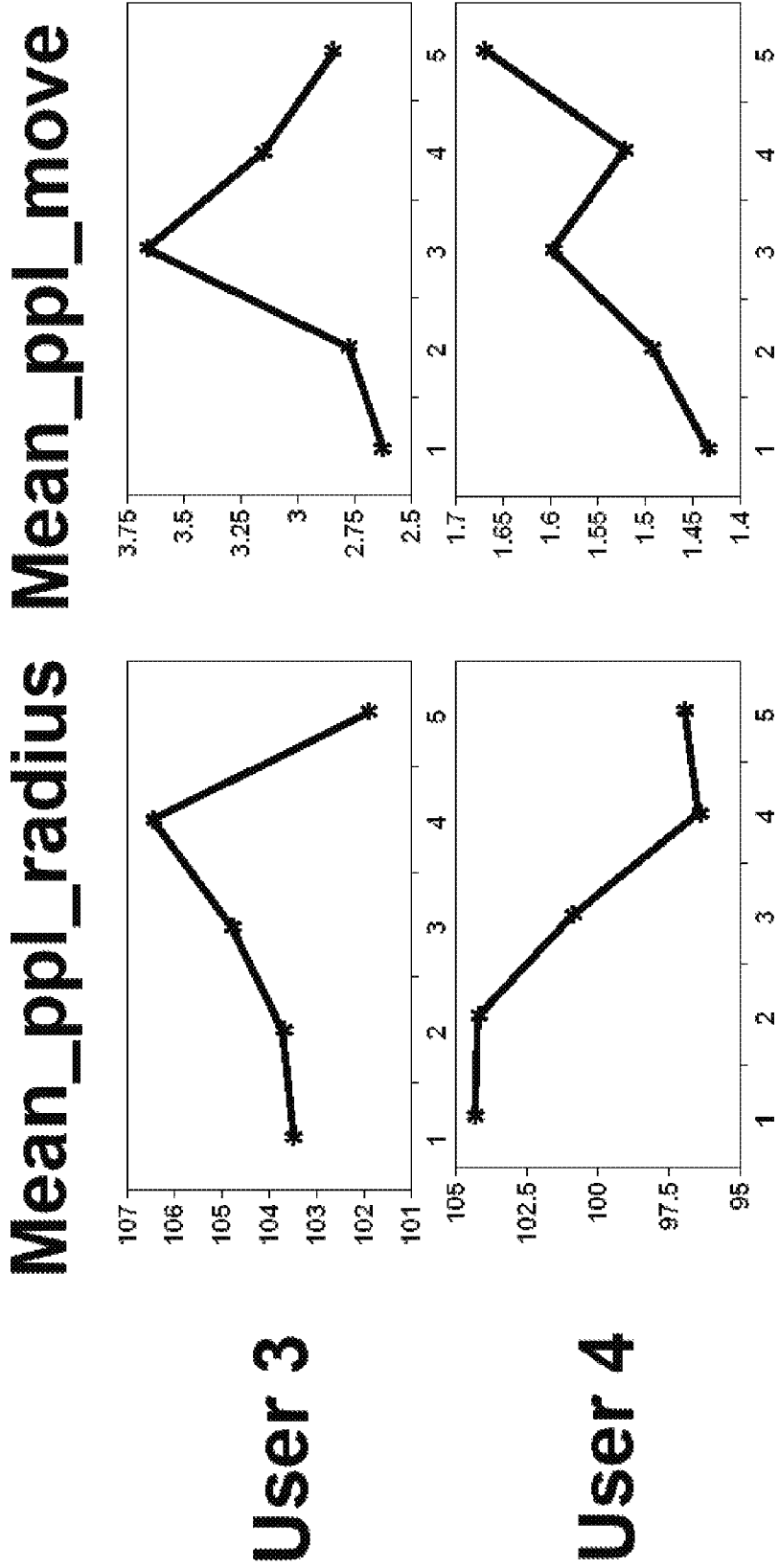
Figure 10-b3

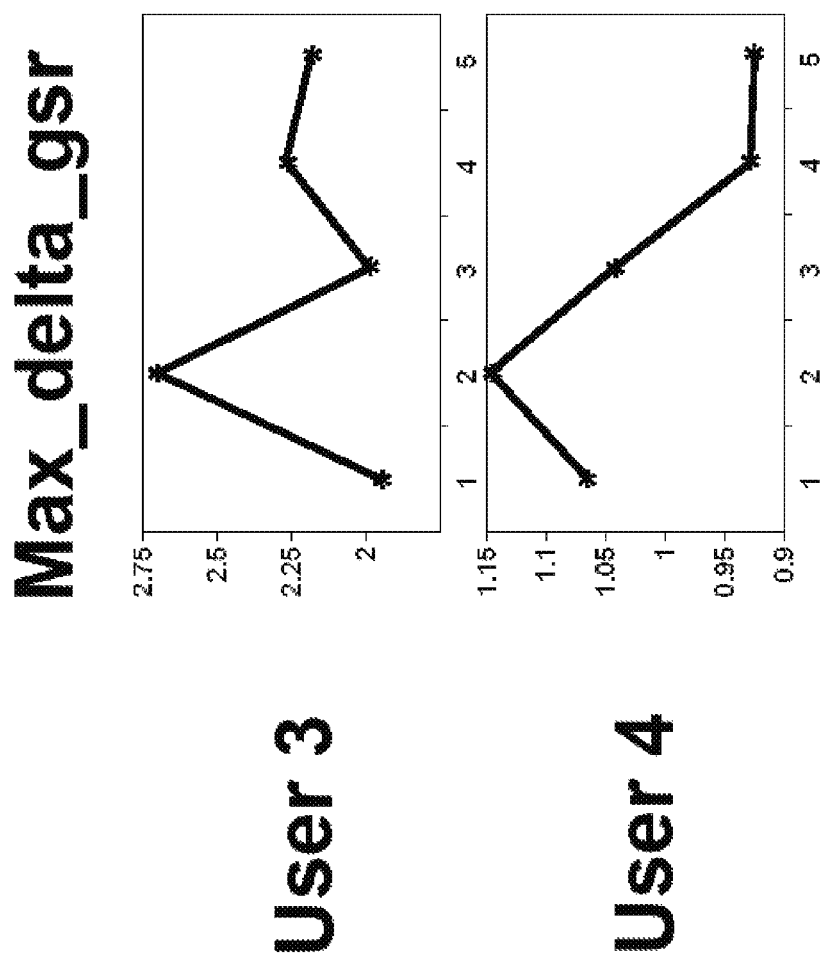
Figure 10-b4

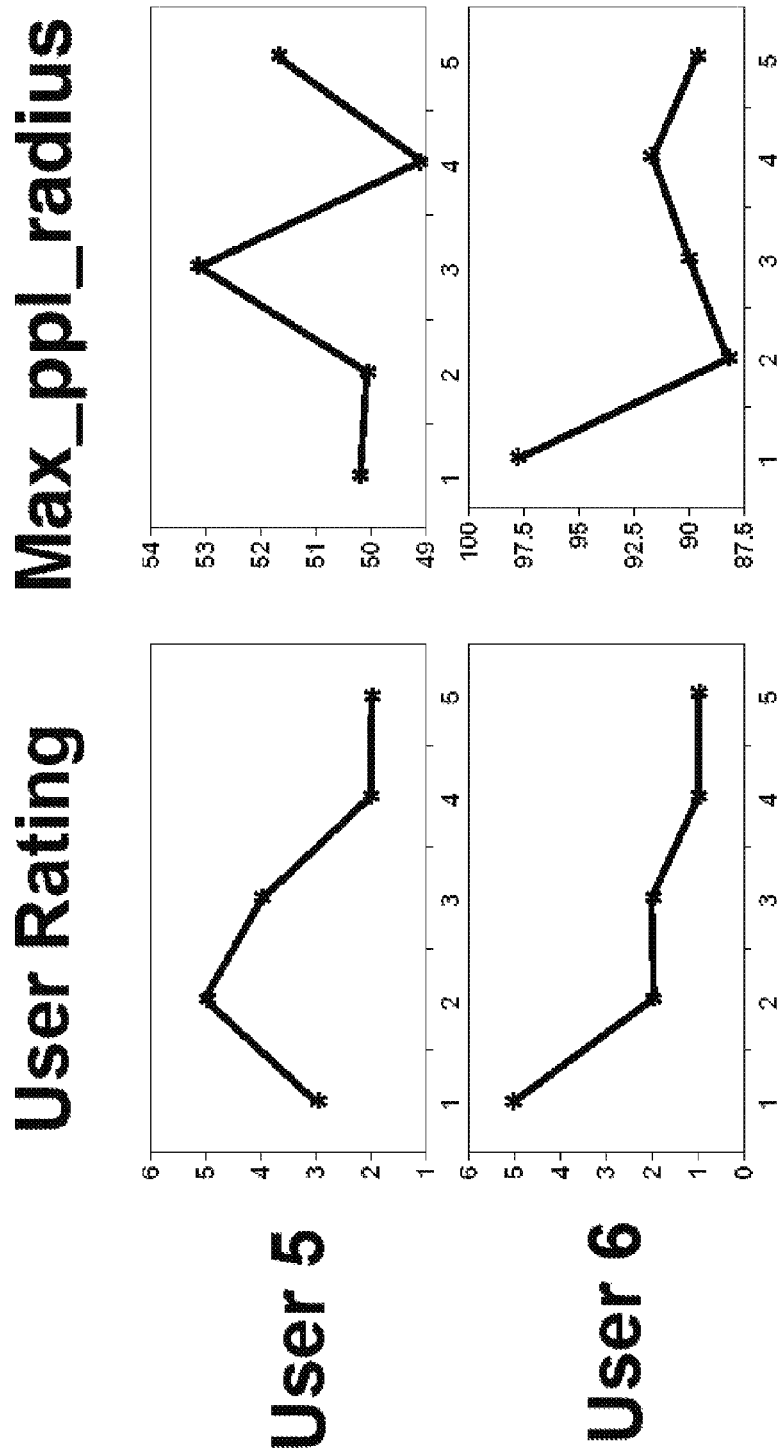
Figure 10-c1

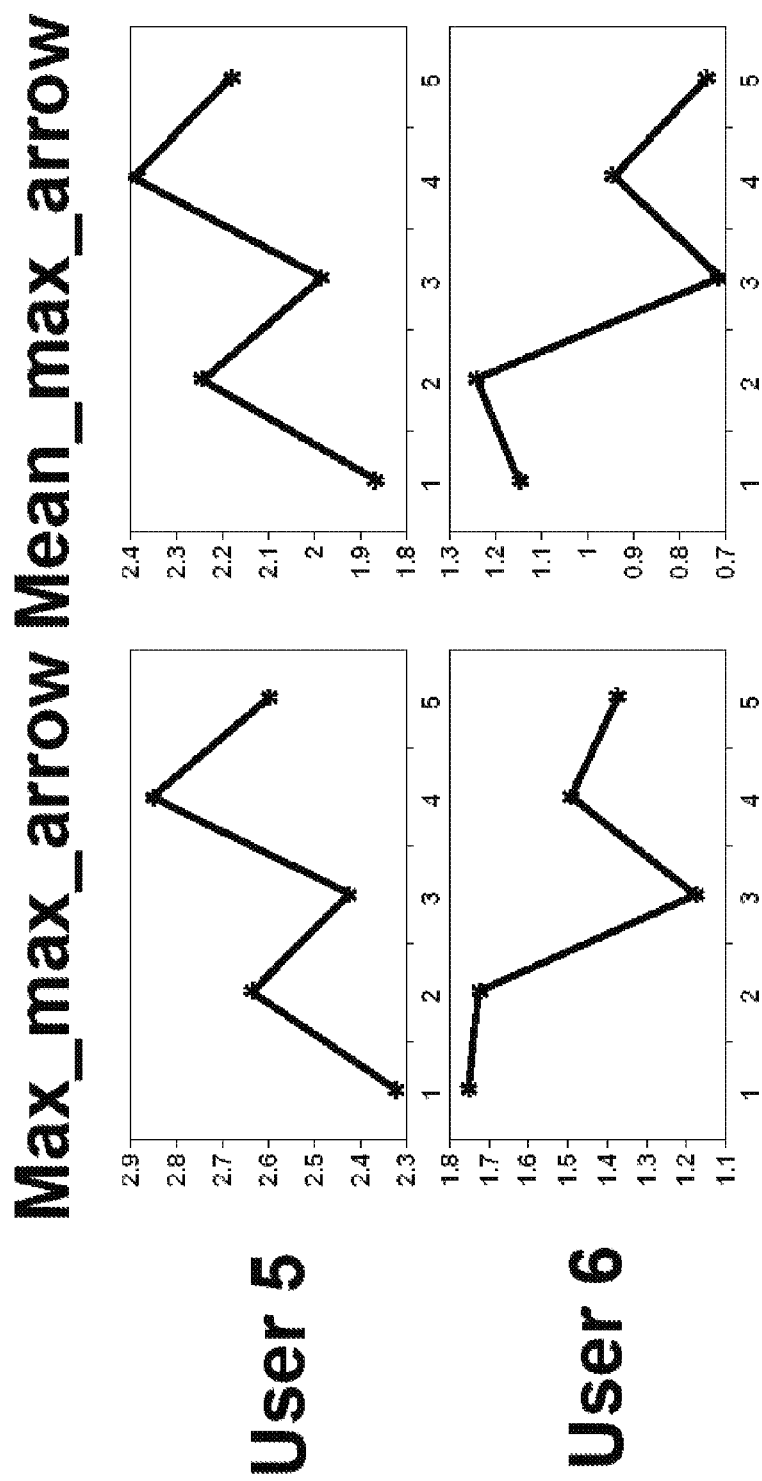
Figure 10-c2

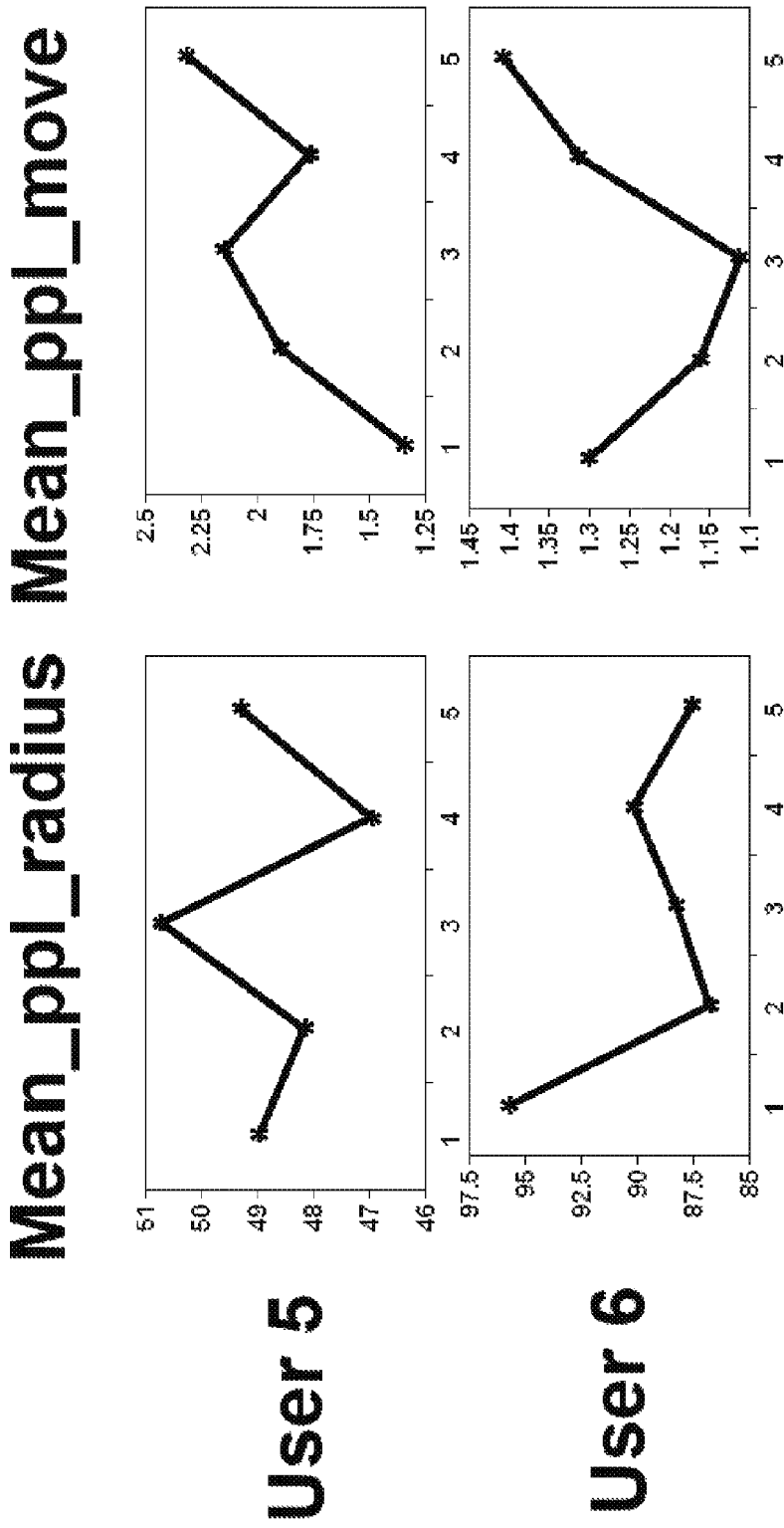
Figure 10-c3

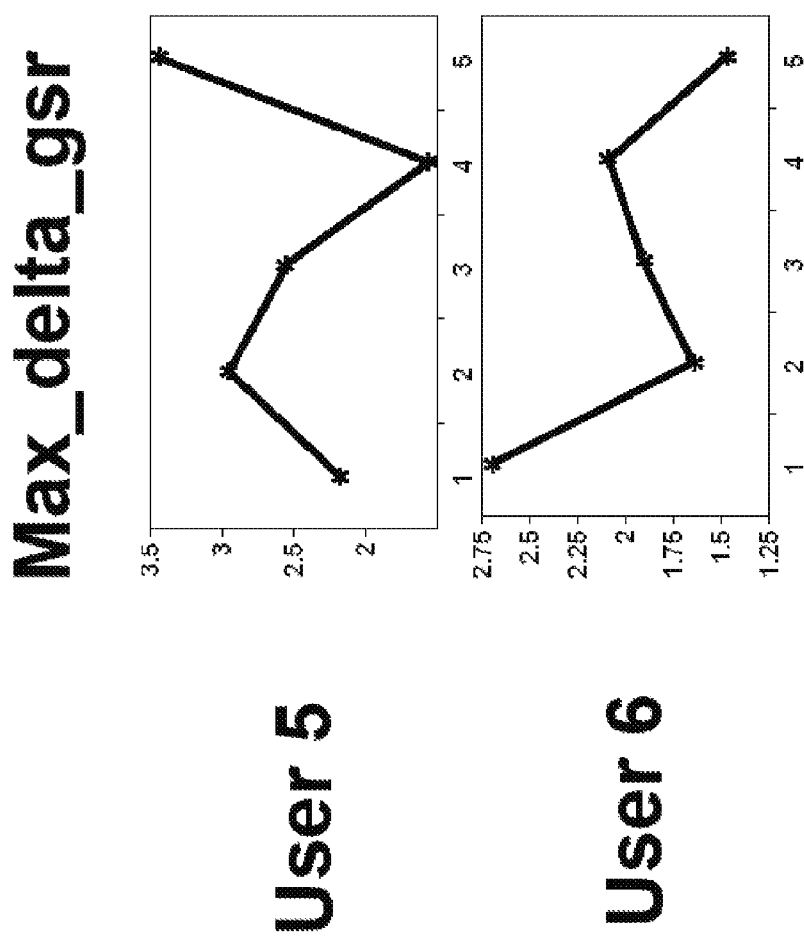
Figure 10-c4

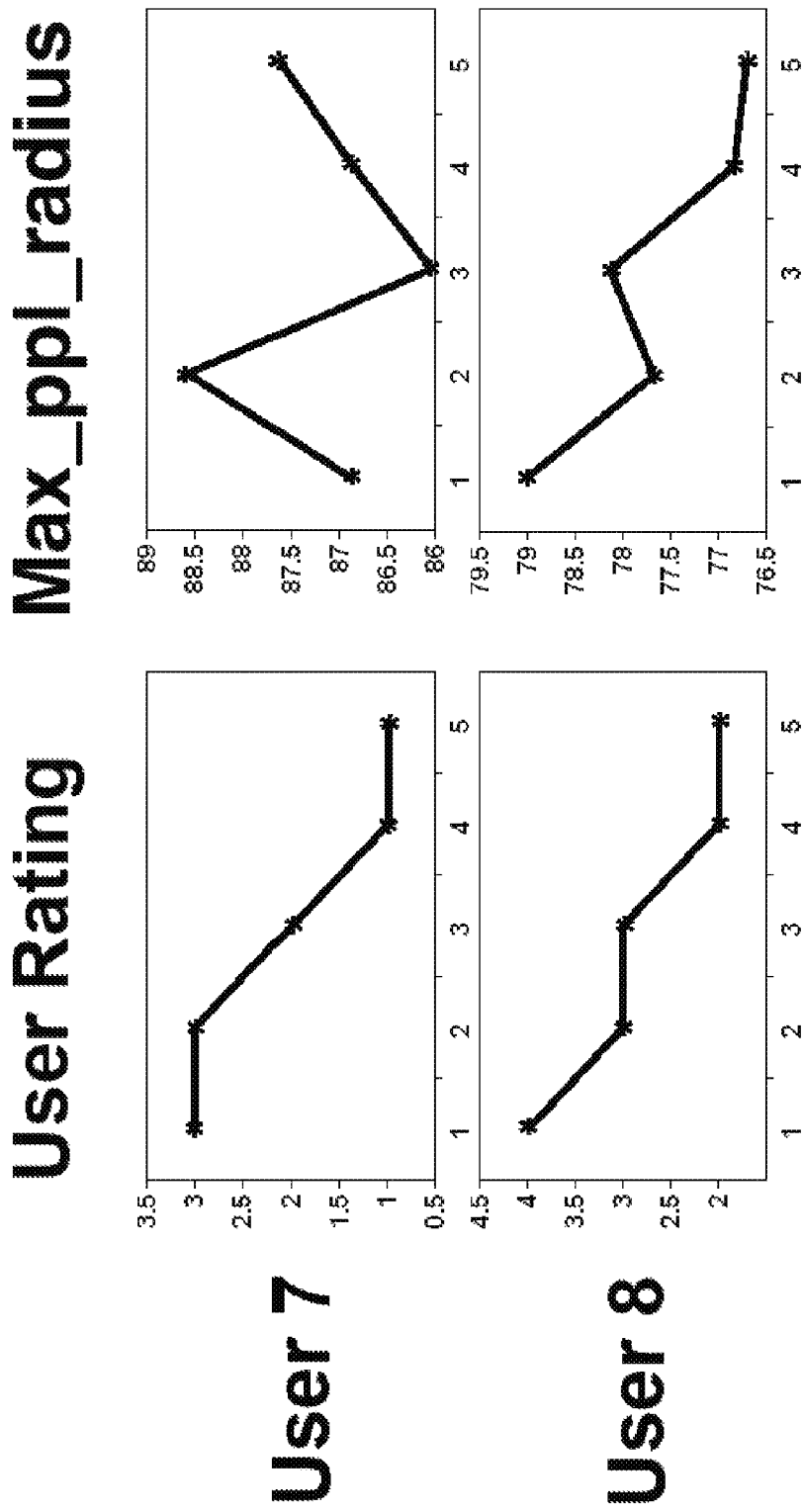
Figure 10-d1

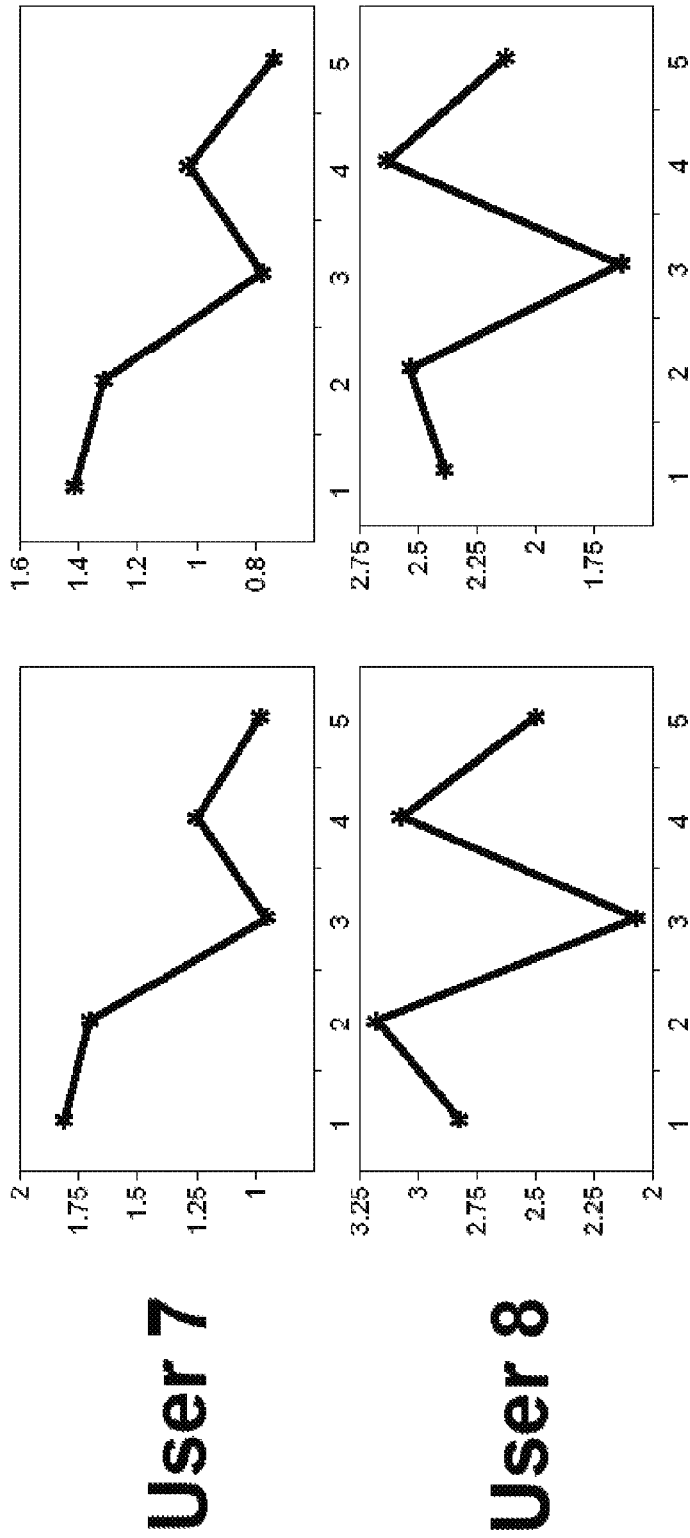
Figure 10-d2

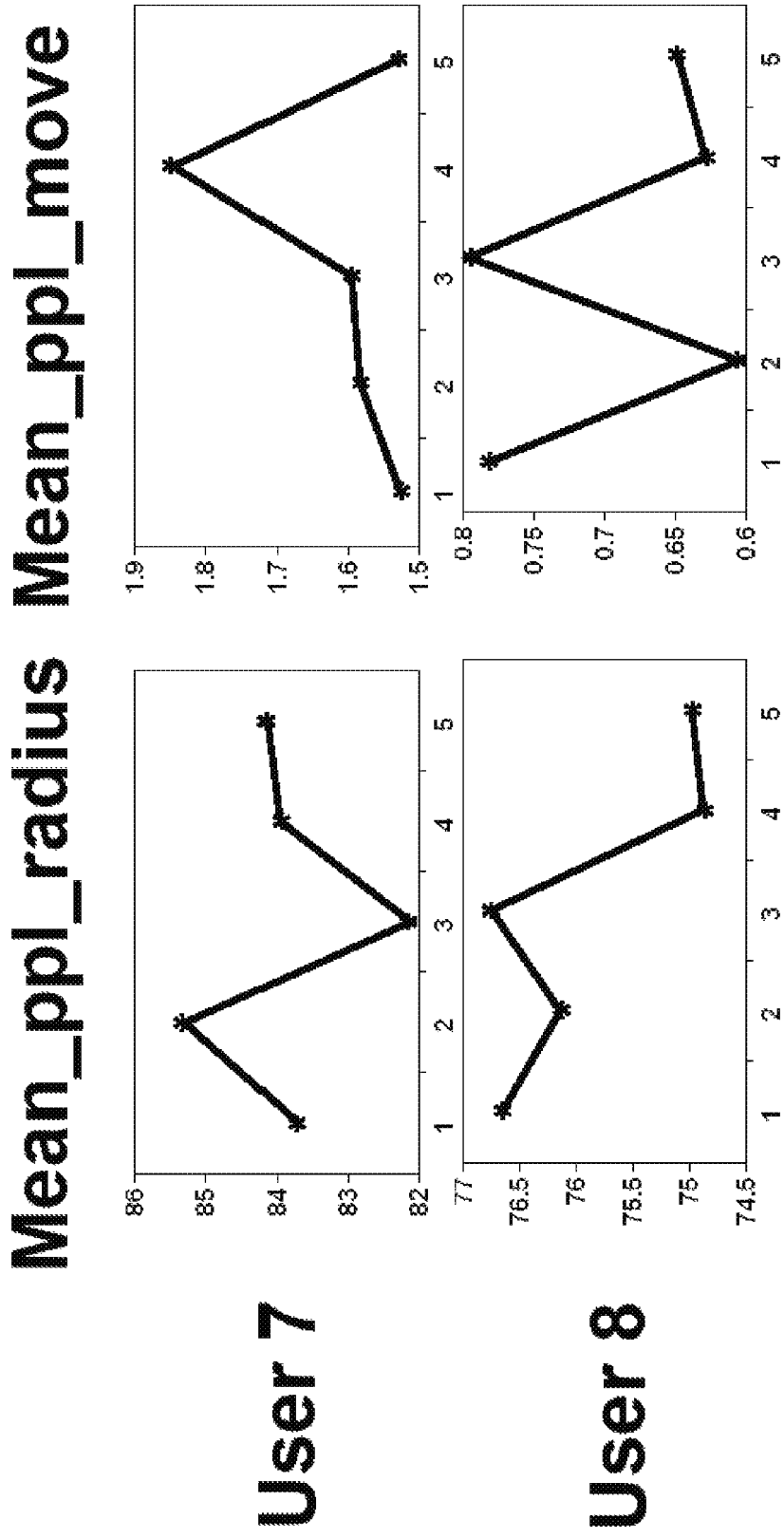
Figure 10-d3

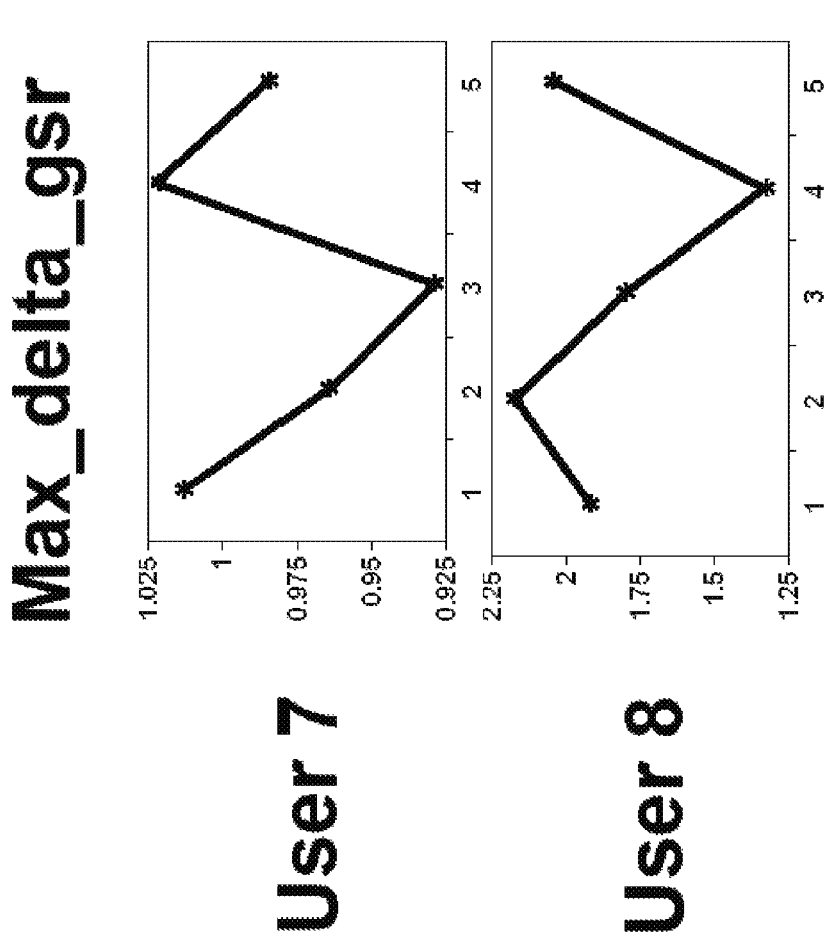
Figure 10-d4

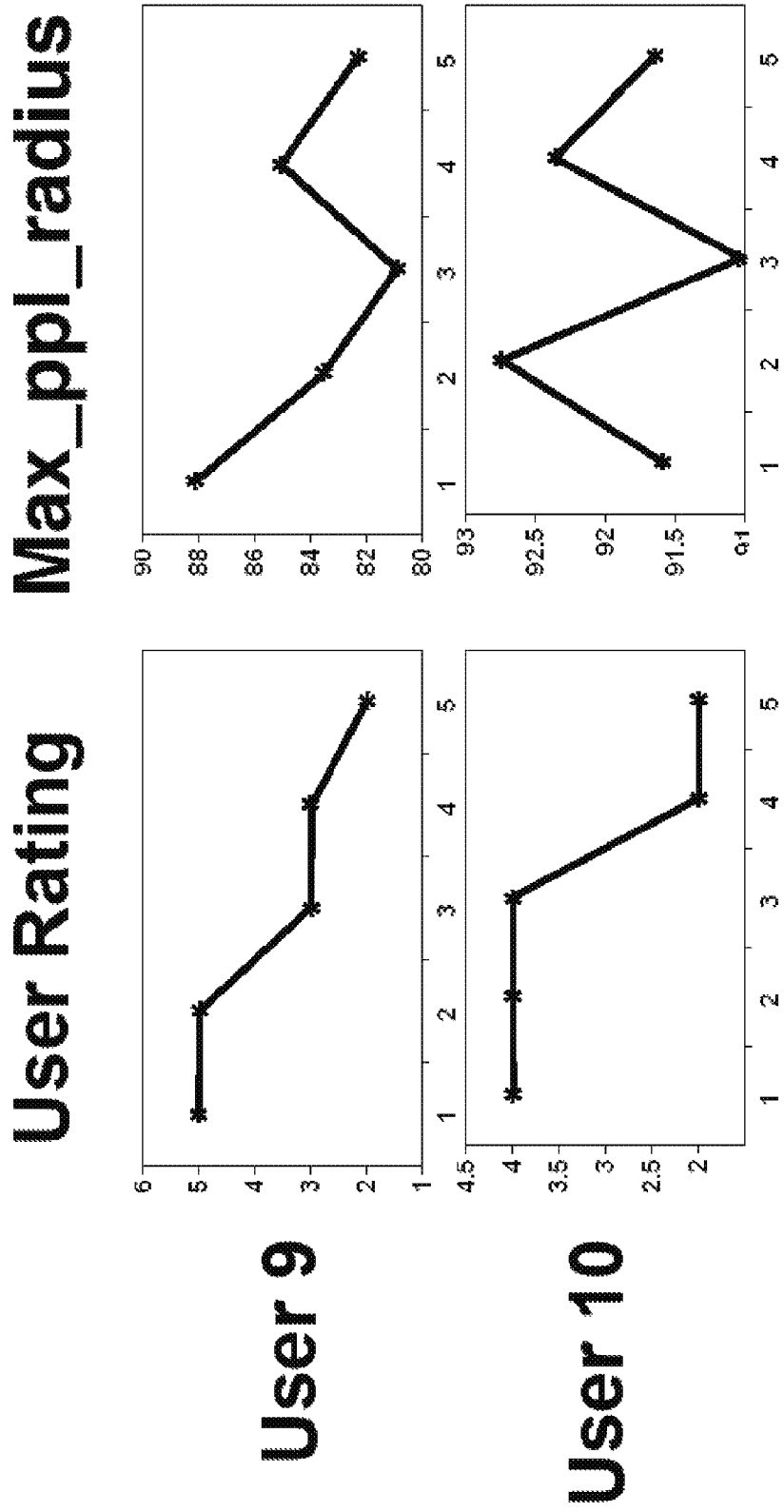
Figure 10-e1

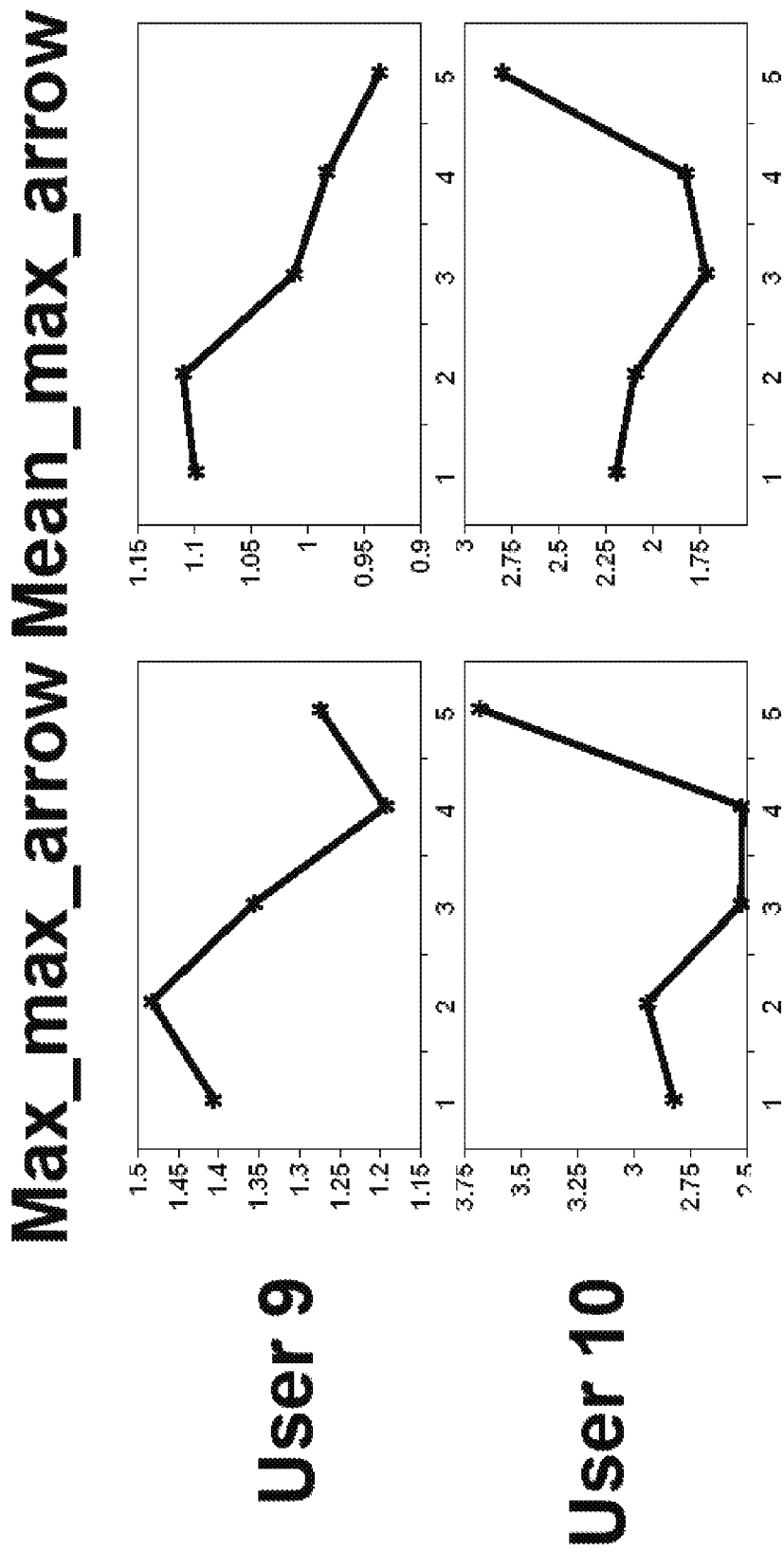
Figure 10-e2

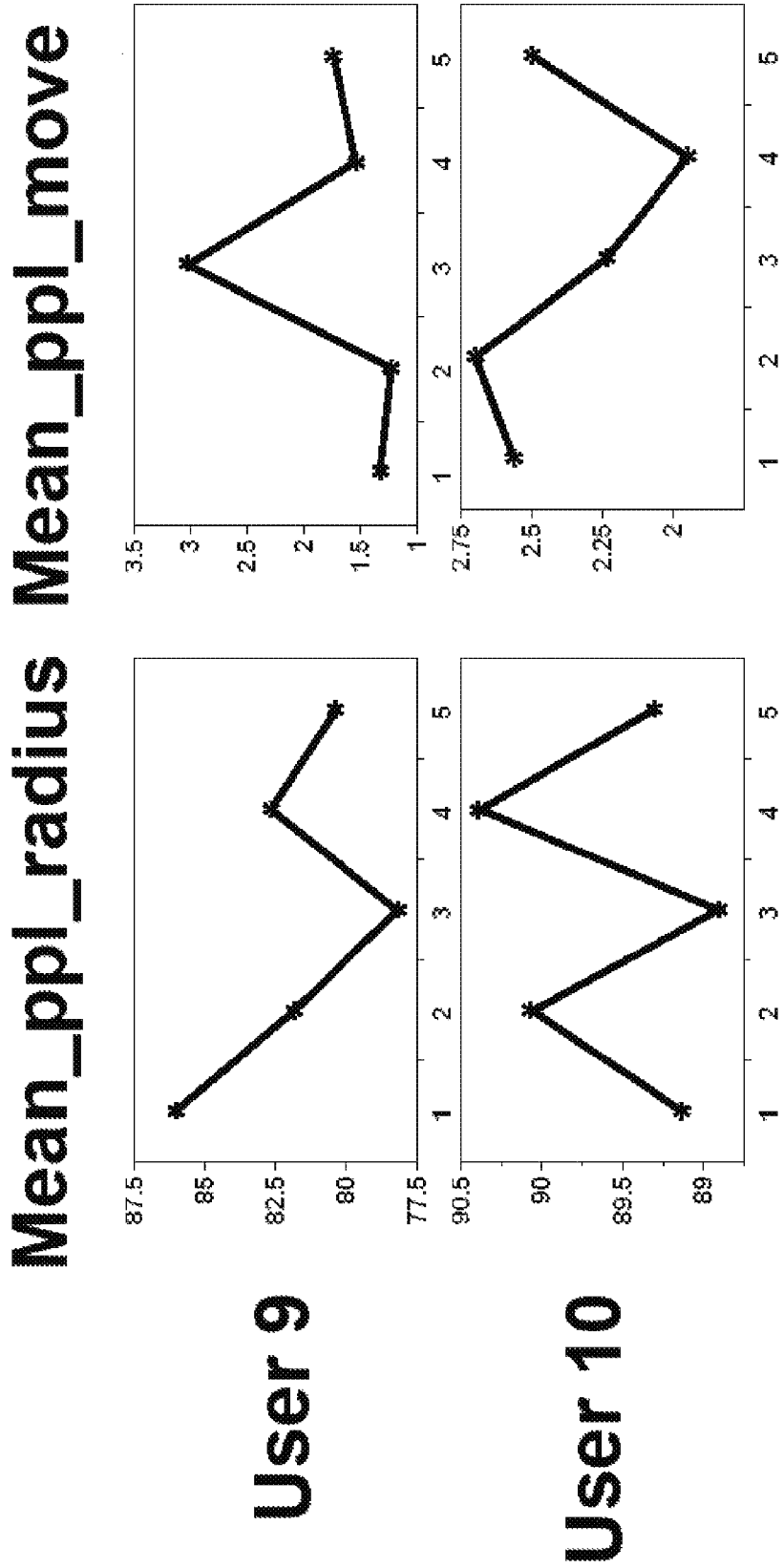
Figure 10-e3

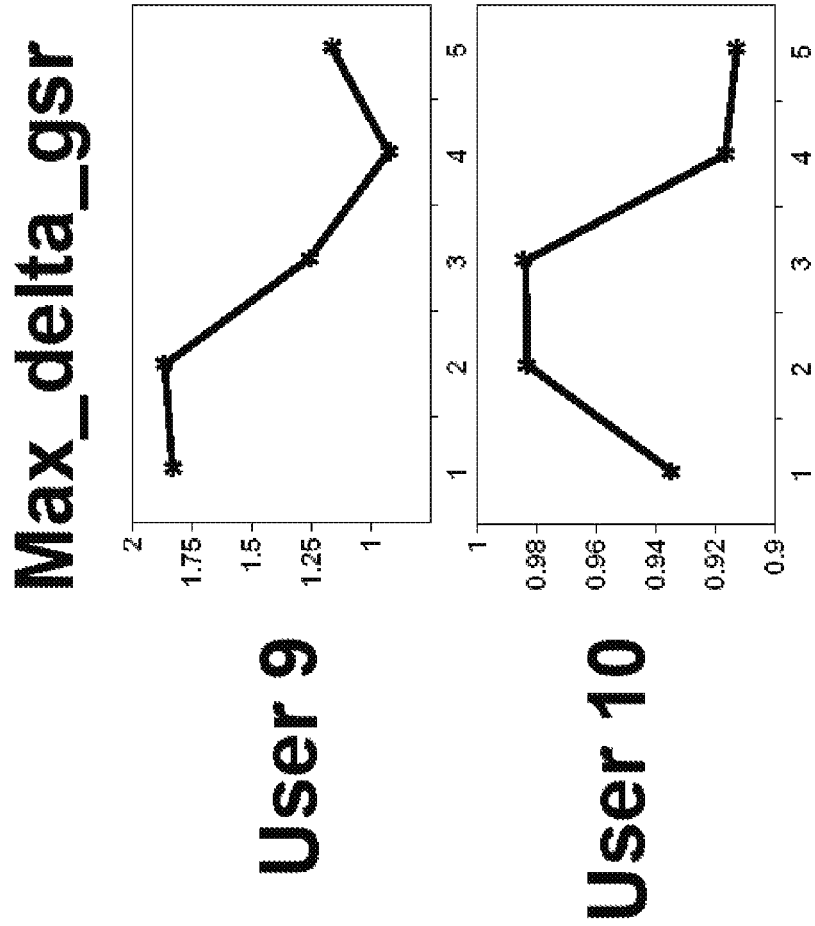
Figure 10-e4

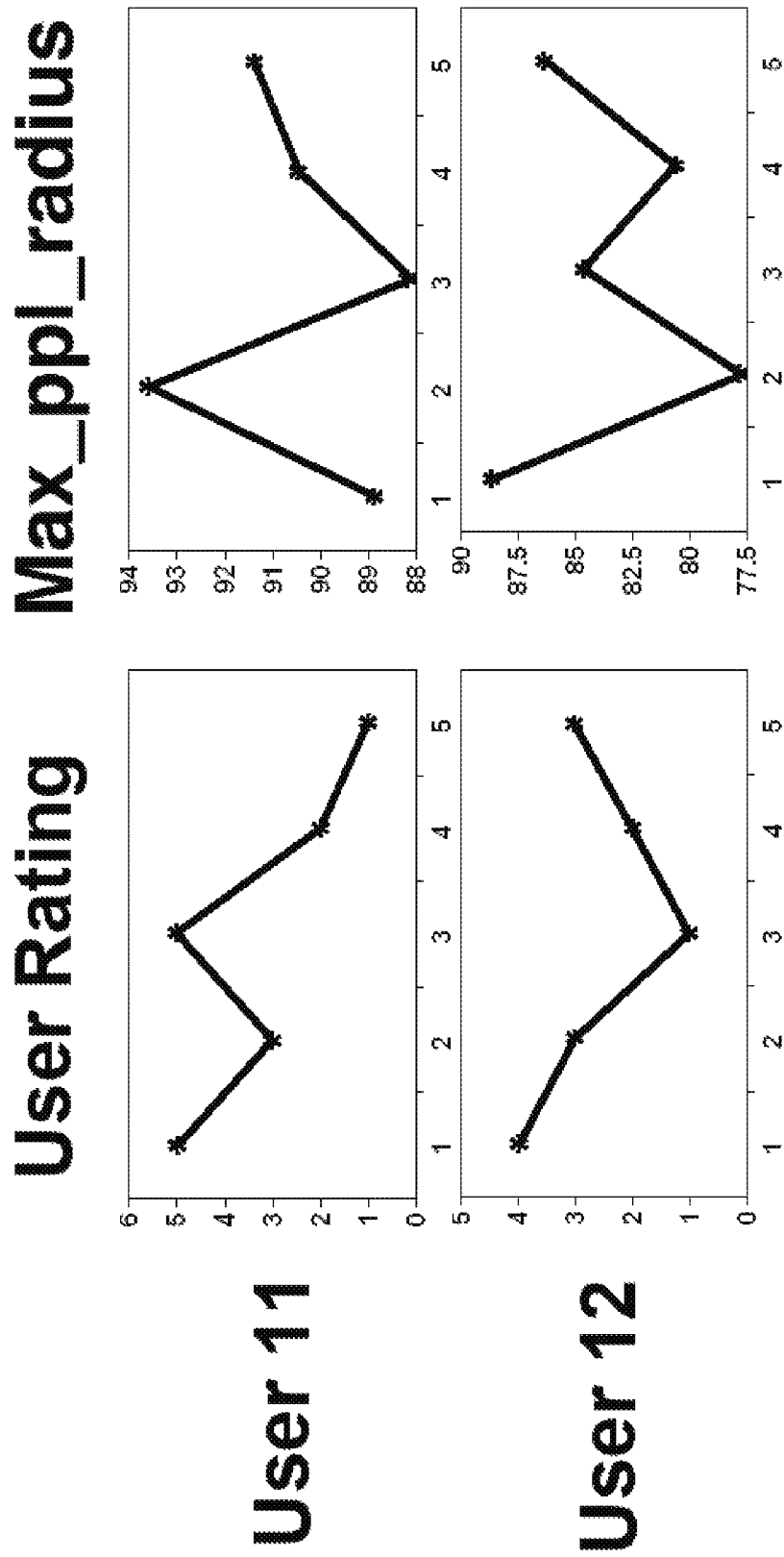
Figure 10-f1

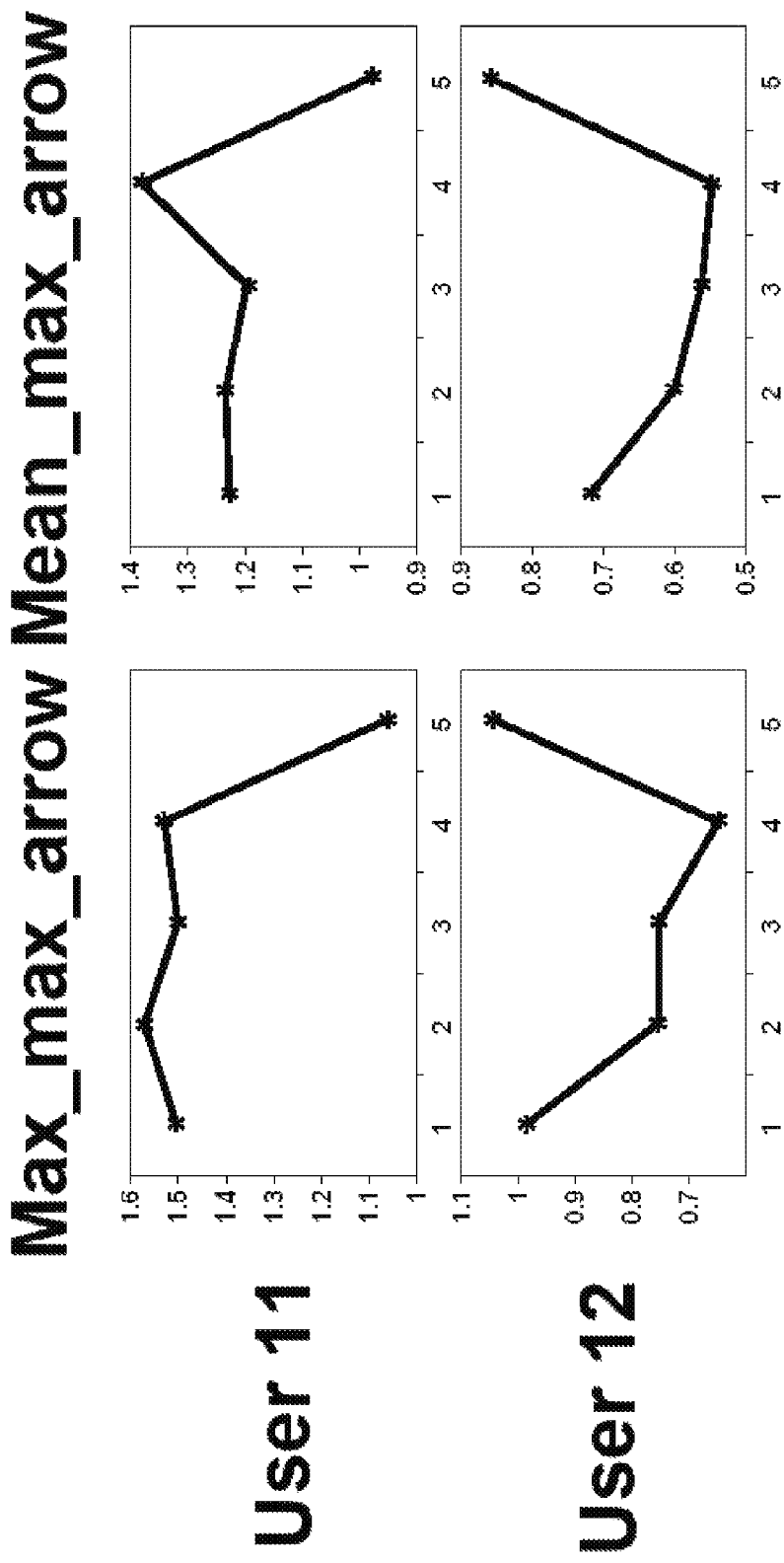
Figure 10-f2

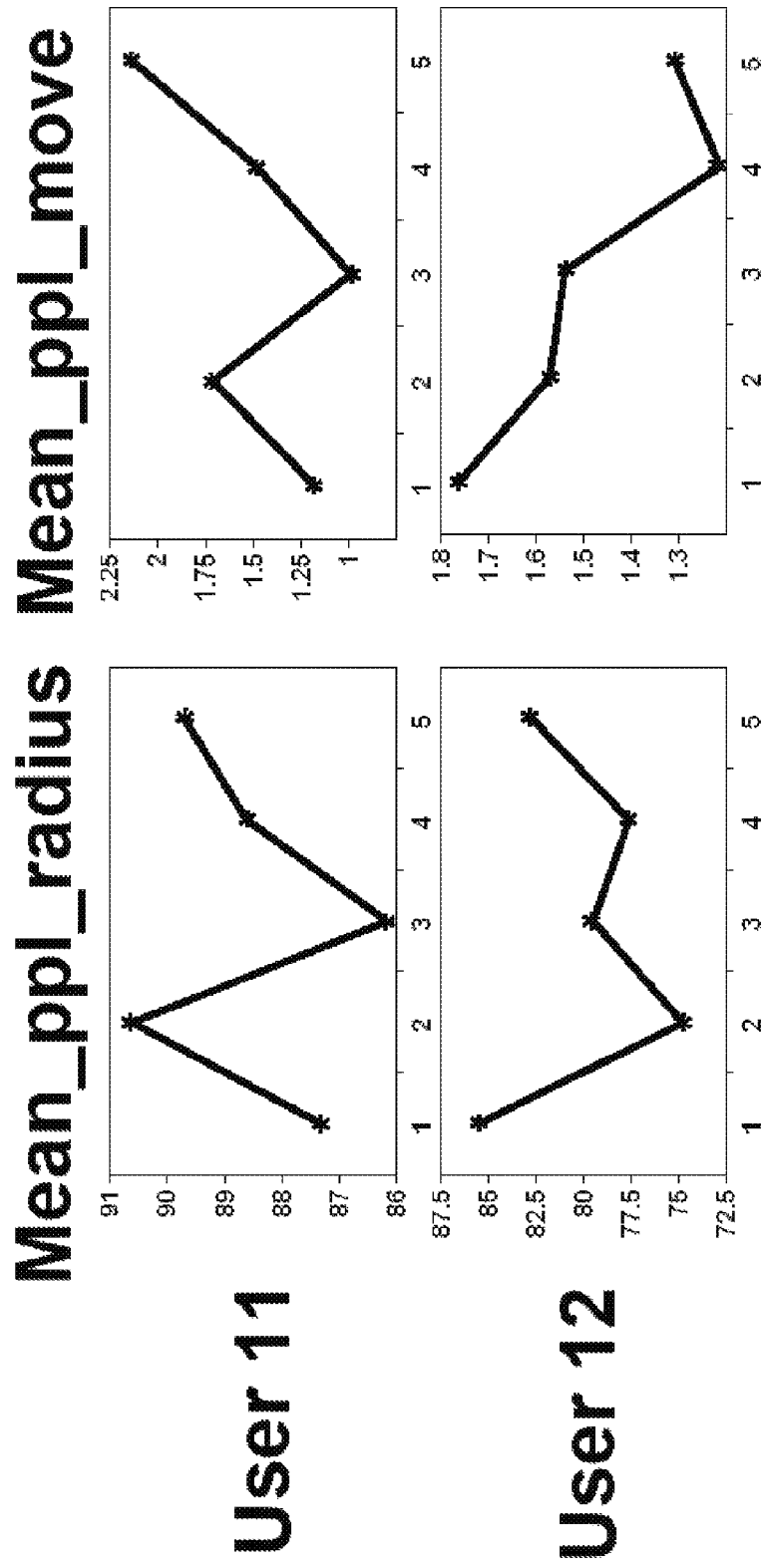
Figure 10-f3

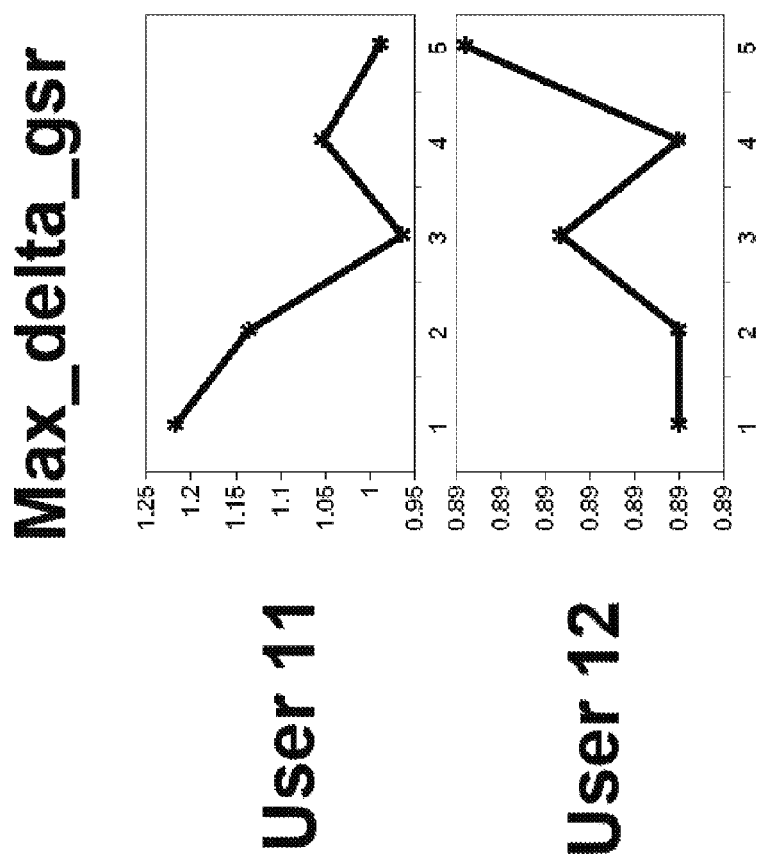
Figure 10-f4

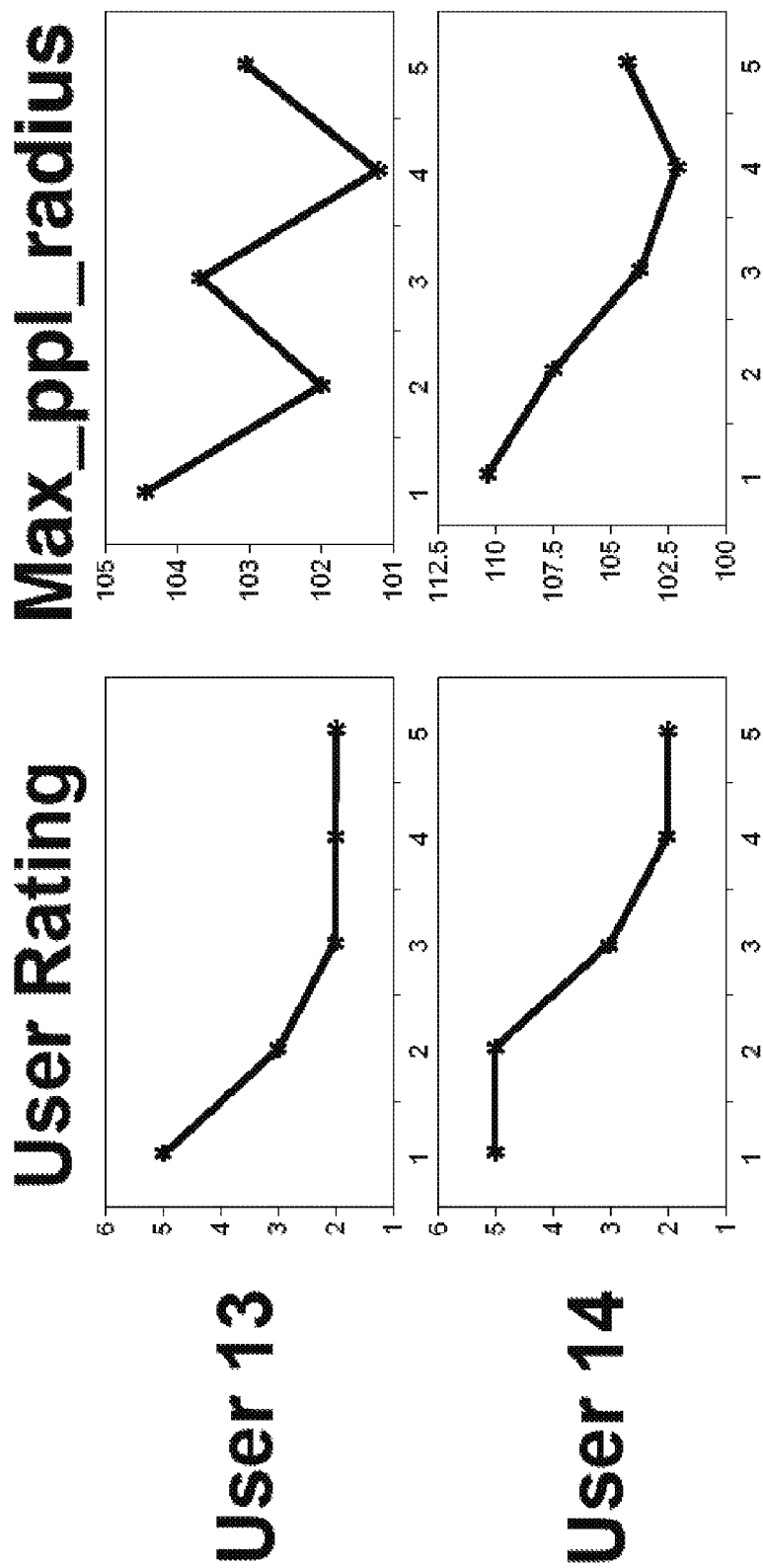
Figure 10-g1

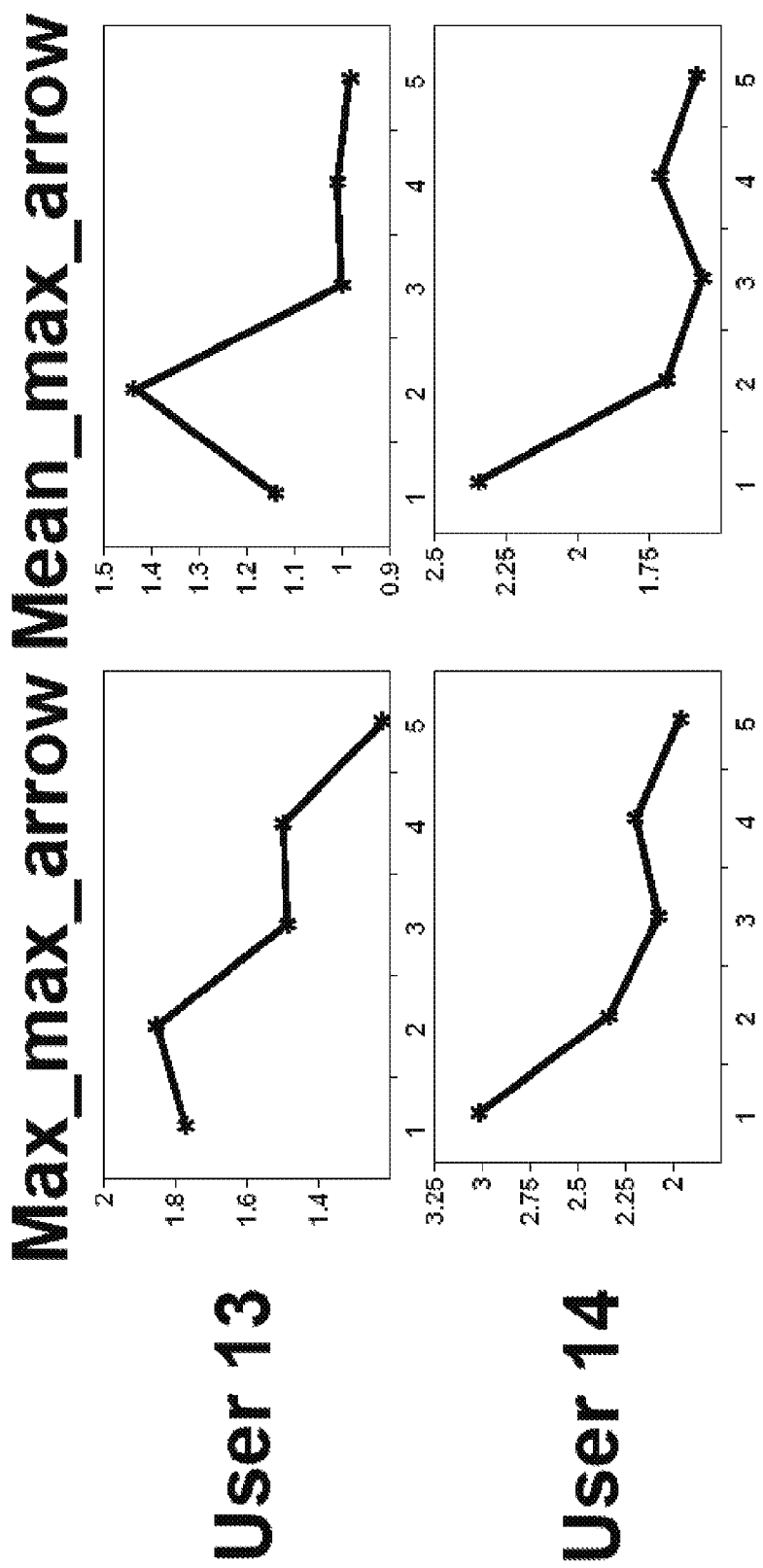
Figure 10-g2

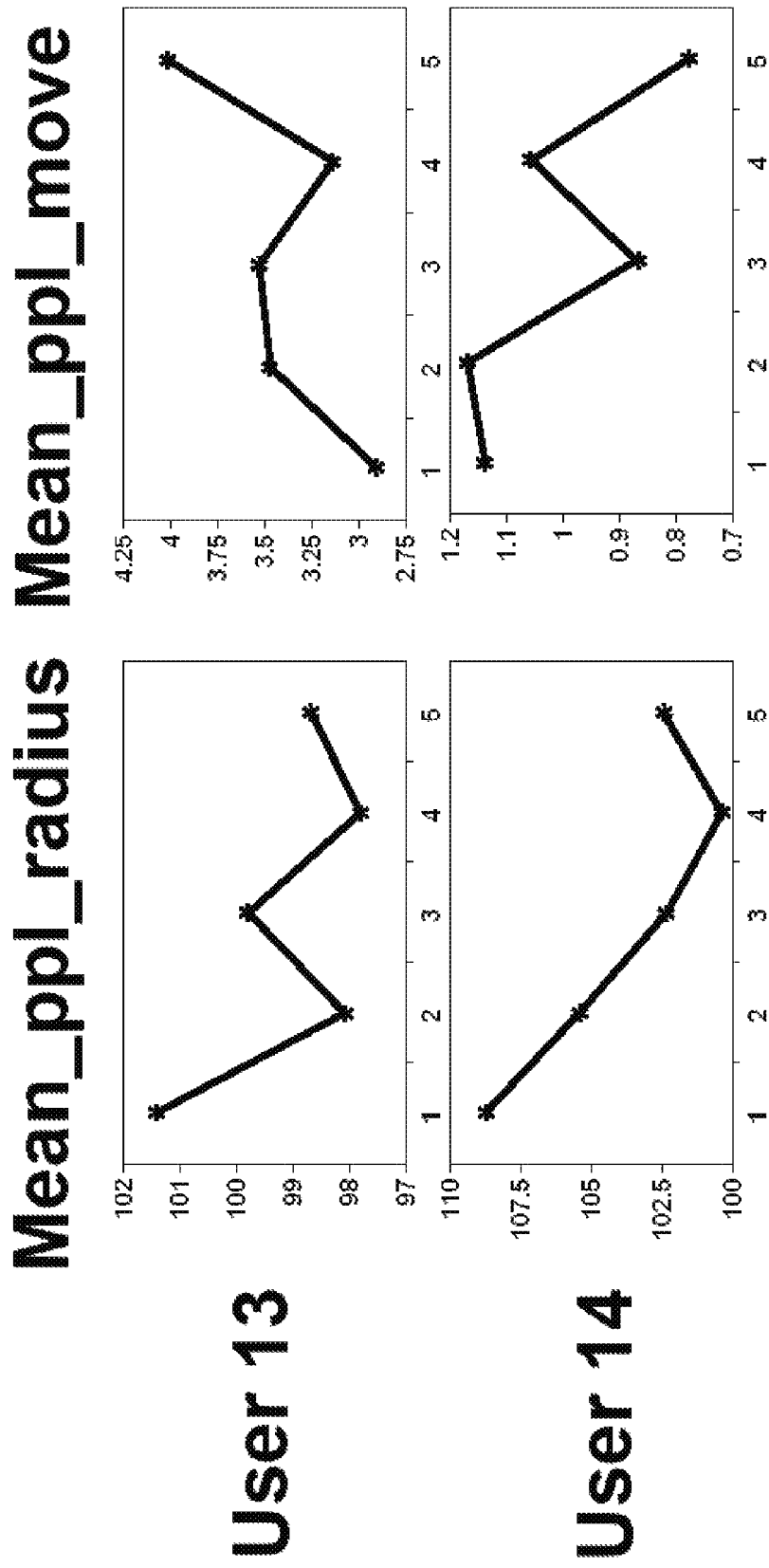
Figure 10-g3

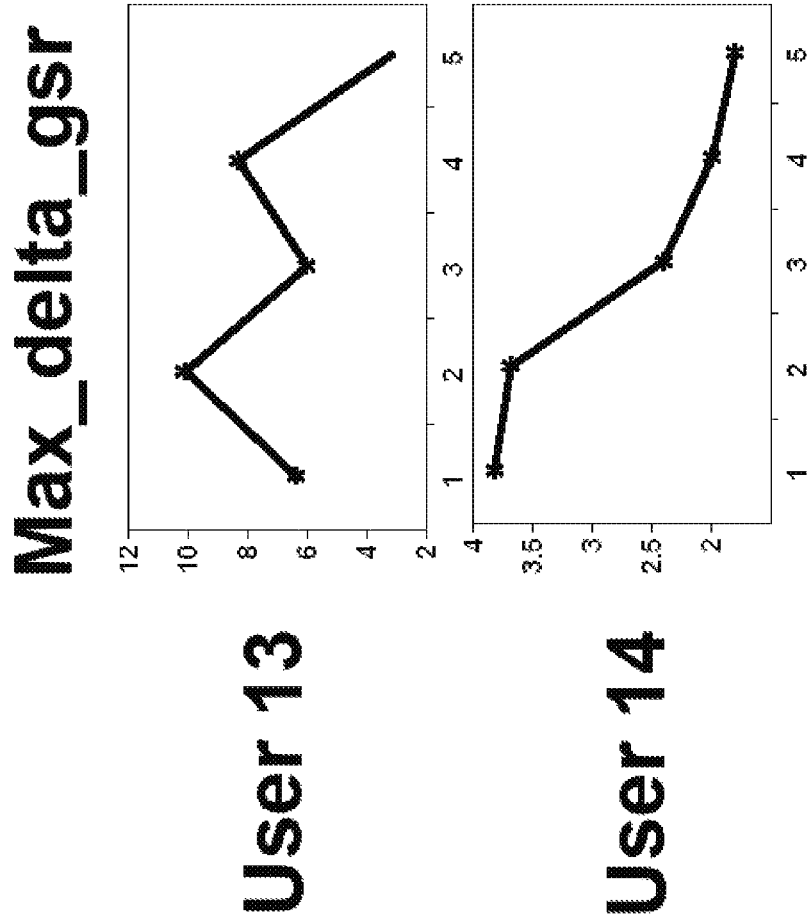
Figure 10-g4

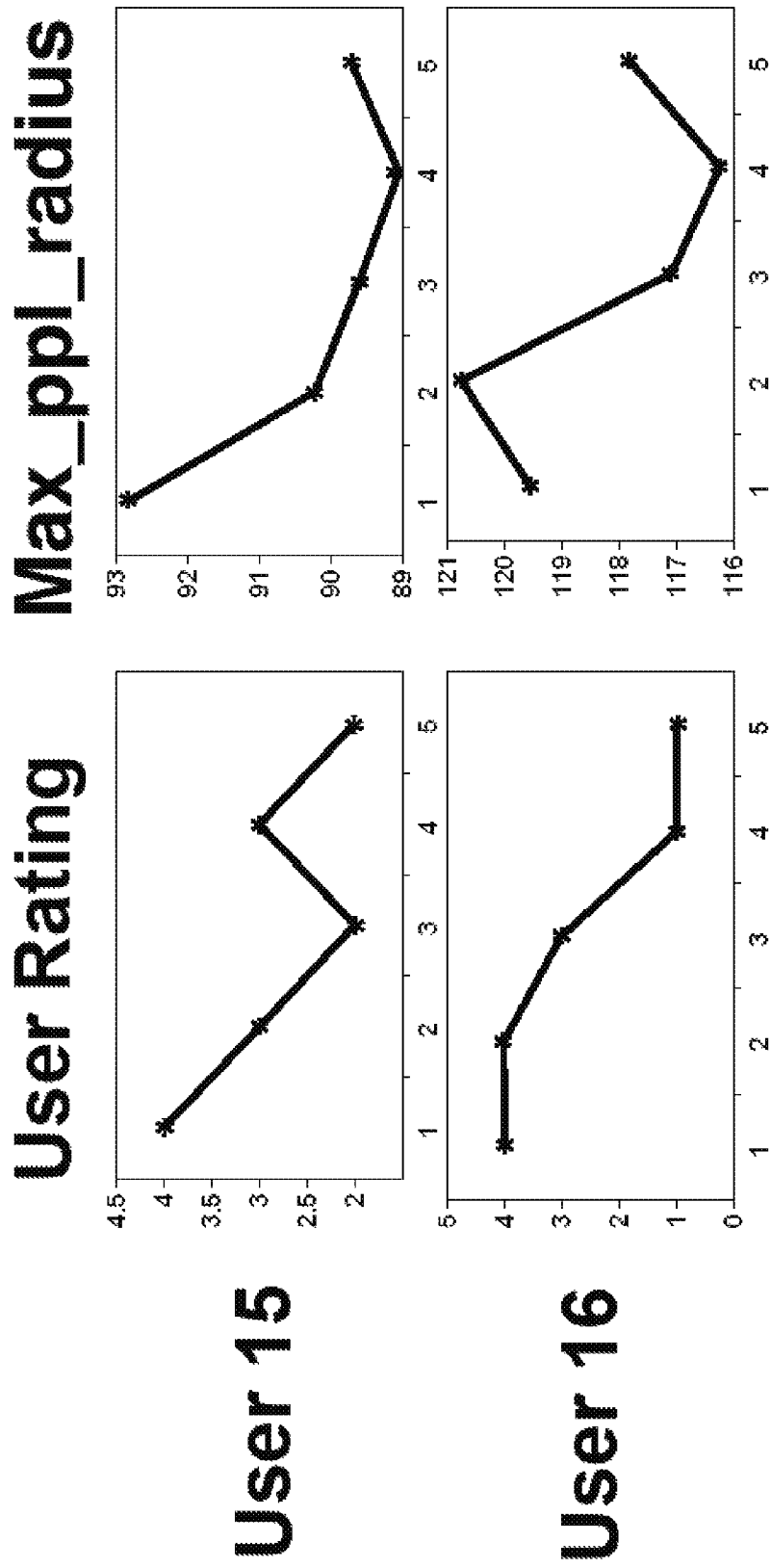
Figure 10-h1

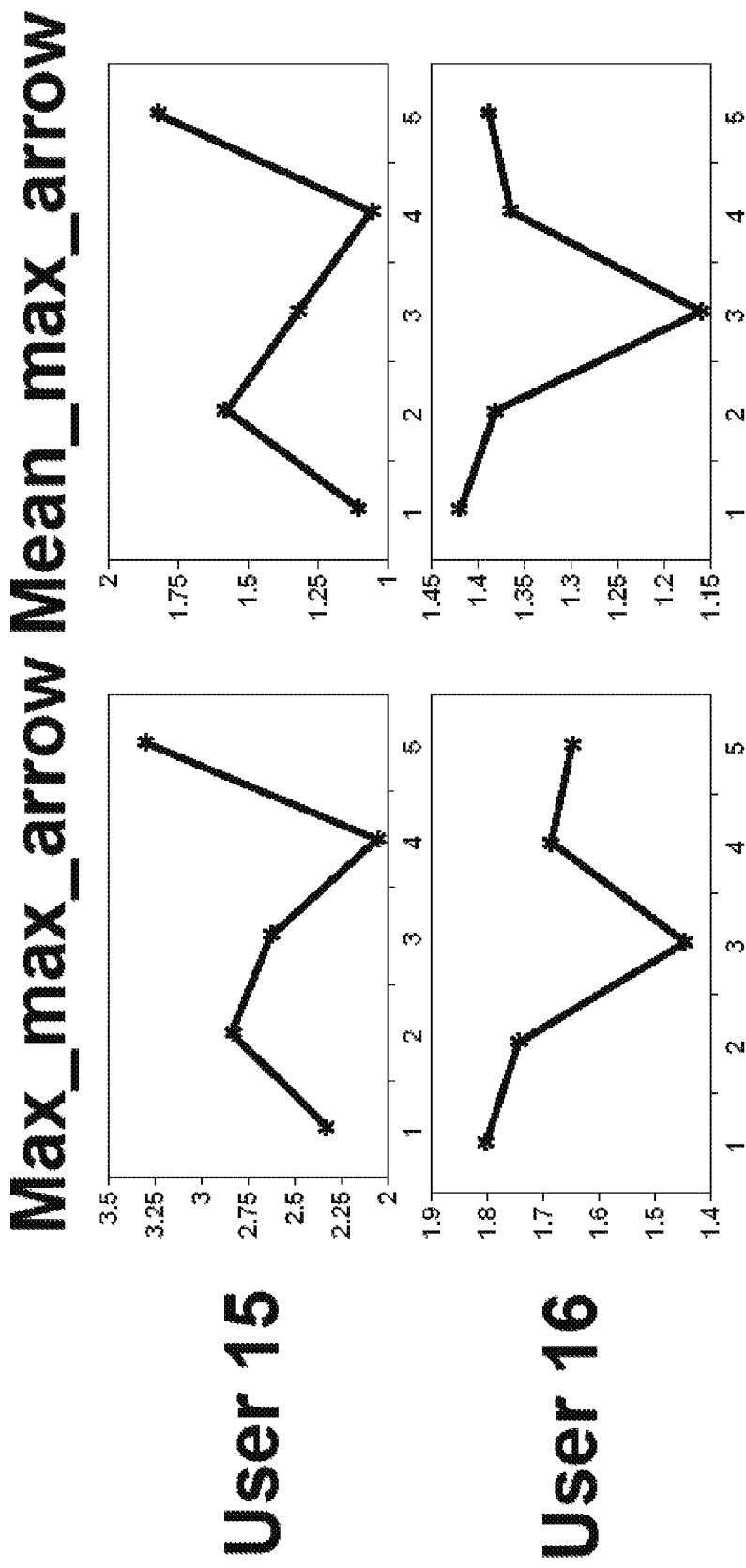
Figure 10-h2

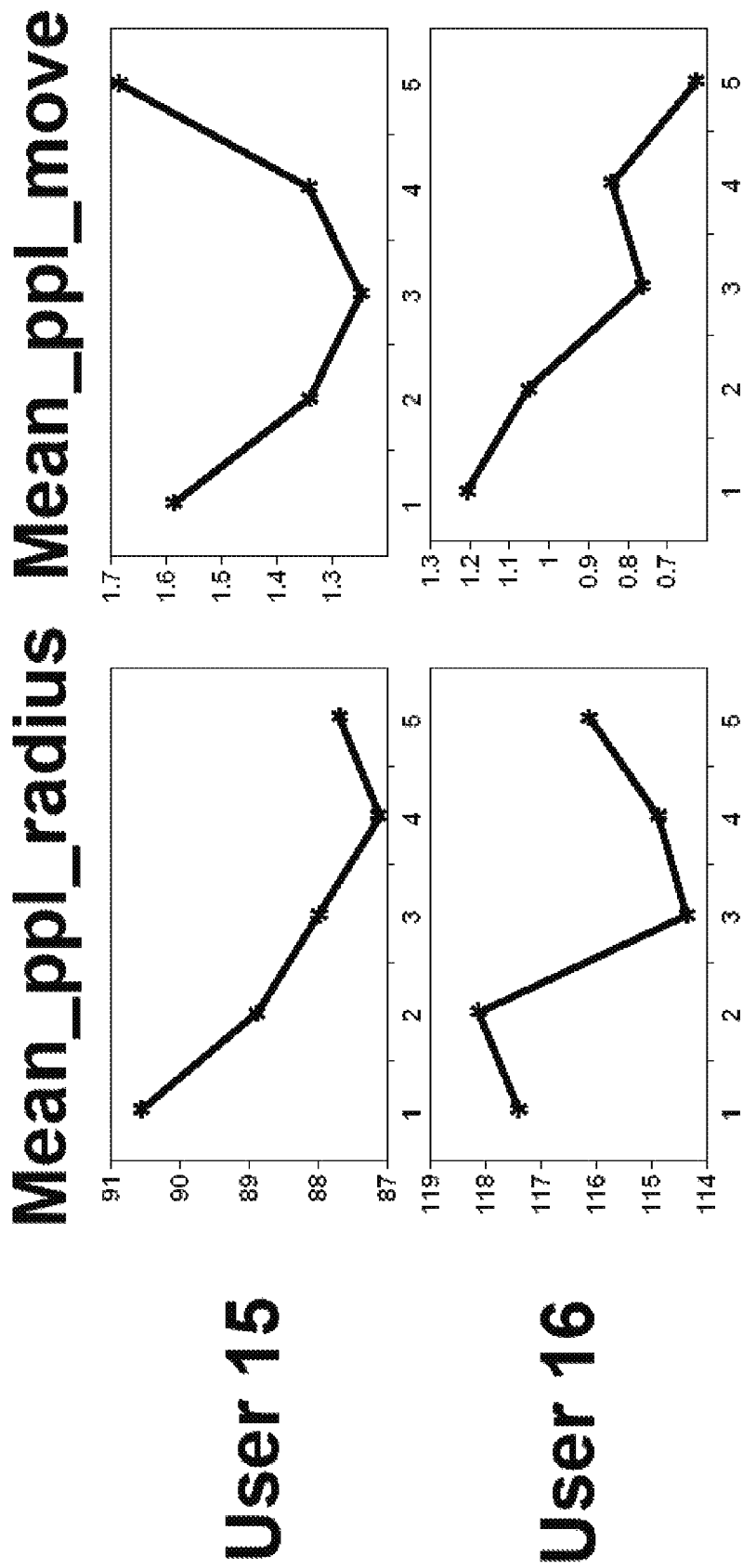
Figure 10-h3

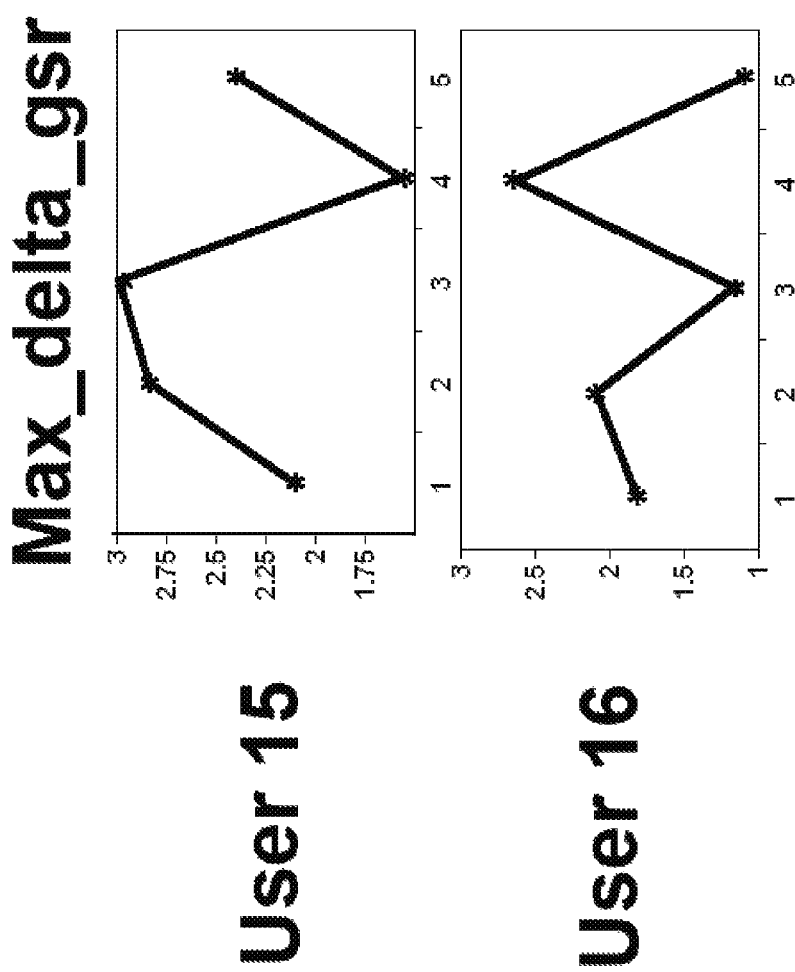
Figure 10-h4

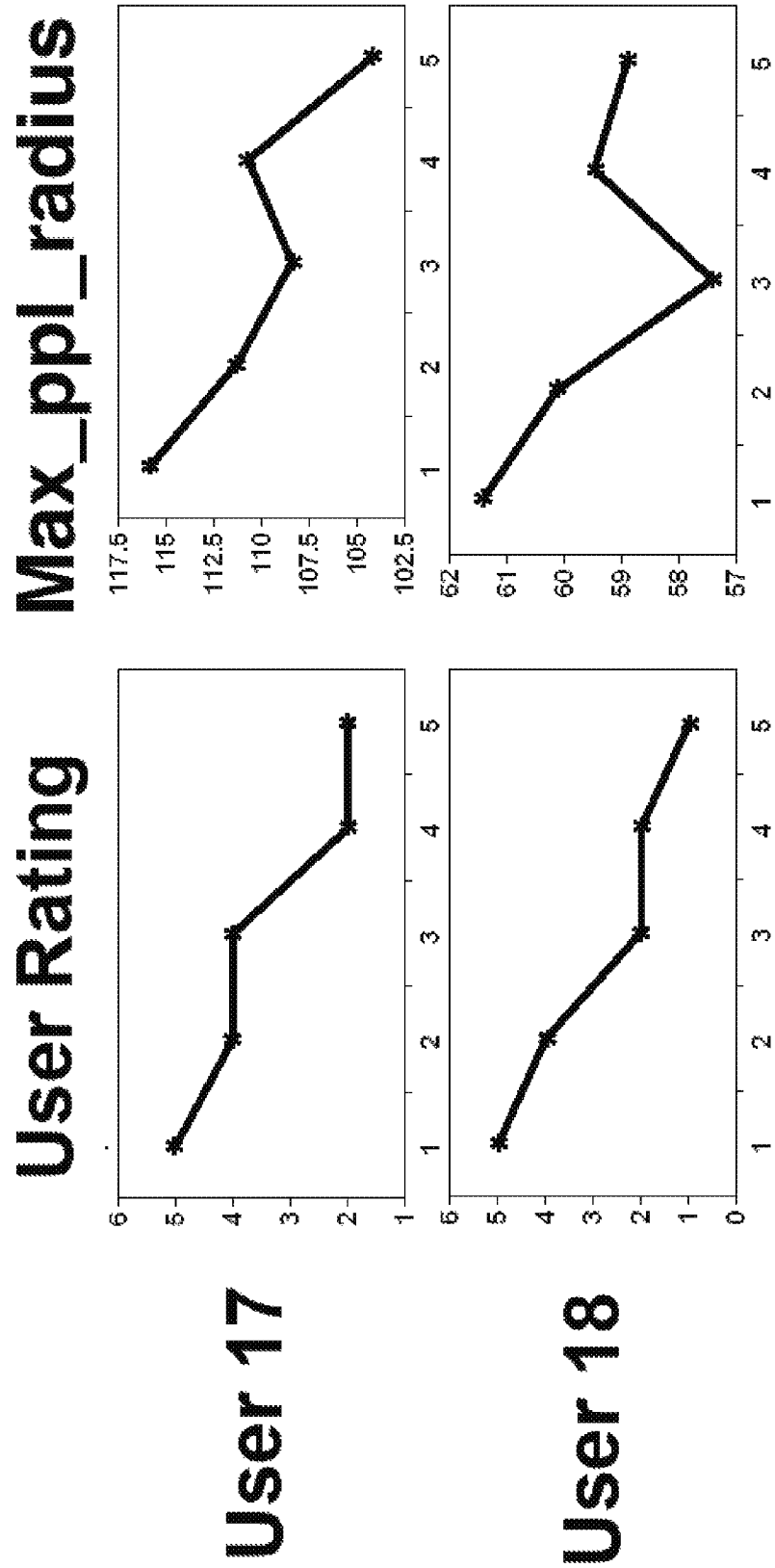
Figure 10-I1

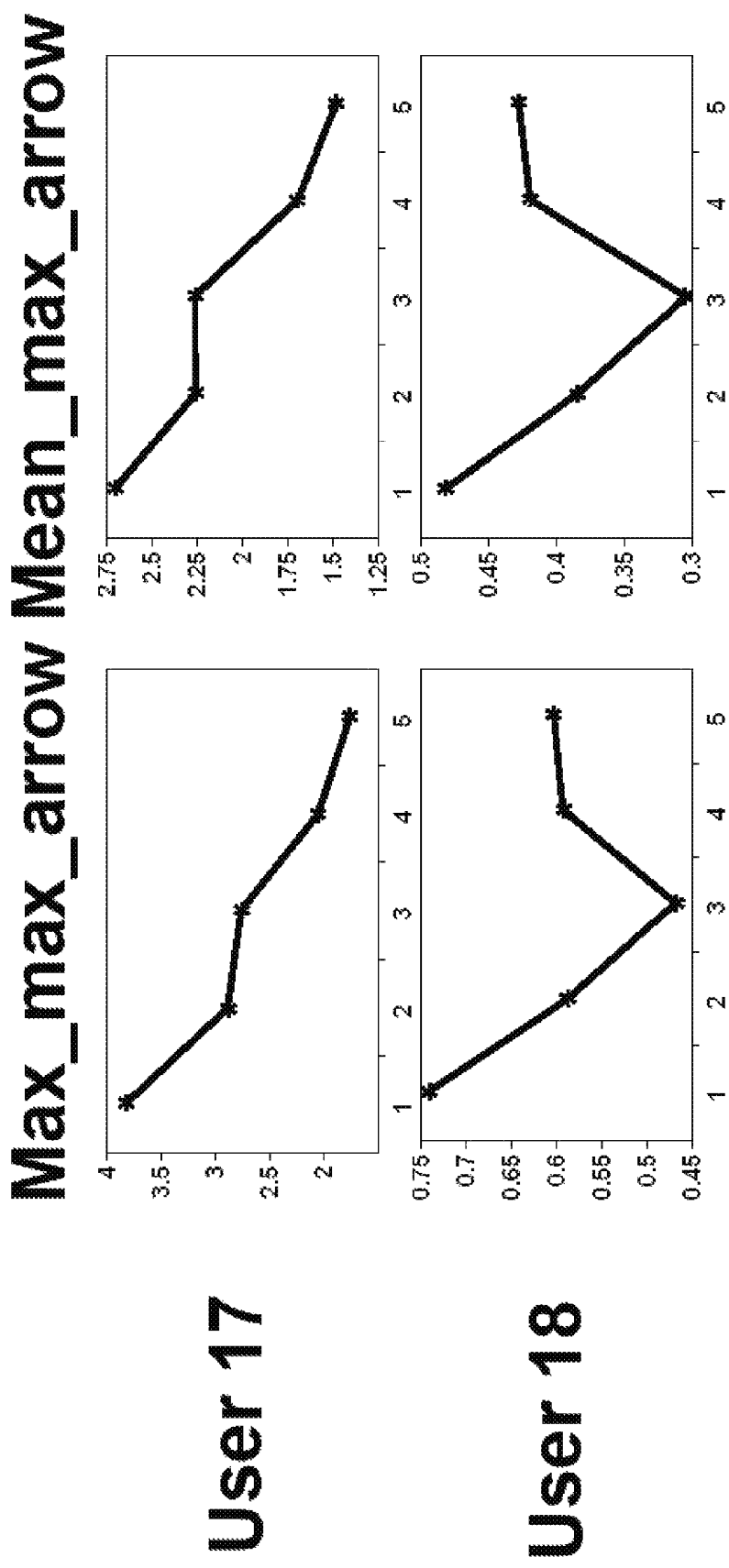
Figure 10-I2

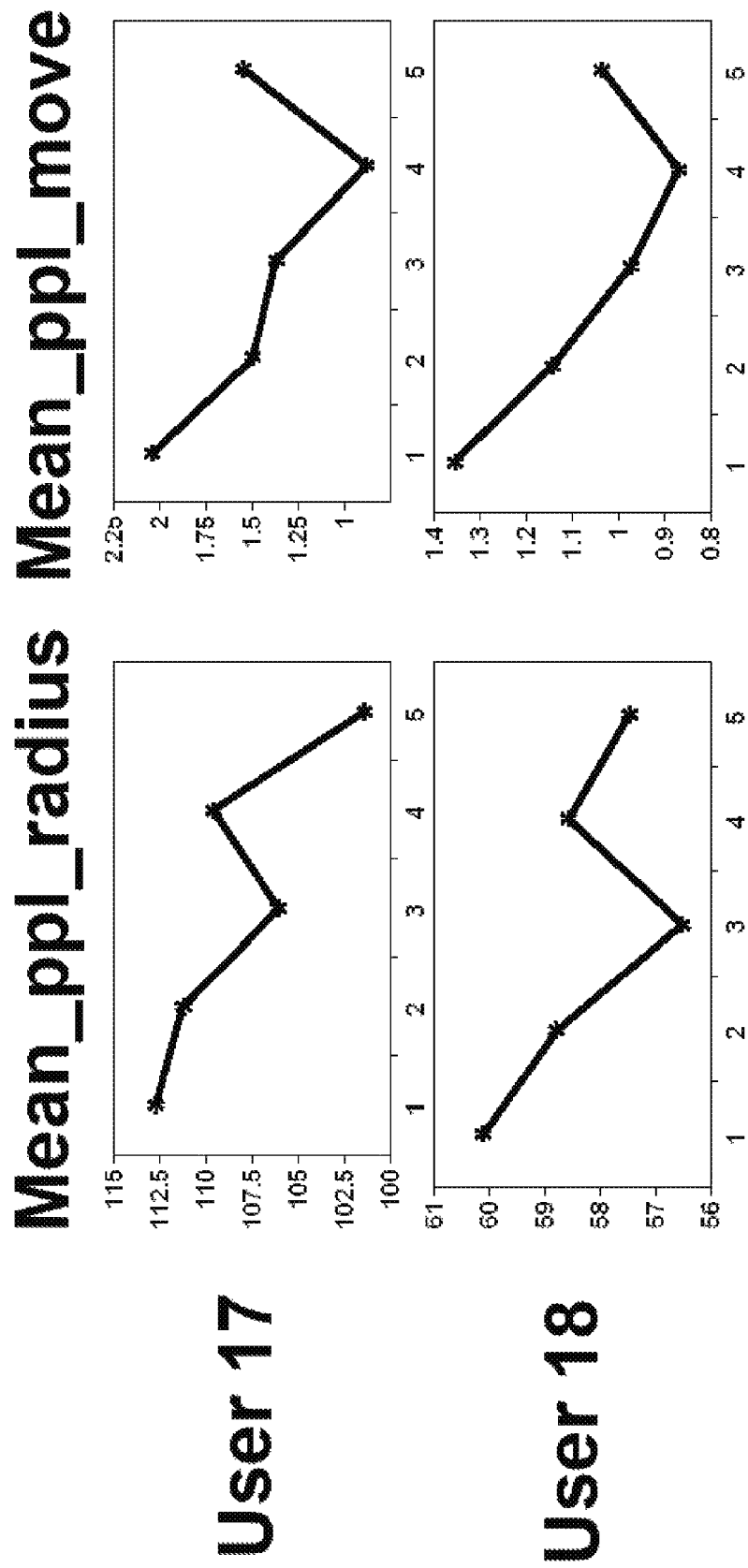
Figure 10-I3

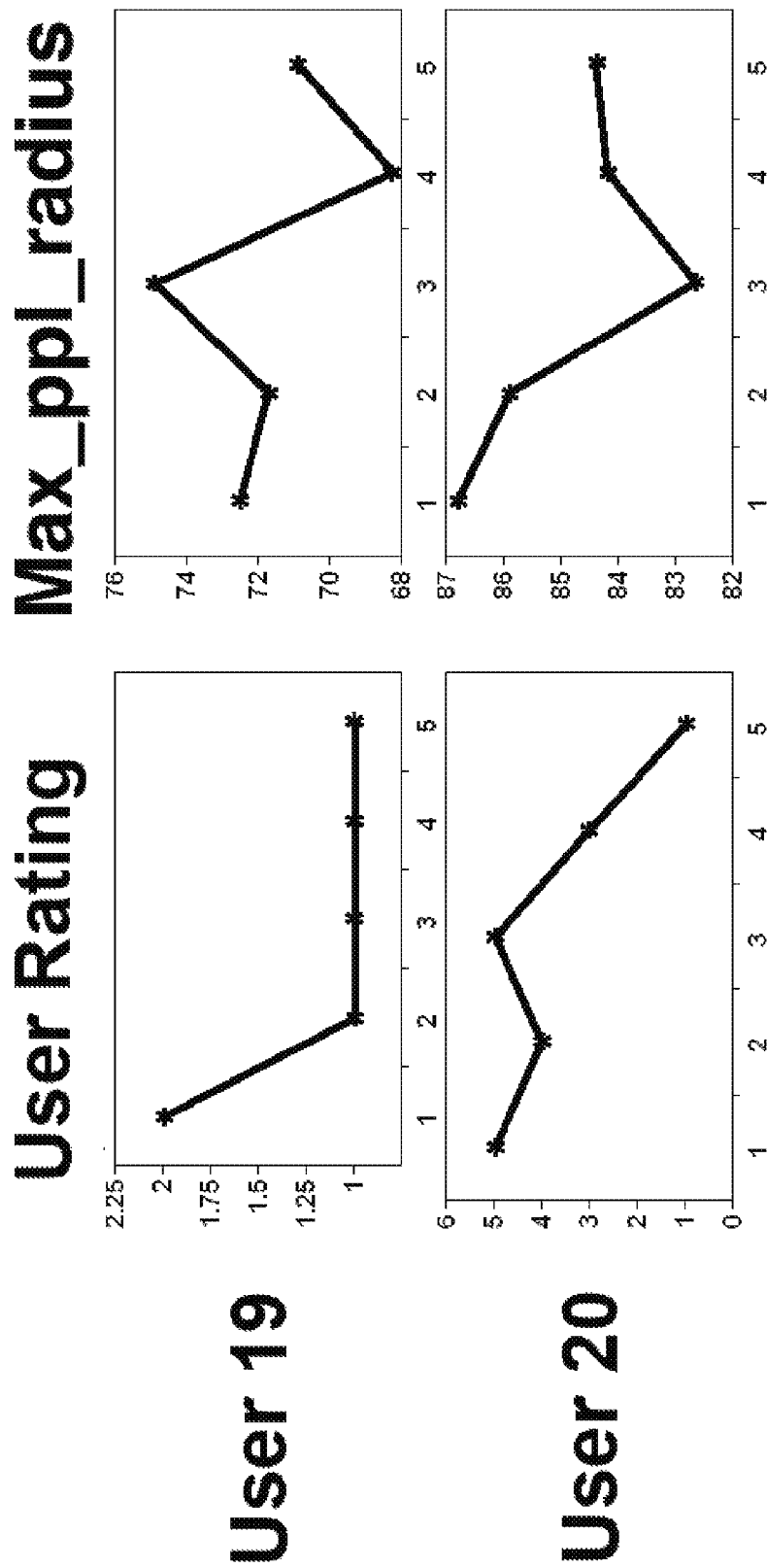
Figure 10-j1

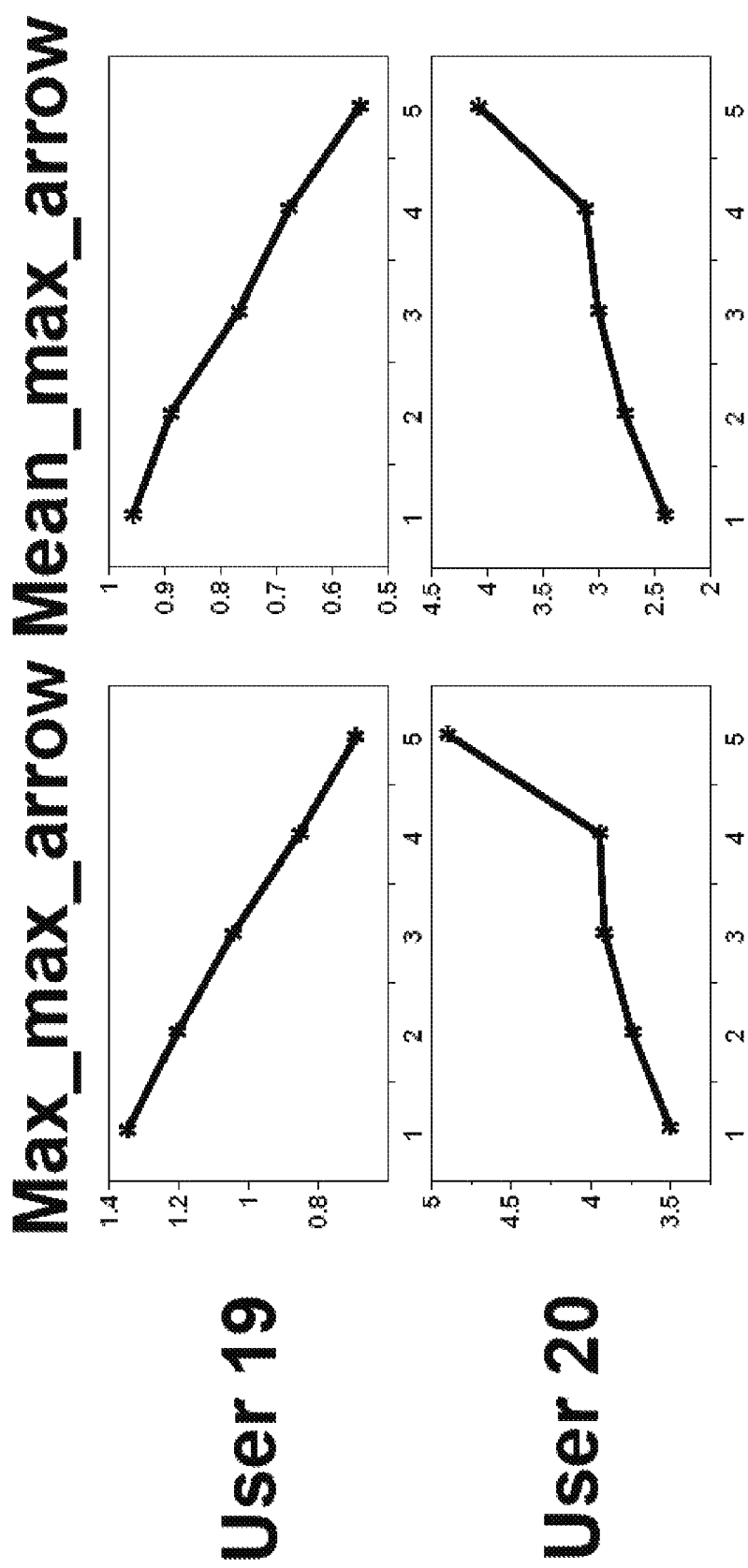
Figure 10-j2

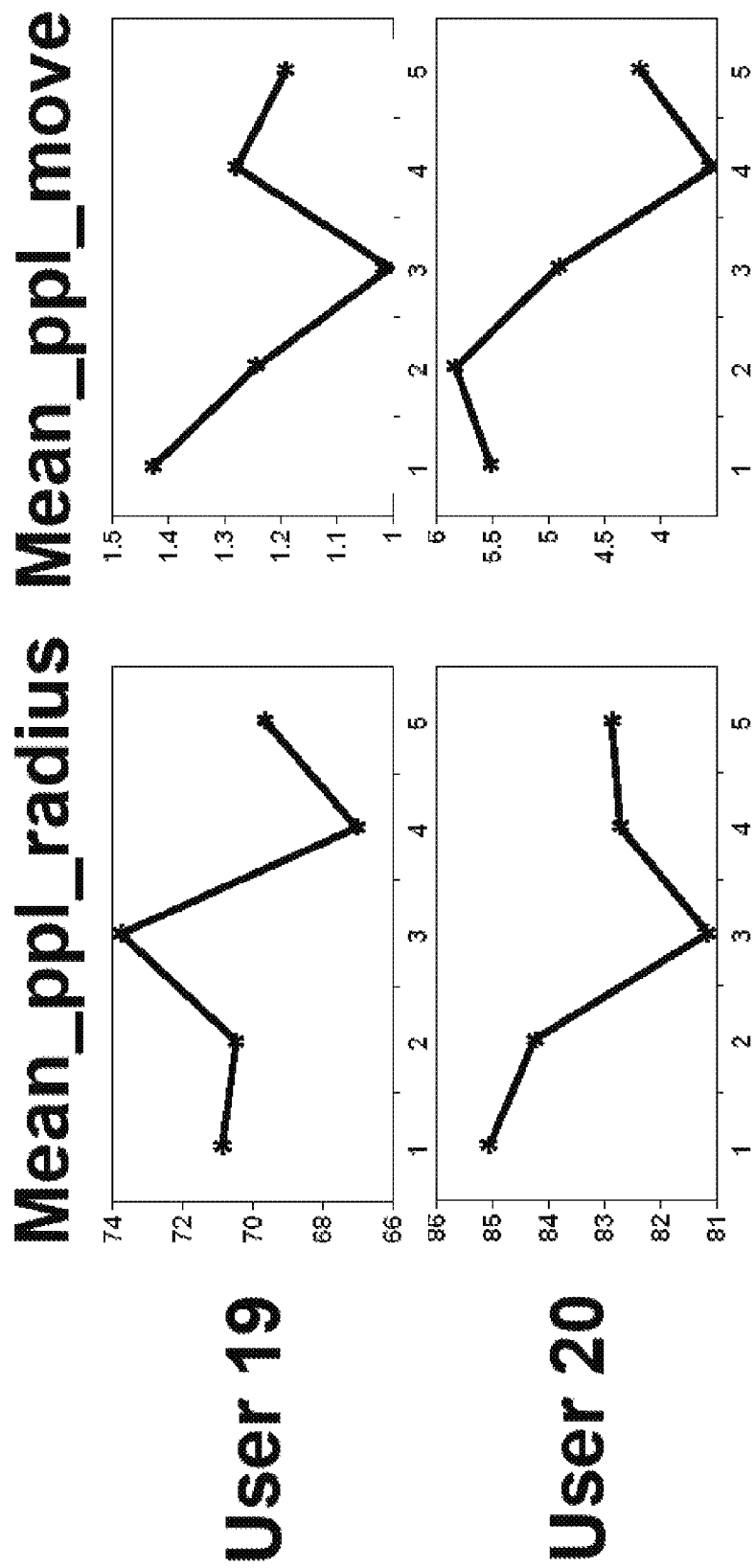
Figure 10-j3

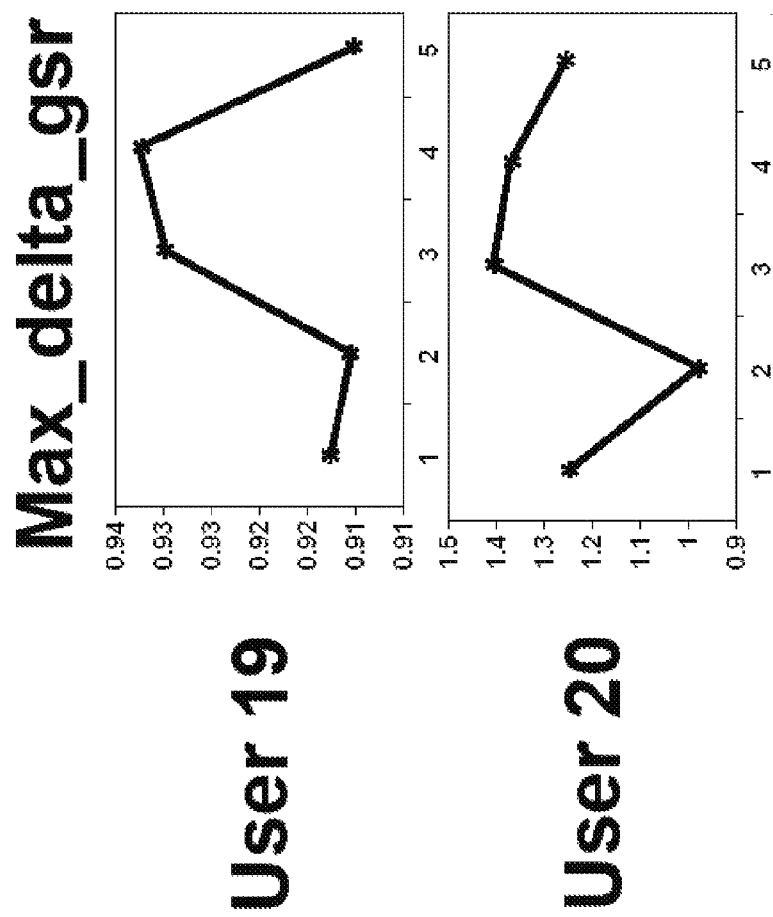
Figure 10-j4

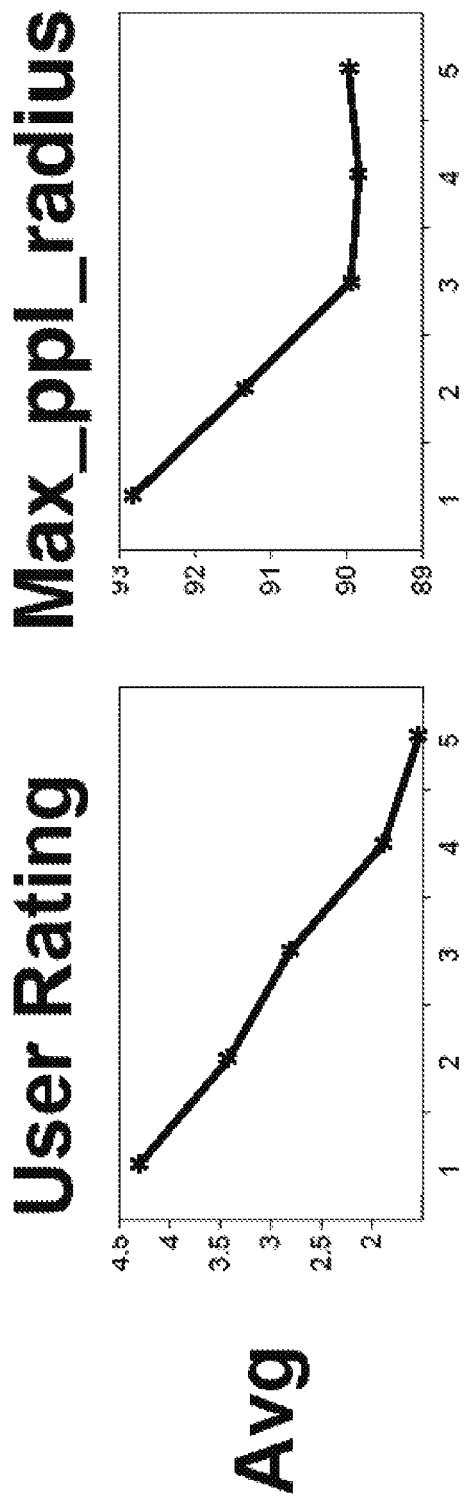
Figure 10-K1

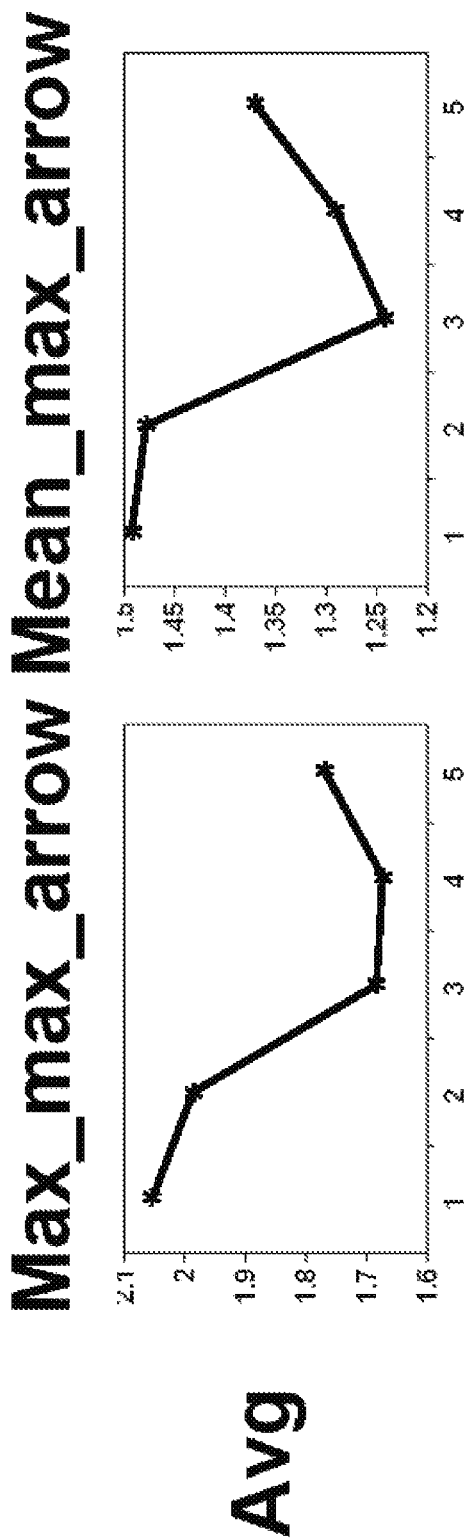
Figure 10-k2

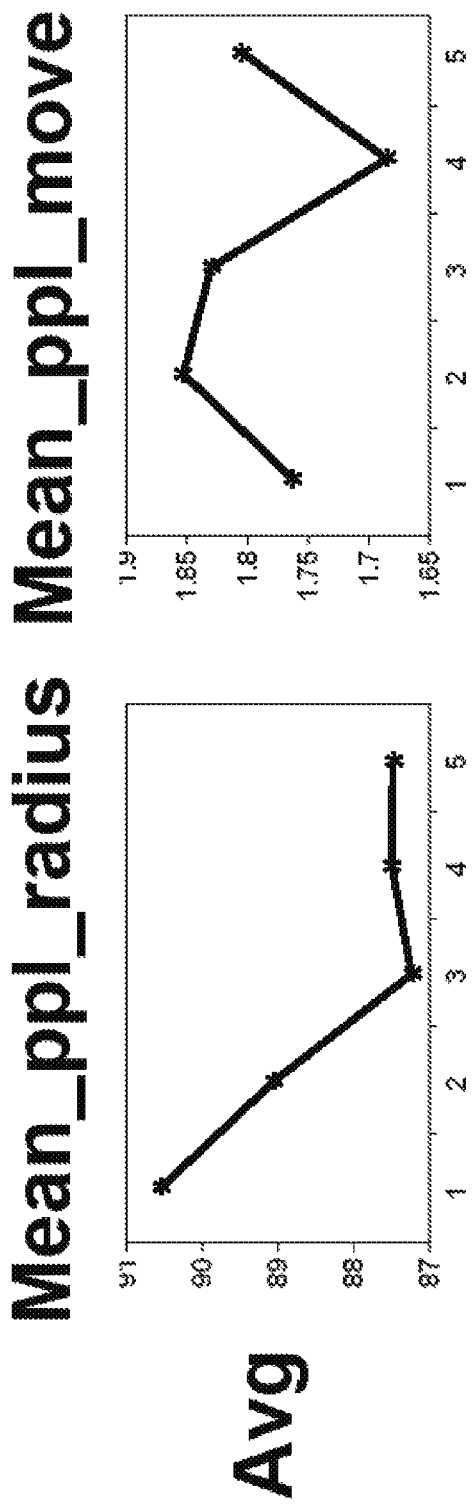
Figure 10-k3

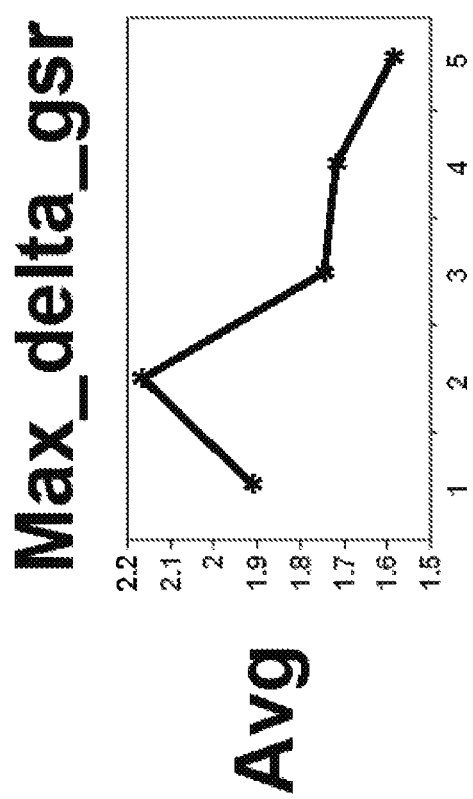
Figure 10-k4

| Figure 10-a1 | Figure 10-a2 | Figure 10-a3 | Figure 10-a4 |
| --- | --- | --- | --- |
| Figure 10-b1 | Figure 10-b2 | Figure 10-b3 | Figure 10-b4 |
| Figure 10-c1 | Figure 10-c2 | Figure 10-c3 | Figure 10-c4 |
| Figure 10-d1 | Figure 10-d2 | Figure 10-d3 | Figure 10-d4 |
| Figure 10-e1 | Figure 10-e2 | Figure 10-e3 | Figure 10-e4 |
| Figure 10-f1 | Figure 10-f2 | Figure 10-f3 | Figure 10-f4 |
| Figure 10-g1 | Figure 10-g2 | Figure 10-g3 | Figure 10-g4 |
| Figure 10-h1 | Figure 10-h2 | Figure 10-h3 | Figure 10-h4 |
| Figure 10-i1 | Figure 10-i2 | Figure 10-i3 | Figure 10-i4 |
| Figure 10-j1 | Figure 10-j2 | Figure 10-j3 | Figure 10-j4 |
| Figure 10-k1 | Figure 10-k2 | Figure 10-k3 | Figure 10-k4 |

Figure 10-l

SYSTEM AND METHOD FOR LEVERAGING HUMAN PHYSIOLOGICAL TRAITS TO CONTROL MICROPROCESSOR FREQUENCY

CROSS-REFERENCE TO RELATED APPLICATIONS/INCORPORATION BY REFERENCE

This patent application makes reference to, claims priority to and claims benefit from U.S. Provisional Application Ser. No. 61/185,372 which was filed on Jun. 9, 2009.

This patent application is related to U.S. Provisional Application Ser. No. 61/185,365 which was filed on Jun. 9, 2009; and U.S. Provisional Application Ser. No. 61/185,381 which was filed on Jun. 9, 2009.

The above-referenced applications are hereby incorporated herein by reference in their entirety.

FEDERALLY SPONSORED RESEARCH OR DEVELOPMENT

This invention was made with government support under grant nos. CNS-0720691, CNS-0721978, CNS-0715612, CNS-0551639, CNS-0347941, CCF-0541337, CCF-0444405, CCF-0747201, IIS-0536994, IIS-0613568, ANI-0093221, ANI-0301108, and EIA-0224449 awarded by the National Science Foundation. The government has certain rights in the invention.

This invention was made with government support under grant nos. DE-FG02-05ER25691 and DE-AC05-00OR22725 awarded by the Department of Energy. The government has certain rights in the invention.

MICROFICHE/COPYRIGHT REFERENCE

[Not Applicable].

FIELD OF THE INVENTION

The present invention relates to architectural optimization and, in particular, architectural optimization aimed at satisfying an end user.

BACKGROUND OF THE INVENTION

Modern architectures execute with no knowledge about the individual user.

Accordingly, there is a need for architectures that are user-aware and that determine whether their users are satisfied. There is also a need for architectural optimization that aims at satisfying the end user.

BRIEF SUMMARY OF THE INVENTION

Some embodiments according to the present invention provide for a system that controls a computer. The system may include, for example, a central processor that runs user-centric applications and one or more biometric input devices that are operatively coupled to the central processor. The one or more biometric input devices may provide information relating to physiological traits of a user of the computer. The central processor may use, for example, the information relating to the physiological traits of the user to provide a physiological traits-based power-management system. The physiological traits-based power-management system may be user-aware, for example, due to the information received from the one or more biometric input devices. The physiological traits-based power-management system may drive, for example, the dynamic voltage and frequency scaling scheme based on user satisfaction levels that strongly correlate with changes in physiological traits of the user.

Some embodiments according to the present invention provide for a method that manages power consumption of a processor. The method may include, for example, one or more of the following: receiving dynamic physiological trait user information generated by biometric input devices; adjusting power consumption of the processor based on the received dynamic physiological trait user information; measuring impact of computer performance on the dynamic physiological trait user information measured by biometric input devices after the power consumption of the processor is adjusted; and reducing the power consumption of the processor with little or no impact on user satisfaction.

Some embodiments according to the present invention use biometric input devices to provide information about a user's physiological traits to a computer. Biometric input devices may include, for example, one or more of the following: an eye tracker, a galvanic skin response sensor, and/or a force sensor.

Some embodiments according to the present invention provide for leveraging physiological traits to control microprocessor frequency.

Some embodiments according to the present invention provide for optimizing, for example, a particular processor-based architecture based on, for example, user satisfaction.

Some embodiments according to the present invention use implicit user feedback to provide higher efficiency, improved reliability, reduced power consumption, increased security, and a better user experience of a computer system.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIGS. 3(a), 3(b), and 3(c) show data from three sensor metrics that display significant changes in the initial user study including FIG. 3(a) mean pupil movement, FIG. 3(b) maximum arrow force, and FIG. 3(c) maximum delta GSR for the same 20 seconds of game play at a good performance level, and at a bad performance level in accordance with one or more embodiments of the present invention.

DETAILED DESCRIPTION OF THE INVENTION

Figure 1:
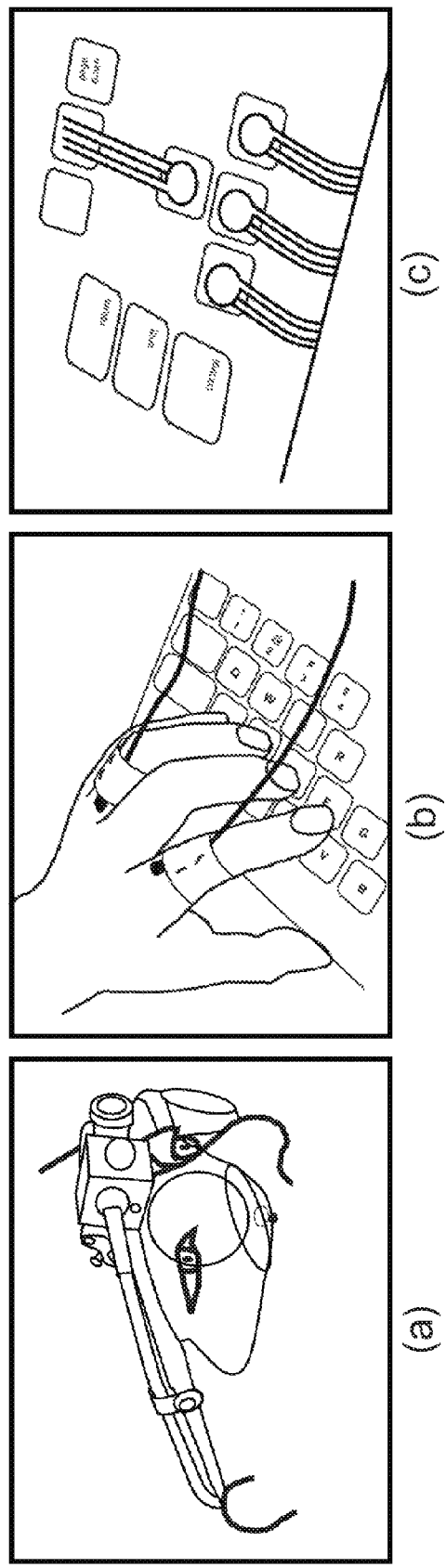
FIG. 1 shows the biometric sensors: (a) an eye tracker, (b) a custom-made galvanic skin response sensor, and (c) force sensors attached to the arrow keys on the keyboard in accordance with one or more embodiments of the present invention.

Some embodiments of the present invention provide architectural optimization that aims at satisfying the end user. If architectures could determine whether their users are satisfied, they could provide higher efficiency; improved reliability, reduced power consumption, increased security, and a better user experience.

One reason for this limitation is based on the input devices. Specifically, some input devices (e.g., the mouse and keyboard) provide limited information about the user. Some embodiments of the present invention provide for biometric input devices that provide the computer information about the user's physiological traits. Some embodiments of the present invention contemplate at least three biometric devices as potential sensors: an eye tracker; a galvanic skin response (GSR) sensor, and force sensors.

We first present two user studies that explore the link between the sensor readings and user satisfaction when the performance of the processor is varied as a video game is being played. In the first study, we drastically drop the processor clock frequency at a set point in the game. In the second study, we set the clock frequency to randomly-selected levels during game play. Both studies show that there are significant changes in human physiological traits as performance decreases. In addition, we show that physiological changes correlate strongly to the satisfaction levels reported by the users. Based upon these observations, we construct a Physiological Traits-based Power-management (PTP) system that can be applied to dynamic voltage and frequency scaling (DVFS) schemes. We apply PTP to a typical CPU-utilization-based adaptive DVFS policy and evaluate our scheme using a third user study.

An aggressive version of our PTP scheme reduces the total system power consumption of a laptop, for example, by up to 33.3% for an application averaged across users (18.1% averaged across three applications), while a conservative version reduces the total system power consumption, for example, by up to 25.6% across users (11.4% averaged across three applications).

One of the possible goals of any architectural optimization is to satisfy the end user. However, the design, optimization, and evaluation of modern computer architectures have largely left the user out of the loop. Architects typically envision the computing stack extending from devices at the bottom to applications at the top. The user, who is the true top of the stack, is often not considered during architectural decisions. Similarly, performance evaluation is often simplified to metrics such as instructions per second (IPS). Although such metrics may be convenient and easy to measure, they do not directly correlate to user satisfaction.

Several trends are converging to increase the usefulness of exploring user-aware computer architectures:

User-centric Applications: Batch applications are not the sole workloads for most architectures. An increasing number of modern applications are designed to interact with a user. Many server-side applications exist to provide services to users over the network. Multimedia applications, video games, and web browsers are common workloads on desktop machines. In addition, applications executing on embedded and portable devices are typically interactive. It is useful for architectures running such user-centric applications to be optimized with the goal of satisfying the user.

Architectural Trade-offs Exposed to the User: Architectures should not naively execute instructions as fast as possible. Due to thermal and power constraints, architectural trade-offs are now directly exposed to the user in the form of shorter battery life, decreased lifetime reliability, annoying performance-limiting thermal emergencies, and higher operating temperatures (causing "burning-lap syndrome"). To balance the trade-off between performance and thermal/power related issues, it is useful for architectures to tune performance to, but not above, for example, the level necessary to meet user needs and expectations.

Optimization Opportunity: Users differ dramatically from each other. Recent studies have shown that there is considerable variation in user expectation and user satisfaction relative to actual hardware performance. Where there is variation, there is an opportunity for optimization. Variation in user expectation has been leveraged for improving power consumption and for efficiently scheduling virtual machines. The benefits result from optimizing to individual users instead of assuming that all users are equal.

We assert that the design of modern architectures may make it difficult (if not impossible) to infer and reason about the end user. One only needs to observe the current computer usage model to understand this assertion. First, the user directs the computer explicitly via input devices (e.g., keyboard or mouse). According to user direction, the computer executes instructions to manipulate machine state. Afterwards, the user obtains information via output devices (e.g., display or speakers). During this human-computer interaction, there may exist a considerable asymmetry between the information available to the user and information available to the computer. Although the user can direct the computer to change or view the system state at any time, the computer executes with little, if any, information about the user state.

Some embodiments according to the present invention provide for balancing this human-computer information asymmetry, for example, by augmenting future architectures with input devices that provide information on user state. Enabling a computer to sense and perceive user state has a number of benefits. For example, understanding user state will enable user-aware optimizations by providing implicit user feedback. Tailoring execution to the individual user's "taste" will result in better efficiency and significant benefits in power savings or increased lifetime reliability. In addition, decisions about resource assignment (e.g., deciding on the level of parallelism of an application running on a chip multiprocessor) can be made more effectively. Furthermore, computer behavior will be personalized based upon individual expectations to improve user satisfaction.

Some embodiments according to the present invention provide for and evaluate the use of biometric input devices that provide information on human state by observing physiological traits. Using physiological readings is an intuitive first step in understanding the user; our experiments suggest that a change in user state results in a number of measurable physiological responses. Some embodiments according to the present invention provide for one or more of the following: an eye tracker to measure pupil dilation and/or eye movement, a galvanic skin response (GSR) sensor to measure skin resistance and/or conductance, and force sensors to measure behavior.

We begin with two user studies to motivate the use of these additional input devices. In the first, we drastically drop the CPU frequency at a set point while a game is being played. In the second, we randomly vary the CPU frequency across multiple settings during game play. We show that the CPU frequency has a significant impact on the physiological traits of the users. We also show that the changes in the physiological traits correlate with the satisfaction levels reported by the participants.

Based upon these observations, some embodiments according to the present invention then construct a Physiological Traits-based Power-management (PTP) system to demonstrate an application of these biometric input devices. PTP may augment, for example, a dynamic voltage and frequency scaling (DVFS) scheme to make user-aware decisions. PTP may adjust, for example, the maximum frequency by incorporating human physiological readings. DVFS is a type of power saving technique available on microprocessors that scales the frequency (and/or voltage) of a microprocessor to reduce power consumption. By adding PTP to a typical CPU-utilization-based DVFS scheme, some embodiments according to the present invention may substantially decrease power consumption with little to no impact on user satisfaction.

It is submitted that computer performance will impact the physiological responses of users. Studies have shown the relationships between physiological sensor readings and reported user emotions in response to interaction with computer programs. However, some embodiments according to the present invention measure the impact of computer performance on human physiological traits.

Some embodiments according to the present invention use biometric input devices such as, for example, eye trackers, galvanic skin response sensors, and force sensors in making architecture-level decisions.

Some embodiments according to the present invention use selected biometric input devices that are able to detect changes in human physiological traits as the performance is altered during the run of an application.

Some embodiments according to the present invention demonstrate a user-aware system for augmenting DVFS and evaluate the system, for example, with another user study.

To support user-aware computer architectures, computers may provide for means to understand user satisfaction. Although it is possible to explicitly ask the user for information, this may be annoying. The ability to implicitly determine the degree of user satisfaction would be useful. Unfortunately, current architectures are not equipped to implicitly estimate user satisfaction. This may be due to a limitation of current input devices. Traditional input devices mainly exist to allow the user to explicitly control the machine state. However, they provide little information about physiological state. Without any information about user state, a computer cannot reason about user satisfaction. To help bridge this gap, some embodiments according to the present invention provide for the addition of biometric sensors in architectures. Although some embodiments according to the present invention use eye trackers, galvanic skin response sensors, and/or force sensors, the present invention need not be so limited.

Eye behavior reveals a lot of information about users' state. We are particularly interested in pupil dilation and pupil movement. Pupil dilation, or changes in the pupil radius over time, has been shown to correlate to many external and internal human factors. Studies show pupil dilation to be related to mental workload, perceptual changes, and positive/negative affect or emotion processing. Pupil movement provides another source of information. Even when viewing a still image, humans do not keep their eyes steady. Instead, the eye constantly looks around finding interesting parts of each scene to create a larger mental map of the whole scene. Changes in the behavior of eye movement may also indicate higher level changes in the scenery, or human interests/state. For example, saccades (e.g., fast simultaneous movement of both pupils) have been linked to boundaries of event perception.

Some embodiments according to the present invention use the ASL MobileEye eye tracker, shown in FIG. 1(a), for collecting eye-related information. The eye tracker uses video-based combined pupil/corneal reflection to track the focus of the user's right eye. A video feed is analyzed to extract the pupil location and pupil radius. The data gathered is in pixels relative to the video feed, and is sampled 30 times per second. Pupil dilation is measured by using the pupil radius samples from the eye tracker. Pupil movement is measured using the Euclidean distance between consecutive samples of the pupil X-Y coordinates.

Some embodiments according to the present invention use galvanic skin response (GSR) which measures the skin's ability to conduct electricity. GSR is strongly, but not completely, correlated to the conductance of sweat in sweat glands in skin. GSR acts as an indicator of the autonomic nervous system reflecting both sympathetic (e.g., fight-or-flight response) as well as parasympathetic (e.g., rest or relaxation) response. In general, a low conductance is a sign of relaxation and high conductance is a sign of mental, emotional, and/or physical arousal. However, different emotions may produce discriminable waveforms.

Some embodiments according to the present invention use a custom-made galvanic skin response (GSR) sensor which is shown in FIG. 1(b). The GSR sensor includes two probes attached to velcro strips that are wrapped around the user's fingers during experiments. The two probes are wired in a voltage divider circuit for measuring the voltage (and therefore the resistance and/or conductance) across the skin.

Figure 2:
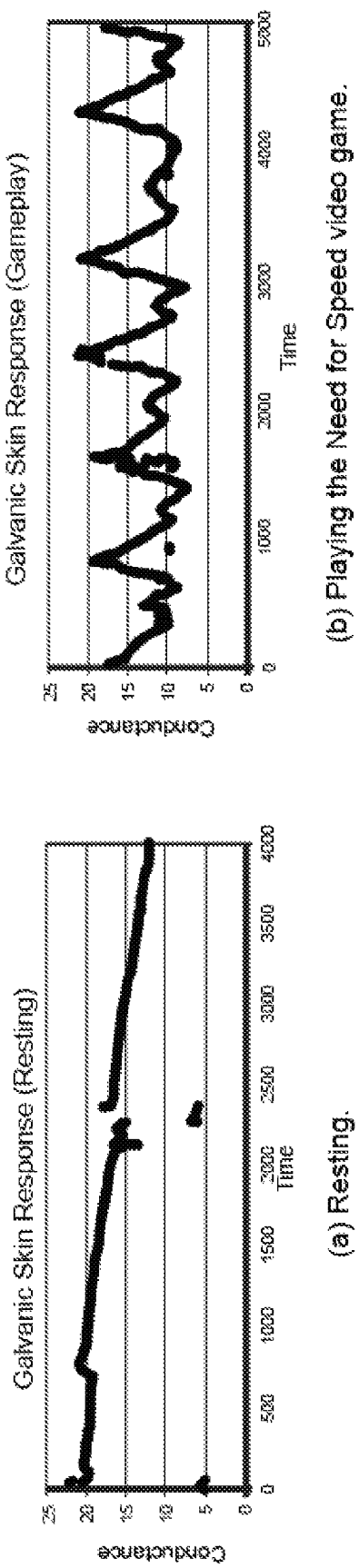
FIG. 2 shows GSR traces of a user that capture (a) the long-term change in the GSR while a user is resting and (b) the short-term effects when playing, for example, the Need for Speed game in accordance with one or more embodiments of the present invention.

GSR readings show long-term and short-term effects. For example, two sample GSR traces for one of the inventors are shown in FIG. 2. FIG. 2(a) shows the GSR when resting and FIG. 2(b) shows the GSR when playing the Need for Speed computer game. At rest, the GSR does not stay constant. Rather, it slowly decreases over a period of 5-10 minutes and then slowly levels out. When excited during game play, the GSR exhibits a much more varied response. To measure short-term changes in user arousal, and filter out the long-term trends, some embodiments according to the present invention use a metric that called delta GSR, which resembles a metric "hash GSR." Delta GSR is computed by taking the difference between consecutive samples and filtering out the negative values. When summed over a period of time, the delta GSR serves as a metric for the total user arousal for the time period. Some embodiments according to the present invention sample at 30 Hz and use a period of one second.

Some embodiments according to the present invention use force sensors (shown in FIG. 1(c)) to collect behavioral information about the user. Studies in keystroke dynamics have shown that keystroke patterns for a given user are correlated with various emotional states. However, the force of each key press might hold additional information not captured by timing alone. For example, users may press the keys harder to express annoyance, or during times of intense involvement in game play. Also, for some applications, the range of keys involved is quite limited, and force may provide more information than keystroke patterns. Some embodiments according to the present invention use the correlation between keystroke force and user satisfaction.

Some embodiments according to the present invention use force-sensitive resistors to instrument each of the four arrow keys, as shown in FIG. 1(c). The force sensors are measured using a voltage divider circuit. The maximum pressure value among all measured keys yields a single metric for comparison, which we will refer to as MaxArrow. The sampling rate is 30 Hz, for example.

Some embodiments according to the present invention measure one or more readings from the biometric input devices including, for example: pupil dilation, pupil movement, delta GSR, and arrow-key force. As the readings are gathered, they can be summarized using various statistics. For each reading, for example, the maximum, arithmetic mean, and the variance of the readings every second may be considered. The term sensor metric may be defined to be, for example, a specific combination of a statistic and a biometric reading. Sensor metrics may be formatted as follows: <statistic>_<sensor>. For example, the arithmetic mean of the pupil movement may be denoted by Mean_PupilMovement.

The intrusiveness of sensors is a factor to be considered for using them as biometric input devices. Ideally, biometric input devices will not impede the use of the computer in any way, use little effort by the user, and not incur significant financial cost. Sensors may be selected based on at least some of these principles. Consumer "remote eye tracking" products are available which detect eye focus and pupil radius without a head-mounted system. Further research into this area is likely to lower the cost of these systems. Modern laptops contain built-in cameras and image recognition software exists for detecting pupils. The electrical components used to measure GSR are inexpensive. While the velcro-strip contacts may be considered too cumbersome, these contacts have also successfully been integrated into a computer mouse in a way that uses no explicit action by the user. Integrating force sensors into a computer keyboard would do little change to the existing structure and piezoresistive force sensors are inexpensive; the force sensors used with some embodiments according to the present invention are currently available for under $15 per sensor.

Our experiments are done using an IBM Thinkpad T61 with a 2.2 GHz Intel Core 2 Duo T7500 processor and 2 GB DDR2 SDRAM running Microsoft Windows XP. The laptop is tethered to power for experiments. The processor supports seven frequency levels using Intel Enhanced SpeedStep Technology (2.2 GHz, 1.6 GHz, 1.2 GHz, 800 MHz, 600 MHz, 400 MHz, and 200 MHz). However, the present invention need not be so limited. In our experiments, we use the top five frequencies ranging from 2.2 GHz to 600 MHz.

Data from the GSR and force sensors is collected using a National Instruments 603E data acquisition card connected to the PCI bus of a separate workstation. The workstation then sends the sensor information through a TCP socket to the laptop over a private LAN connection.

Some embodiments according to the present invention employ one or more of the following applications:

Need for Speed Pro Street: A 3D driving game against the computer. The game is very CPU-intensive.

Tetris Arena: A 3-D version of the classic puzzle game. The game consumes 100% of the CPU. However it exhibits little performance degradation as the frequency is decreased.

Microsoft Word 2000 Version 9.0: The user is given a document to reproduce in Microsoft Word. In general, Microsoft Word is not CPU intensive. However, we include some high-quality images into the document. Moving the images occasionally causes short bursts of high CPU utilization.

We developed a user pool by advertising our studies within Northwestern University. The participants come from a variety of backgrounds and include males and females, engineers and non-engineers, as well as inexperienced computer users.

One of the goals is to show how human physiological traits can be used as an implicit measure for inferring user satisfaction. We present two user studies exploring the link between human physiological readings and user satisfaction.

The first user study explores whether there are changes in human physiological traits when the performance of the processor is changed. One of our concerns was that the measurement noise during game play may mask any changes in physiological traits. It is not difficult to imagine possible sources of noise. For example, in a driving game, a difficult section of tight turns may produce different measurements than another section with a long straightaway. Due to this concern, we first conduct a controlled initial user study with 14 users. During the study, we ask the users to play the Need for Speed game twice. Each time, at a predetermined position on the racetrack, we either maintain the highest frequency, or drop the frequency to 600 MHz (e.g., the lowest frequency) for 20 seconds. At 600 MHz, the game greatly slows down. During the 20 seconds, we measure statistics from each of the physiological sensors.

Figure 3B:
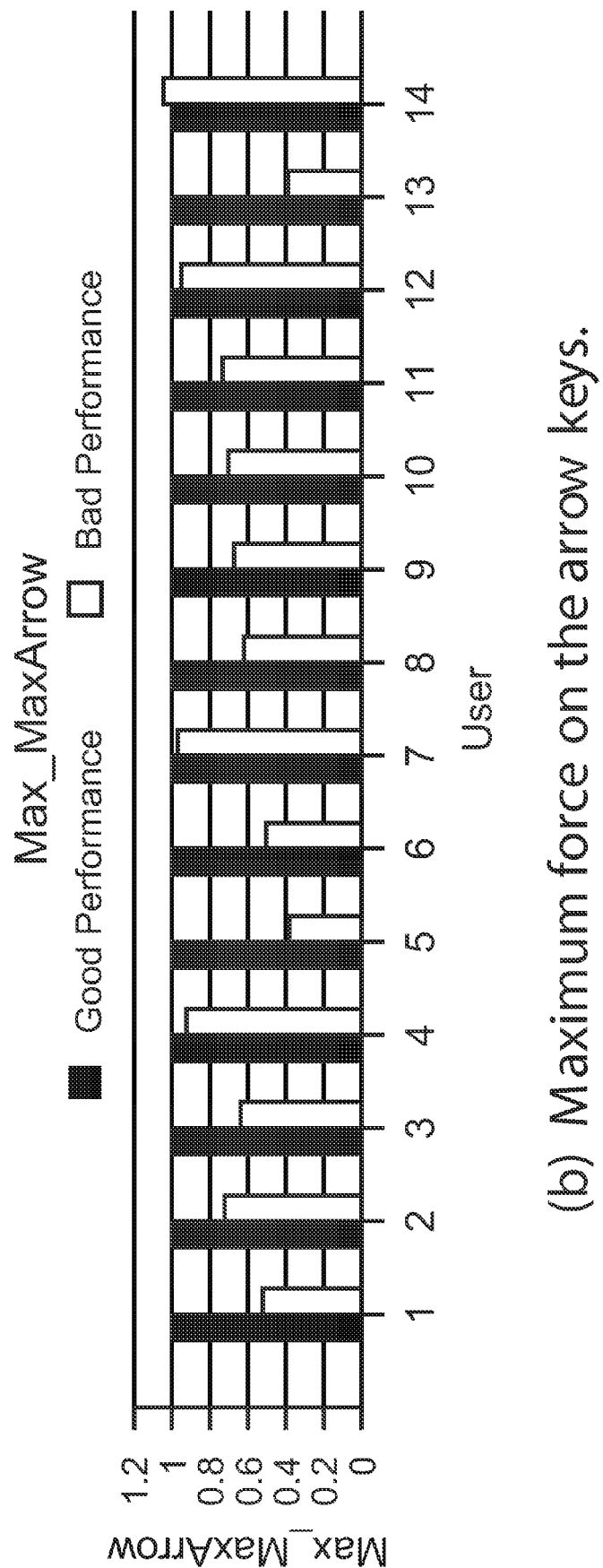
Figure 3C:
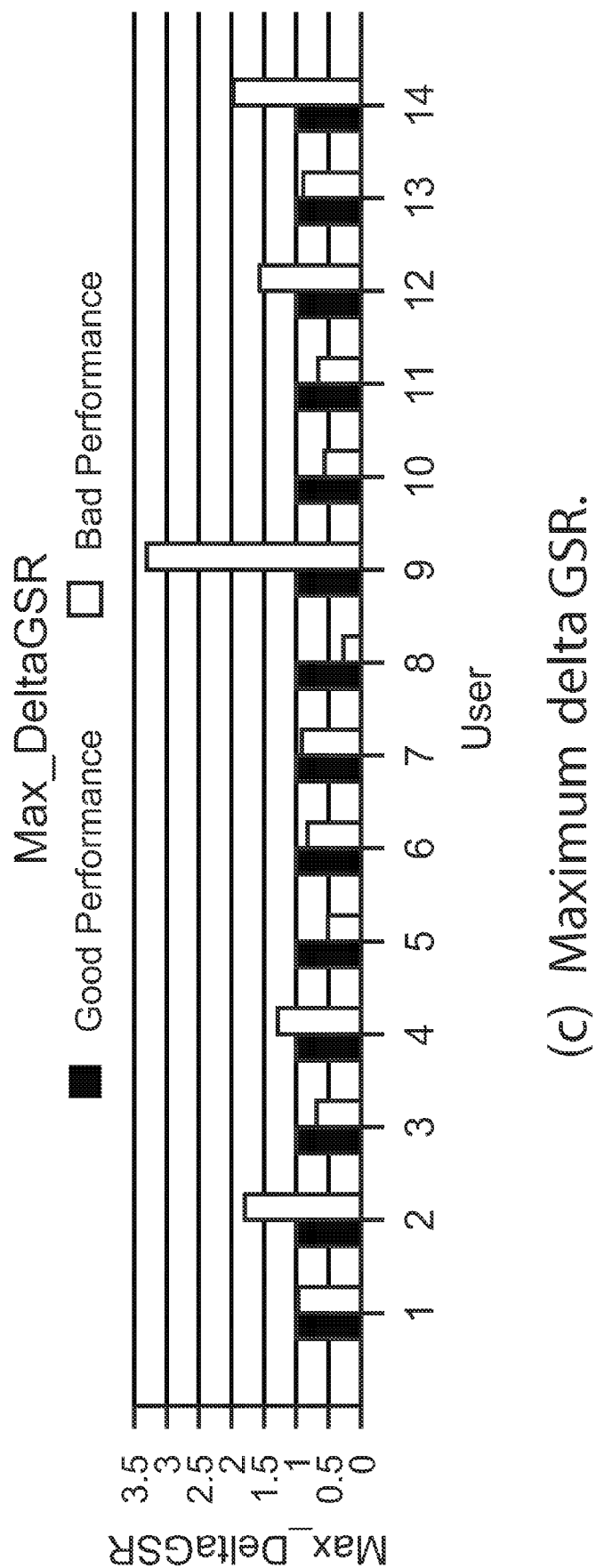
Figure 4A:
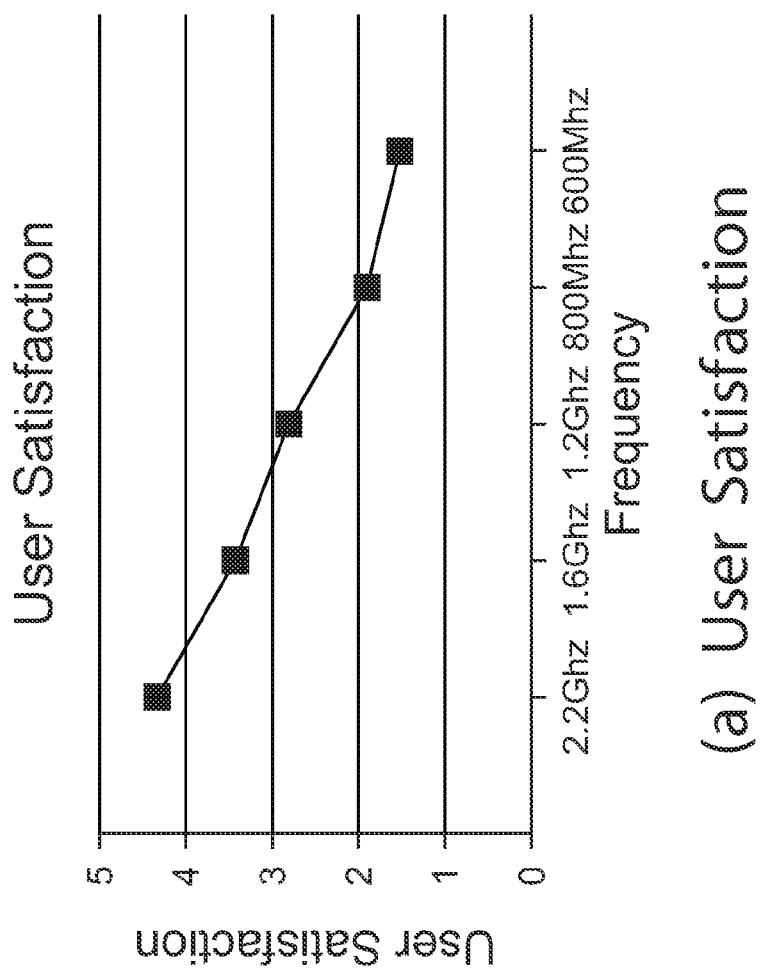
FIGS. 4(a), 4(b), 4(c), and 4(d) show averages of the three best individual sensor metrics and the user satisfaction ratings across all 20 users in accordance with one or more embodiments of the present invention.
Figure 4B:
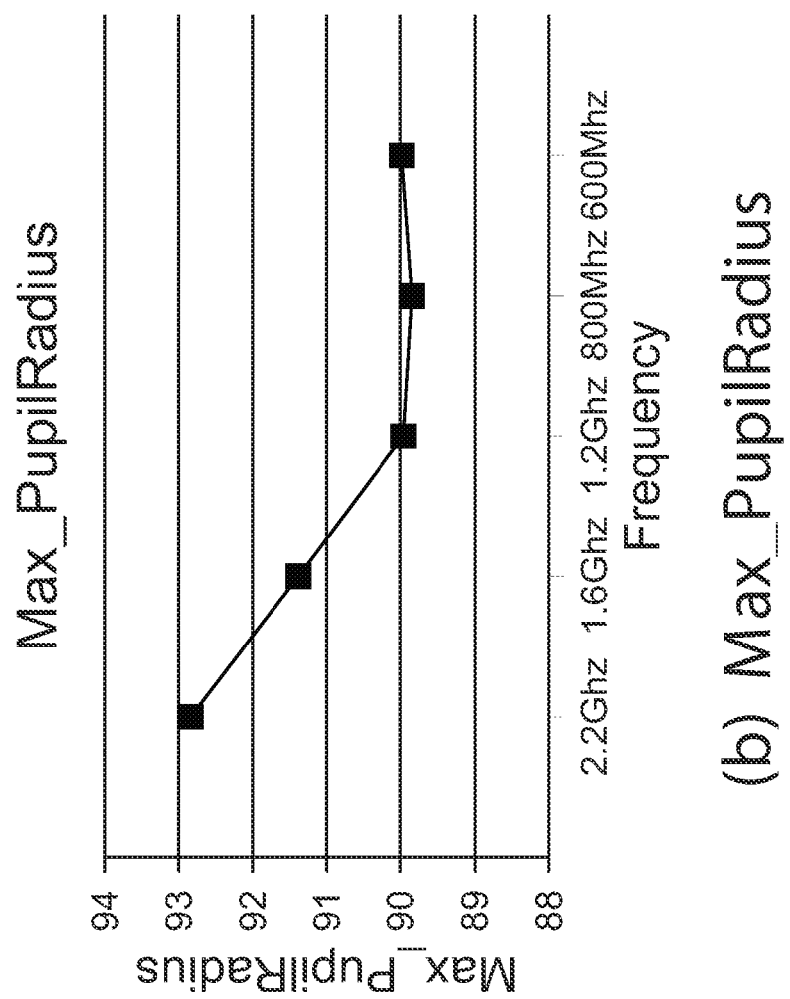
Figure 4C:
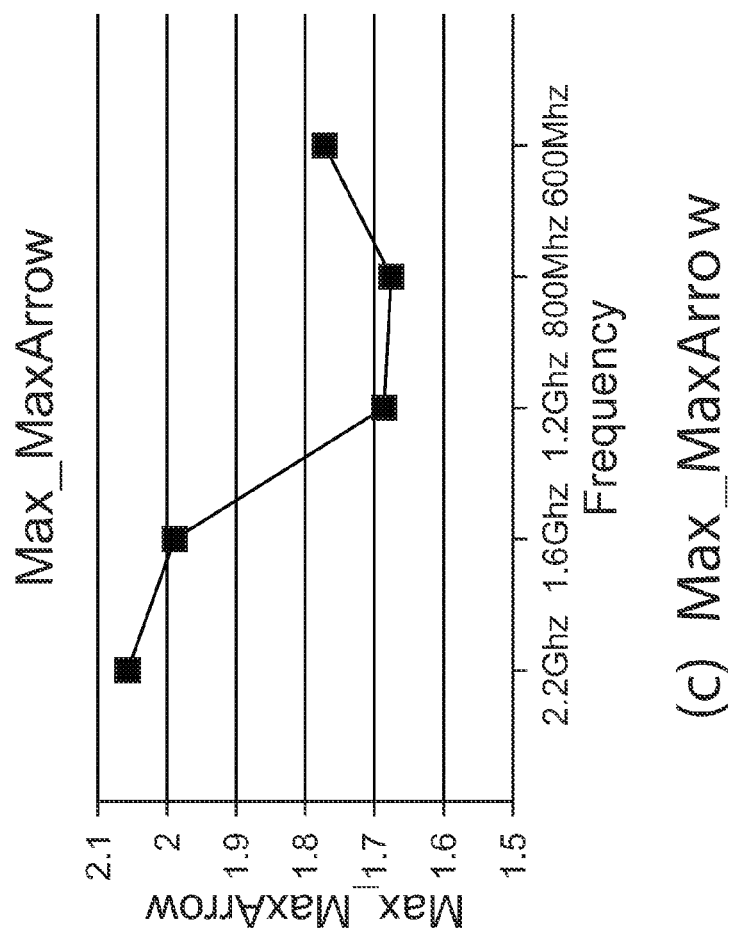
Figure 4D:
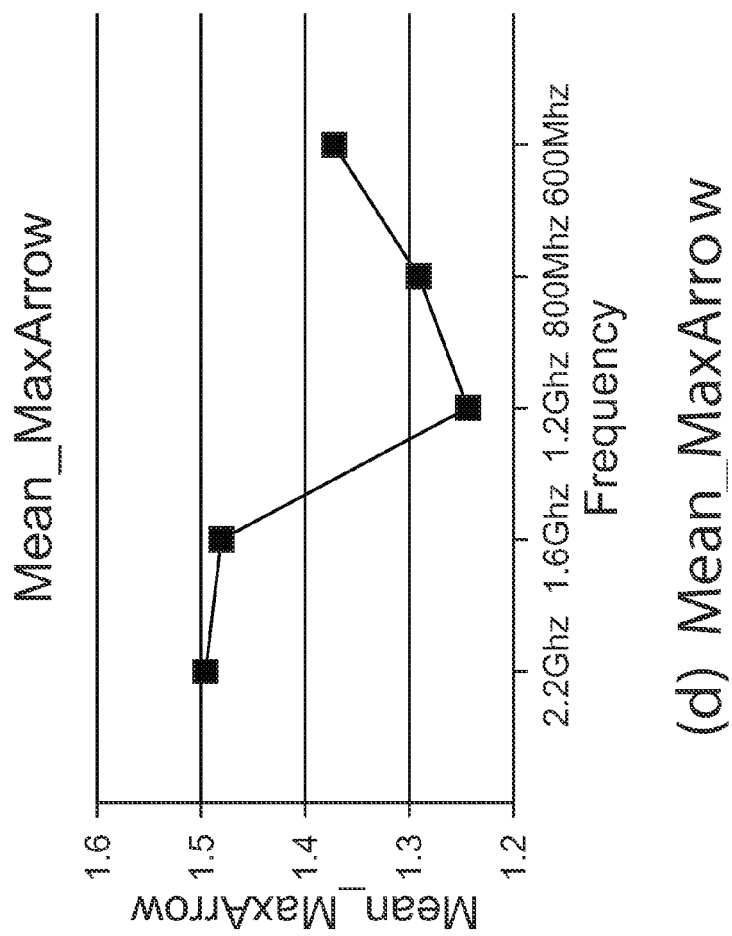

FIGS. 3(a), 3(b), and 3(c) show the data from three of the sensor metrics that display significant changes in the initial user study. Mean eye movement, shown in FIG. 3(a), decreases for the large majority of the users. The maximum force on the arrow keys, shown in FIG. 3(b), also registers a noticeable decrease for most users. The maximum delta GSR, shown in FIG. 3(c), shows a relative change for many of the users. However, it increases for some users and decreases for others. The difference in users may be attributed to varying emotional reactions to a slow system: some users become annoyed and more aroused, while others become bored and less involved. Nevertheless, the results indicate that both arousal-based sensors (e.g., DeltaGSR) and behavioral sensors (e.g., MaxArrow) do indeed change significantly as application performance is decreased.

With the knowledge that the sensor metrics do indeed change with performance, we conduct a second study to explore the effect of random game phases and the correlation between physiological readings at different performance levels and user satisfaction. The users play the Need for Speed game. This time, the processor speed is changed to a random frequency at a random point in the game. The change in performance lasts for 30 seconds. We randomly visit each frequency level twice; the first time we collect sensor metric readings, and the second time we verbally ask the user for a satisfaction rating. Users report their satisfaction as follows: 5 (Very Satisfied), 4 (Satisfied), 3 (Indifferent), 2 (Unsatisfied), and 1 (Very Unsatisfied).

A good sensor metric will report as different when the user satisfaction changes and as similar when user satisfaction remains the same. To distinguish between sensor metrics at different frequencies, we employ a t-test-based similarity metric. As the physiological sensors are noisy by nature, we use multiple samples and statistical methods. Both the data acquisition card (e.g., for collecting GSR and force information) and the eye tracker sample at 30 Hz. Each second, we compute the sensor metrics based on 30 samples. After discarding the first and last five seconds of each 30 seconds interval, we have 20 calculated values per sensor metric. We then use a t-test, with a 90% confidence interval, as our metric for measuring the similarity between sets of values from different frequencies.

TABLE 1

| Sensor Data | Success Rate | False Positive | False Negative |
|---|---|---|---|
| Max_PupilRadius | 70.2% | 14.3% | 15.5% |
| Max_MaxArrow | 69.0% | 13.1% | 17.9% |
| Mean_MaxArrow | 69.0% | 13.1% | 17.9% |
| Mean_PupilRadius | 67.9% | 11.9% | 20.2% |
| Mean_PupilMovement | 57.1% | 13.1% | 29.8% |
| Max_DeltaGSR | 58.3% | 9.5% | 32.1% |

Outcomes of comparing the t-test-based similarity metric and user satisfaction. Success means that the t-test outcome matches the user rating. False negatives occur when the t-test falsely predicts a difference and false positives occur when the t-test falsely predicts similarity with the highest frequency.

We now evaluate the behavior of our sensor metrics across multiple frequencies. For every sensor metric, we use the t-test-based similarity metric to compare each frequency with the highest frequency. The assumption is that if the user is annoyed, the t-test should indicate that the two sets are different; if the user is not annoyed, the t-test should indicate that the two sets are similar. We then manually compare the t-test results with the reported user satisfaction. The sensor metric a success if (1) the t-test indicates a difference and the user satisfaction changes, or (2) the t-test indicates similarity and the user satisfaction does not change. False positives occur when the t-test indicates a difference, but the user satisfaction is the same. False negatives occur when the t-test indicates similarity, but the user satisfaction is different.

Out of our twelve potential sensor metrics (maximum, mean, and variance for pupil radius, pupil movement, delta GSR, and force feedback), we develop a set of the six best individual sensor metrics, shown with their respective counts in Table 1. The success rates of the six sensor metrics are all above 60% with the top three predicting similar/different user satisfaction with nearly 70% accuracy. The false positive rate ranges from 11.9%-14.3% and the false negative rate ranges from about 15.5%-32.1%. The false positive rate implies a lost opportunity for reducing frequency, but no reduction in user satisfaction. Assuming, for example, that the sensors are independent, combinations of them may be used to reduce the false negative rate. Furthermore, any DVFS algorithm based on these sensors could treat the sensor readings conservatively, reducing the effect of false negatives. In a system according to some embodiments of the present invention, we use combinations of sensors and evaluate both aggressive and conservative uses of their readings. These results show that there is a strong correlation between changes in satisfaction and changes in the physiological readings.

Figures 10, 11, 12, 13, 14:
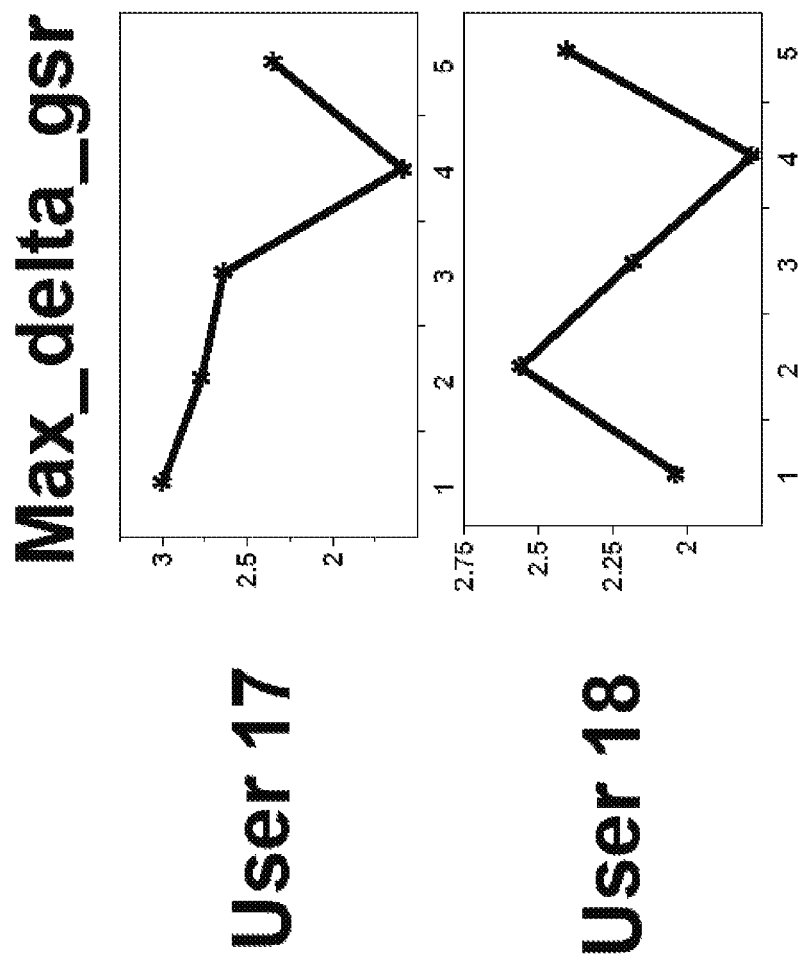
FIGS. 10(a1), 10(a2), 10(a3), 10(a4), 10(b1), 10(b2), 10(b3), 10(b4), 10(c1), 10(c2), 10(c3), 10(c4), 10(d1), 10(d2), 10(d3), 10(d4), 10(e1), 10(e2), 10(e3), 10(e4), 10(f1), 10(f2), 10(f3), 10(f4), 10(g1), 10(g2), 10(g3), 10(g4), 10(h1), 10(h2), 10(h3), 10(h4), 10(i1), 10(i2), 10(i3), 10(i4), 10(j1), 10(j2), 10(j3), 10(j4), 10(k1), 10(k2), 10(k3), 10(k4), and 10l show physiological traits and user satisfaction when randomly changing to multiple frequencies at different points in Need for Speed in accordance with one or more embodiments of the present invention.

To confirm our findings for the entire set of users, we average the sensor metrics across all users and look for trends. FIGS. 4(a), 4(b), 4(c), and 4(d) show the averaged data for user satisfaction and the top three sensor metrics. There is a clear correlation between our sensor metrics and user satisfaction. For reference, the rest of the raw data is shown in FIGS. 10(a1), 10(a2), 10(a3), 10(a4), 10(b1), 10(b2), 10(b3), 10(b4), 10(c1), 10(c2), 10(c3), 10(c4), 10(d1), 10(d2), 10(d3), 10(d4), 10(e1), 10(e2), 10(e3), 10(e4), 10(f1), 10(f2), 10(f3), 10(f4), 10(g1), 10(g2), 10(g3), 10(g4), 10(h1), 10(h2), 10(h3), 10(h4), 10(l1), 10(l2), 10(l3), 10(l4), 10(j1), 10(j2), 10(j3), 10(j4), 10(k1), 10(k2), 10(k3), 10(k4), and 10l. The sensor metrics exhibit some noise across users but, overall, these results show that a change in user satisfaction generally results in a change in sensor readings. This behavior, together with the high prediction accuracy, shows that user satisfaction and physiological traits are correlated.

FIGS. 10(a1), 10(a2), 10(a3), 10(a4), 10(b1), 10(b2), 10(b3), 10(b4), 10(c1), 10(c2), 10(c3), 10(c4), 10(d1), 10(d2), 10(d3), 10(d4), 10(e1), 10(e2), 10(e3), 10(e4), 10(f1), 10(f2), 10(f3), 10(f4), 10(g1), 10(g2), 10(g3), 10(g4), 10(h1), 10(h2), 10(h3), 10(h4), 10(l1), 10(l2), 10(l3), 10(l4), 10(l1), 10(l2), 10(l3), 10(l4), 10(k1), 10(k2), 10(k3), 10(k4), and 10l present the raw data for six of the sensor metrics. The results for each user is presented in a row in the table of graphs and each column corresponds to a different sensor metric (e.g., the first column presents the reported user satisfaction level). In each of the graphs, the x-axis represents the frequency with 1 being the highest (2.2 GHz) and 5 being the lowest frequency (600 MHz). The y-axis represents the user satisfaction rating for the first column and the mean of the sensor readings for the remaining columns. The raw data shows that the sensor metrics can be noisy. However, in general, a change in the user satisfaction is reflected by a change in sensor metrics. If we consider the average behavior (e.g., presented in the last row), we see that most sensors show a strong relation to the user satisfaction levels.

Figure 5:
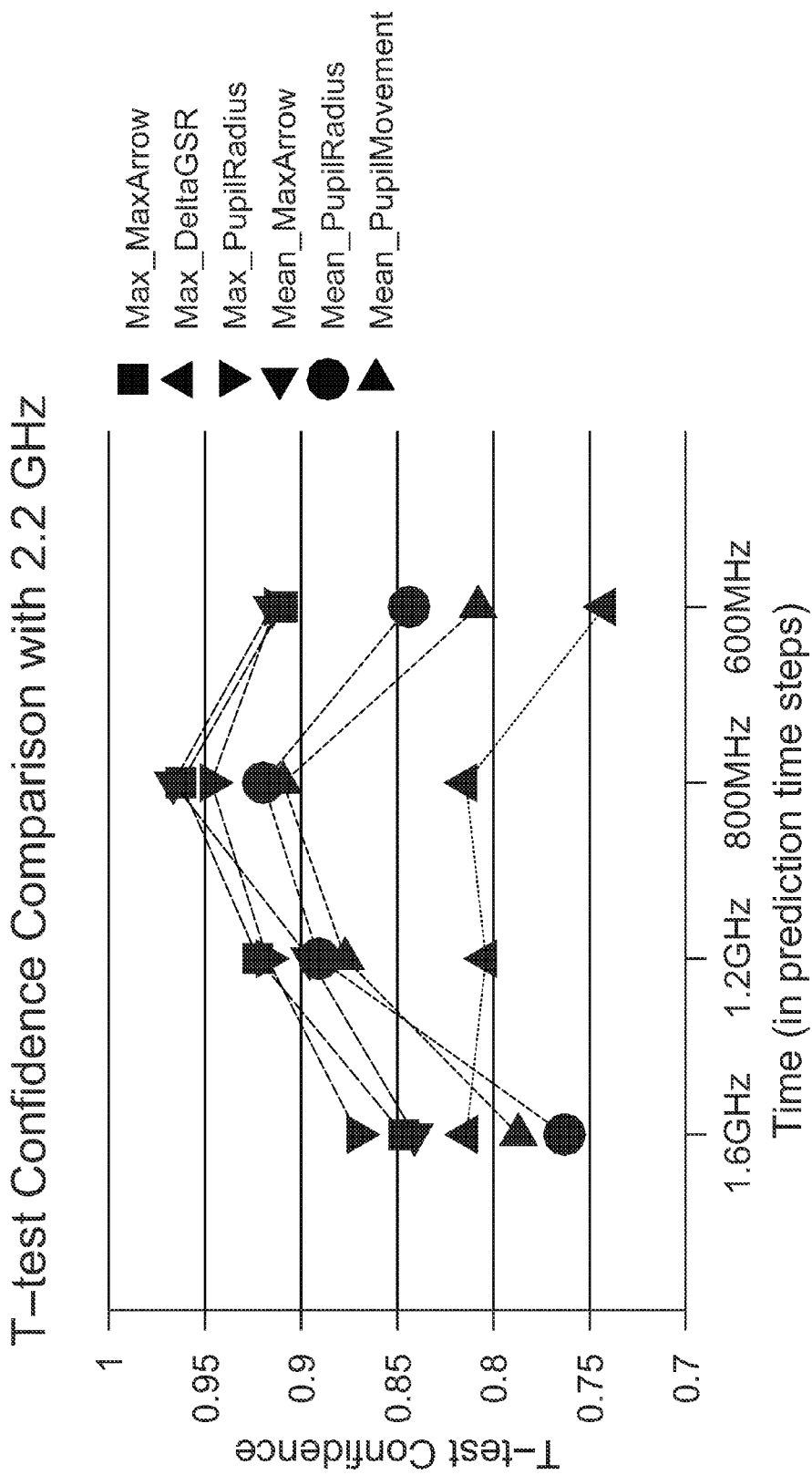
FIG. 5 shows the average confidence provided by the t-test-based similarity metric between a frequency and the highest frequency across all 20 users and all sensor metrics in accordance with one or more embodiments of the present invention.

We now consider the confidence level reported by the t-test for each comparison. A high confidence level indicates that the two sets of data being tested are different. FIG. 5 shows the average confidence levels across all users for each comparison. As performance decreases, confidence that the user satisfaction is different tends to increase. This signifies that the physiological readings differ more at lower performance levels. However, the lowest frequency level does not follow the same trend. We postulate that at this frequency level, the performance is so low that some users stop caring about the game. During the user studies, we recall users complaining about the performance and talking to the proctor instead of playing the game. It is possible that the sensor readings may change in such situations. Nevertheless, even for this case, the sensor readings show significantly different behavior when compared to the highest frequency.

We have to determine how to decide when two readings are different. According to our subjective observations, the Need for Speed game exhibits very similar performance at 2.2 GHz and 1.6 GHz, but the performance quickly decreases at lower frequencies. A confidence level of 85% makes this distinction correctly when averaging across all users, and continues to distinguish correctly for a different set of users in the third study. Thus, we adopt an 85% confidence level in the t-tests for the rest of the detailed description.

In summary, these two initial user studies indicate that a drastic drop in performance results in noticeable changes in our sensor metrics and physiological readings can be used to infer user satisfaction.

To demonstrate a use of empathic inputs, some embodiments according to the present invention contemplate that construction of a Physiological Traits-based Power-management (PTP) system for inferring user satisfaction from physiological readings and driving a DVFS algorithm.

The goal of PTP is to determine the minimum operating frequency that maintains user satisfaction. Specifically, PTP first runs a training phase with the target application. The algorithm for the training phase is detailed in Algorithm 1. PTP begins by comparing sensor readings at the second-highest frequency and the readings at the highest frequency.

---

Algorithm 1 PTP training algorithm
    Frequency: f ← MAX_FREQ-1
    while f is in frequency range do
        if TestSame(MAX_FREQ, f) then
            f ← f − 1
        else if Majority vote of 3 calls to Test-
        Same(MAX_FREQ, f) is true then
            f ← f + 1
        else
            while f is in frequency range and Majority vote of 3
            calls to TestSame(MAX_FREQ,f) is false do
                f ← f + 1;
    return f
Algorithm 2 TestSame: used by the PTP training algorithm
    Two frequencies to test: f1, f2
    Collect sensor metrics at f1 for 20 seconds
    Collect sensor metrics at f2 for 20 seconds
    t-test each sensor metric at f1 and f2 with confidence level
    of 85%
    if more than 50% of sensor differ then
        return false
    else
        return true

---

Each comparison (e.g., detailed in Algorithm 2) includes running for 20 seconds at the highest frequency, running for 20 seconds at the testing frequency, and a t-test between each of the sensor metrics. Initially, the algorithm aims at quickly reducing the frequency, if possible. The algorithm consecutively tests the frequencies for noise in the sensors. If two out of three tests report that the sensor metrics have changed, the majority vote test concludes that the two frequencies are the different; if not, it reports they result in the same user satisfaction. PTP repeats the majority vote for each frequency until it finds a frequency that does not pass. Then, it starts moving up from this point until it finds the level that passes the majority test. This frequency is called the settled frequency. Settled frequency is used as the maximum frequency during the execution of this application. In other words, according to some embodiments of the present invention, the operating frequency is never increased to above the settled frequency.

From the user's perspective, the training and testing phases are not visible. The user simply interacts with the computer as normal.

Figure 6:
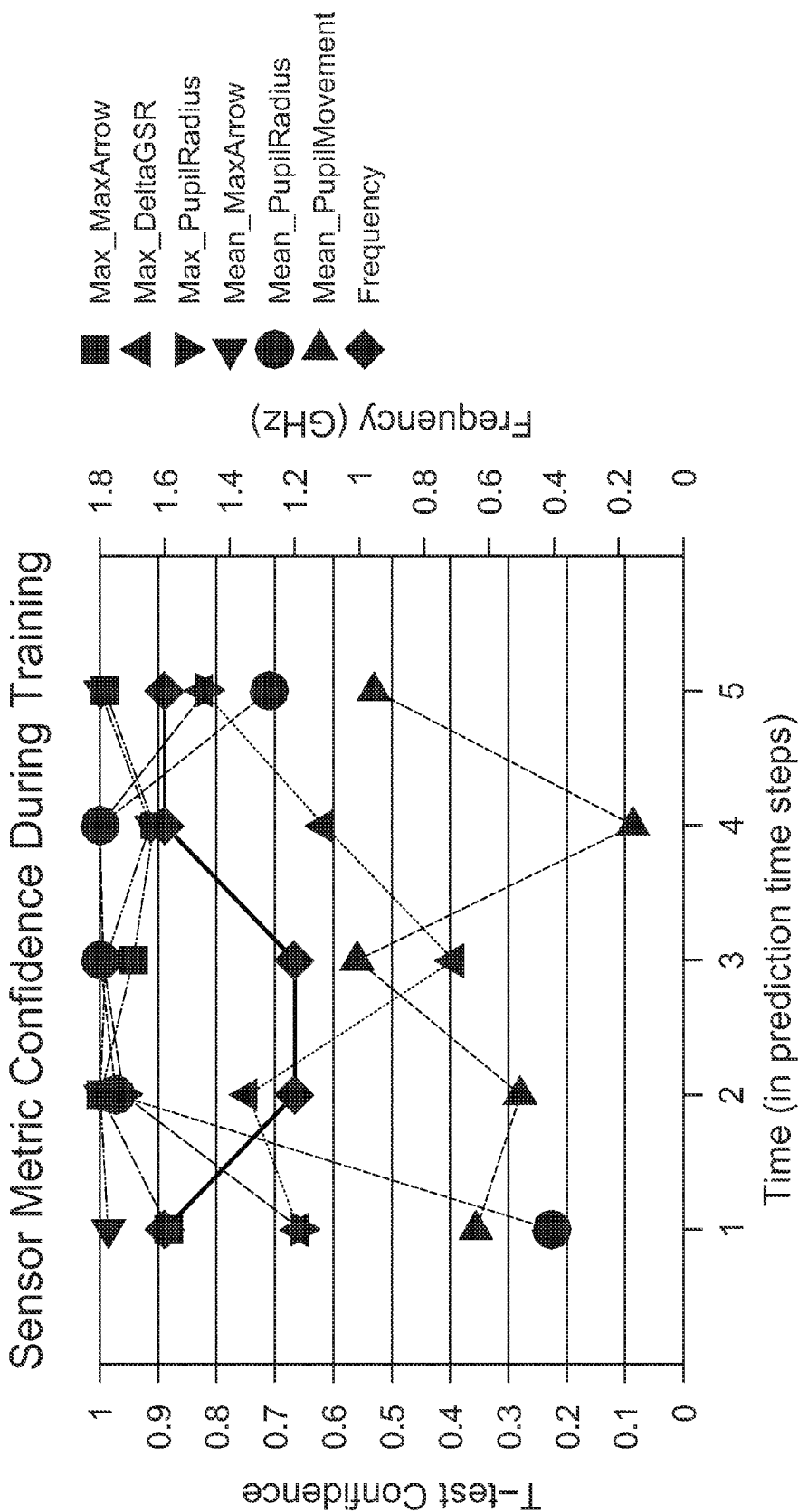
FIG. 6 shows trace of sensor metrics and the frequency during the training phase of the PTP algorithm in accordance with one or more embodiments of the present invention.

An example of the interaction between the sensor metrics and PTP training is shown in FIG. 6. FIG. 6 shows a trace of the algorithm as it settles on a frequency (in this case, 1.6 GHz). The x-axis is time. Each step represents a 40 second period: 20 seconds at the highest frequency, and 20 seconds at the test frequency. The bold line with diamonds shows the test frequency, corresponding to the right vertical axis. The confidence levels of the t-tests for each sensor metric is shown in each time step, with the confidence indicated by the left vertical axis. A confidence above 85% indicates that the sensor metric differs between the two frequencies. We begin at 1.6 GHz. At this point, only 2 of the 6 sensors are different so we continue down to 1.2 GHz. At 1.2 GHz, there is a large change in Mean_PupilRadius. In fact, Max_MaxArrow, Mean_PupilRadius, Mean_MaxArrow, and Max_PupilRadius all exhibit high confidence for two tests and therefore reject the majority vote test for 1.2 GHz. The frequency increases to 1.6 GHz, and the sensor metrics return to values indicating that the sensors are the same, thus predicting the user is satisfied. The algorithm settles at this frequency.

---

Algorithm 3 Linux ondemand governor algorithm
    for every CPU in the system do
        if UP_DELAY milliseconds since last check then
            if utilization > UP_THRESHOLD then
                increase frequency to maximum
        if DOWN_DELAY milliseconds since last check then
            if utilization < DOWN_THRESHOLD then
                decrease to lowest frequency that keeps
                the utilization at 80%

---

The PTP control algorithm may be orthogonal to most other DVFS strategies. Although PTP provides a long-term prediction of user satisfaction, another DVFS strategy can be used for short-term decisions. Some embodiments according to the present invention build PTP on top of an Adaptive DVFS strategy that is based upon the Linux on demand DVFS governor. This strategy is described above in Algorithm 3. In short, if utilization increases above UP_THRESHOLD, the frequency increases to the maximum frequency. If the utilization is below the DOWN_THRESHOLD, the algorithm finds the frequency that maintains above 80% utilization. We use 200 ms for both UP_DELAY and DOWN_DELAY, 80% for UP_THRESHOLD and 30% for the DOWN_THRESHOLD.

Some embodiments according to the present invention provide for PTP that uses the minimum value of the frequency provided by the PTP control policy and the Adaptive control policy. There are advantages to combining DVFS schemes to provide such a solution. For example, a burst of keyboard or mouse events often cause adaptive DVFS control schemes (e.g., Windows XP DVFS or the Linux on demand control policy) to unnecessarily raise the frequency to the maximum level. PTP prevents this by limiting frequency at the minimum level necessary to satisfy the user. In other words, PTP allows an adaptive DVFS scheme to make better short-term decisions when the CPU utilization is generally low. For applications that satisfy the user at high utilization, PTP may set the frequency to a lower level (e.g., if it predicts that the user is satisfied with that level), saving a significant amount of power.

Although some embodiments according to the present invention may contemplate exploring the combinations of sensor metrics for users and applications as well as search the parameter space for the PTP thresholds, this might use real users in the loop and therefore be slow. A single user study with three applications takes about an hour of experimental lab time, excluding the time to schedule the experiment. Therefore, trying multiple combinations quickly becomes very time consuming. In accordance with one or more embodiments according to the present invention, we settled on the six most accurate individual sensor metrics listed in Table 1 and close the loop for evaluation with user studies.

Picking one set of sensor metrics opens some questions. Will the sensor metrics generalize across applications? Even for a single application, how does the sensitivity depend on users? By using the same set of sensor metrics across all users and applications, it is very possible that we will occasionally annoy some users. To increase the sensitivity to our experiments, we develop two variations of PTP: an aggressive PTP (aPTP) and a conservative PTP (cPTP). aPTP operates as the PTP algorithm described above. cPTP is similar to aPTP but, for example, selects the frequency level one step higher than aPTP.

Some embodiments according to the present invention provide for a PTP system that is implemented as a user-space program that executes before each application run in the user studies. Data from the biometric devices are collected on a separate workstation and sent to the experimental laptop via a TCP socket connection. In production systems according to one or more embodiments of the present invention, biometric input devices may be managed by the operating system like traditional input devices. We have designed PTP as a proof of concept for using biometric input devices to improve architecture-level decisions. Other approaches to using biometric data different from ours could potentially lead to even stronger results. Here, we are concerned with providing evidence of the clear benefits of using biometric data in architecture-level decision making.

In a real-world implementation according to one or more embodiments of the present invention, the power consumption of the biometric devices would need to be outweighed by the power savings due to the PTP. Some, none or all of the sensors chosen for this work conform to this requirement according to some embodiments of the present invention. Piezoresistive force sensors may be measured with very little additional energy using a voltage-divider circuit and an analog-to-digital converter, which are both common, low-power circuits. GSR is also a simple resistive measurement, and may include, for example, a voltage divider and an analog-to-digital converter. An eye tracker may include, for example, an infrared camera, infrared LEDs, and the capacity for image processing. Collectively, the eye tracker sensor could operate on well below a Watt. Although some of these sensors may be expensive today, the technology for producing sensors capable of operating within desirable power constraints and at a low cost has already been developed. Additionally, the processing used to interpret the sensors could also be assigned to a core of a chip multiprocessor, reducing hardware.

aPTP and cPTP systems are evaluated below. We compare both PTP variants with the Adaptive scheme described above. We use the Need for Speed (NFS), Tetris, and Word applications and 20 users. In each run of an application, we begin with the training phase described above. The training phase varies based upon the number of majority vote tests performed by the PTP strategy. Afterwards, the user continues to use the Adaptive scheme and the aPTP scheme for 2.5 minutes each. The order of the aPTP and the Adaptive scheme is randomized between experiments. The last 10 users subsequently use the cPTP scheme for 2.5 minutes. At the end of each run, the user is asked to verbally report satisfaction based upon the scale described above.

During experiments, we capture traces of the frequency. A National Instruments 6034E data acquisition card measures the potential drop across a low-impedance resistor in series with the laptop power cable. This allows us to measure the system power consumption as frequency traces are replayed. The total system power includes the power consumed by the fully-operating laptop including the processor, a fully-lit 15.1" laptop display, network interface, and other peripherals.

The evaluation indicates at least the following: user satisfaction for aPTP and cPTP are nearly identical to the underlying adaptive scheme; and aPTP and cPTP save 18.4% and 11.4% total system power, respectively.

Figure 7:
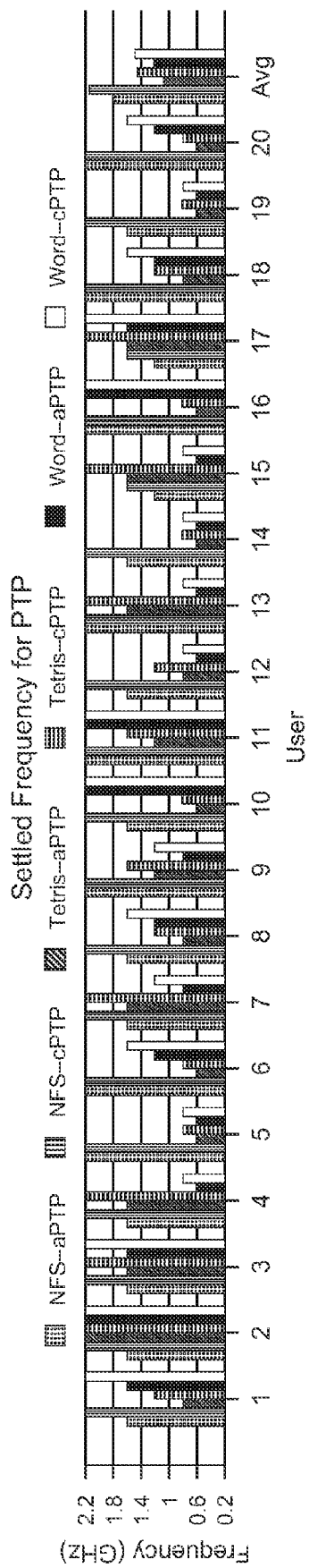
FIG. 7 shows frequency that aPTP and cPTP settle on for the Need for Speed, Tetris, and Word applications in accordance with one or more embodiments of the present invention.

FIG. 7 shows the frequencies that aPTP and cPTP settle on for NFS, Tetris, and Word according to some embodiments of the present invention. The x-axis corresponds to the users and the y-axis is the settled frequency. Each cluster shows the settled frequency for both PTP variants and all applications.

NFS is a CPU-intensive application for which observable performance is sensitive to CPU frequency. aPTP picked either 1.6 GHz or 2.2 GHz for 18 out of the 20 users. This is drastically different from Tetris, where the observable performance is less sensitive to CPU frequency. The average frequency chosen by aPTP for Tetris is 1.08 GHz. Similarly, for Word, the average frequency chosen is 1.2 GHz. This clearly demonstrates the ability of aPTP to intelligently detect the cases where CPU frequency can be lowered. Since for the Tetris and Word application, the lower frequencies and higher frequencies result in similar physiological responses, aPTP lowers the frequency. As indicated by user satisfaction levels, this achieves significantly higher efficiency without causing any dissatisfaction. A user-specific customization may be achieved based solely on the physiological readings from the users, without explicit input or knowledge of program phase.

There are some cases in Tetris and Word (14 out of 40 cases altogether), where a higher frequency of 1.6 GHz or 2.2 GHz is picked by aPTP. We checked the logs of physiological readings and found that the eye tracking data was missing in 4 of these 14 cases. This occurs when the user shifts in a manner such that pupil is not captured by the eye tracker camera. This introduces significant noise to the decision making system and results in a higher frequency being chosen. Another 3 cases correspond to self-admittedly inexperienced users. These users show erratic behavior. Thus, the sensor readings are noisy and our system conservatively sets the frequency at a high level. Although this looks like a lost opportunity for power saving, it is an interesting feature of the overall scheme: if for one reason or another, the sensor readings become noisy, our system conservatively sets the maximum allowed frequency to a high one, thereby avoiding false negatives (e.g., cases where the user is dissatisfied and our system predicts them to be otherwise). For Word, we are limited to utilizing only 4 metrics, compared to the 6 used in NFS and Tetris, because Max_MaxArrow and Mean_MaxArrow cannot be used (the user does not press the arrow keys often). Nevertheless, with Word, aPTP succeeds in picking low CPU frequencies (1.2 GHz and below) for 13 out of the 18 users with valid sensor readings. Similarly, for Tetris, aPTP picks a low frequency for 13 out of 15 users with valid sensor readings.

Figure 8A:
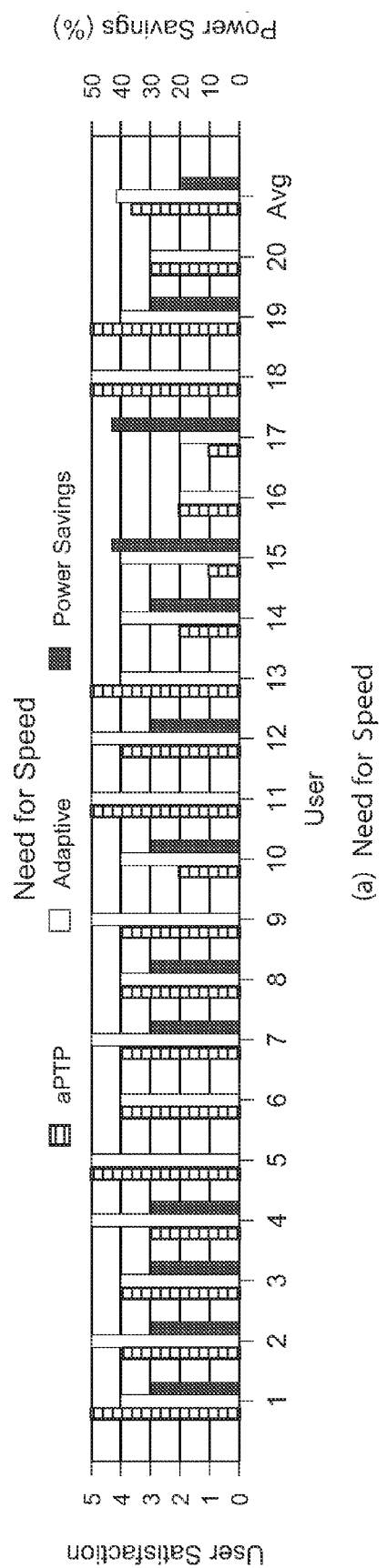
FIGS. 8(a), 8(b), and 8(c) show user satisfaction and power consumption for the Need for Speed, Tetris, and Word applications in accordance with one or more embodiments of the present invention.
Figure 8B:
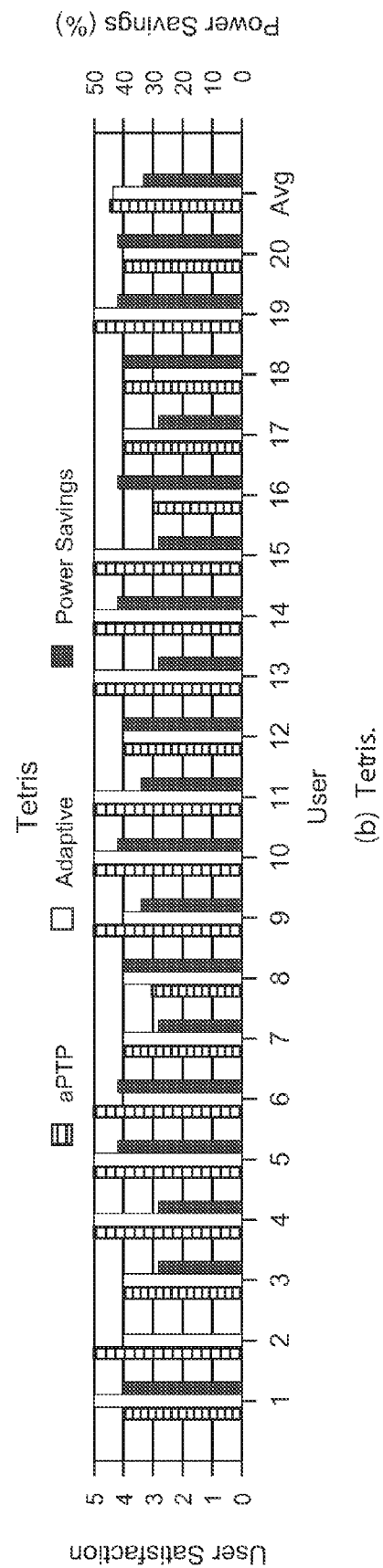
Figure 8C:
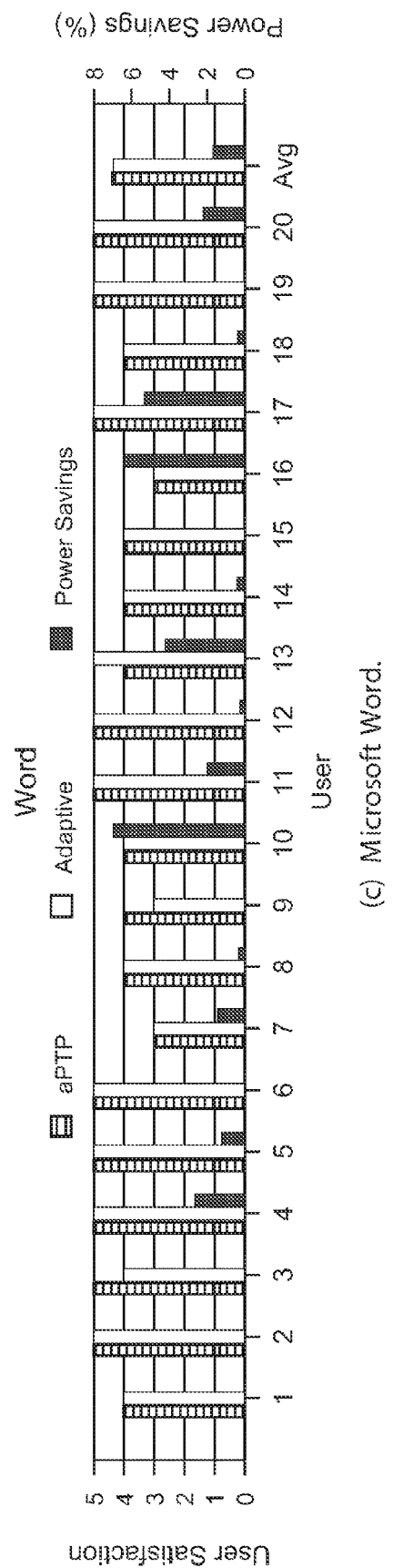

The reported user satisfaction ratings and power savings for each of the applications comparing aPTP and the Adaptive scheme are presented in FIGS. 8(a), 8(b), and 8(c). The figure shows clustered bars for each user. The left two bars in each cluster represent the user satisfaction with aPTP and with the Adaptive scheme and correspond to the leftmost vertical axis. The right bar in each cluster represents the total power savings corresponding to the vertical axis on the right. For the two CPU-intensive applications, PTP saves a considerable amount of total power. On average, for NFS, presented in FIG. 8(a), aPTP reduces power consumption by 19.2%, and for Tetris, presented in FIG. 8(b), aPTP reduces total power consumption by 33.3%. Word, presented in FIG. 8(c), is only CPU-intensive in short bursts and aPTP only saves 1.7% system power. For both Tetris and Word, aPTP also does not impact user satisfaction. However for NFS, aPTP trades off a small amount of user satisfaction for power savings. For this application, aPTP is too aggressive for some users. Averaged across three applications, aPTP saves 18.4% system power when compared to the Adaptive scheme.

Figure 9A:
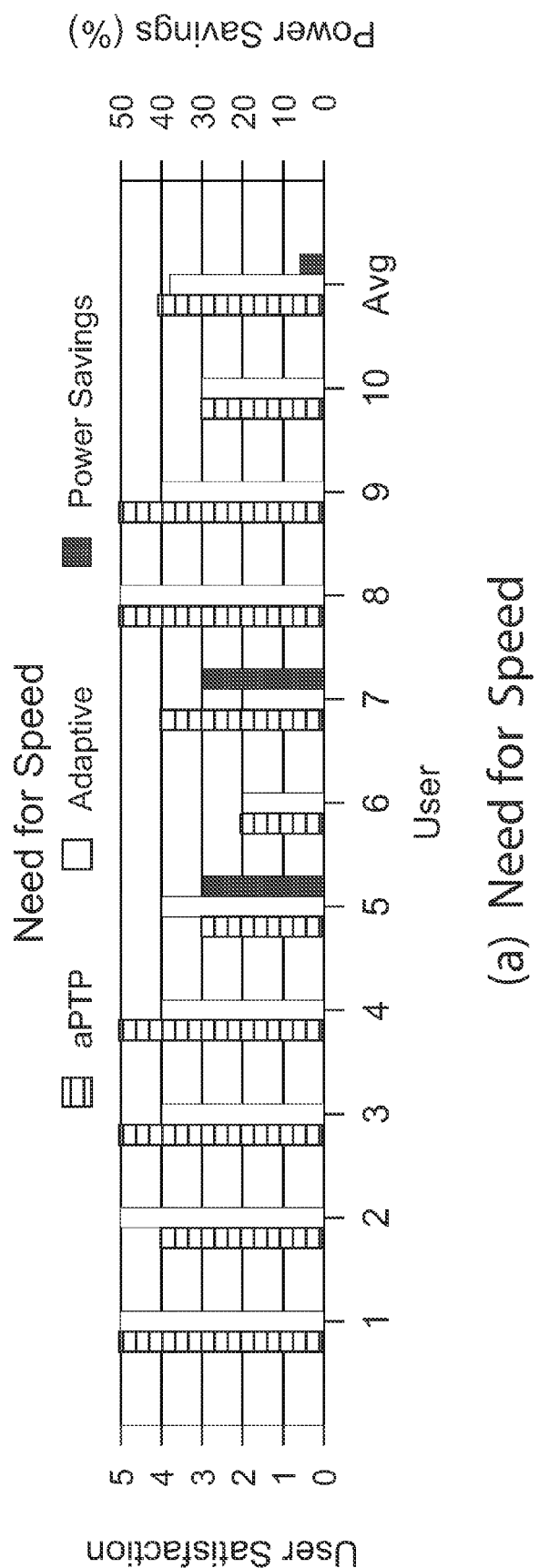
FIG. 9(a) shows user satisfaction and power consumption of cPTP for the Need for Speed and Tetris applications in accordance with one or more embodiments of the present invention.

To explore a more conservative PTP scheme, we evaluate cPTP with 10 users. FIG. 9(a) presents the results of this study. The graph is in the same format as FIG. 8. By using cPTP, we trade off improved user satisfaction with power savings. cPTP tends to maintain the highest frequency for NFS and saves 5.9% system power, while maintaining the same satisfaction level as the Adaptive scheme. cPTP trades off the decreased power savings with an improved average user satisfaction rating compared to aPTP. cPTP also maintains a high user satisfaction for Tetris, and the power savings drop from 33.3% to 25.6%. Averaged across three applications, cPTP saves 11.4% system power while maintaining the user satisfaction.

Overall, some embodiments according to the present invention contemplate that PTP can successfully sense physiological traits, predict user satisfaction, and/or drive a DVFS scheme that saves considerable power while maintaining user satisfaction.

At the architecture level, there has been work that takes user perception into account. For example, latency has been used as a performance metric and for detecting performance anomalies in operating systems. In another example, application messages were monitored to measure user-perceived latency. It has been proposed that a layered frequency scaling scheme be used which may have similarities to PTP. Other DVFS algorithms may use task information, such as measuring response times in interactive applications or rate of change in the display as a proxy for the user. These studies rely on high-level metrics as proxies for user satisfaction. However, none correlates human physiological data to user satisfaction in making architecture-level decisions as contemplated by one or more embodiments of the present invention.

Dynamic voltage and frequency scaling (DVFS) is an effective technique for microprocessor energy and power control for most modern processors. Energy efficiency is a concern for mobile computers. It has been shown that it is possible to utilize user feedback to control a power management scheme. However, some schemes require explicit user feedback that may be an inconvenience to the user. Some embodiments according to the present invention provide for an implicit mechanism for inferring user satisfaction that is orthogonal to these approaches.

The Affective Computing Group at MIT has worked to develop emotion-aware computers. They have proposed devices such as HandWave GSR with a squeezable mouse. Their most related work is concerned with creating or detecting user frustration with learning software. There is also work on relating posture to persistence in puzzle games, and using face recognition software to improve social-emotional learning for autistic children. It has also been shown that physiological measures (e.g., GSR, EMG sensors, and heart rate) can be used to predict emotion when playing games. Some embodiments according to the present invention measure physiological responses in the face of changes in computer performance and utilize real-time sensing of physiological traits in making architectural decisions.

Some embodiments according to the present invention provide for the addition of new input devices that provide information on human state in new or existing computer architectures. Some embodiments according to the present invention employ the use of one or more biometric sensors: an eye tracker to measure pupil dilation and pupil movement, a galvanic skin response sensor for sensing user arousal, and force sensors on the keyboard for sensing behavioral traits. We have described herein multiple user studies. The first user study showed that human physiological readings do change with changes in performance. The second user study shows that biometric readings are correlated with user satisfaction. Based upon the observations in these initial studies, some embodiments according to the present invention contemplate the construction of a Physiological Traits-based Power-management (PTP) system for driving dynamic voltage and frequency scaling on a processor, for example. PTP was designed to be orthogonal to most other DVFS techniques. Some embodiments according to the present invention contemplate a system in combination with an adaptive DVFS scheme based on, for example, the Linux on demand governor. An evaluation using an additional user study showed that an aggressive PTP scheme in accordance with some embodiments of the present invention reduced the total system power consumption of the laptop by up to 33.3% for an application averaged across users (e.g., 18.1% averaged across three applications), while a conservative PTP scheme in accordance with some embodiments of the present invention reduced the total system power consumption by up to 25.6% across users (e.g., 11.4% averaged across three applications). Overall, these results show that a robust system in accordance with some embodiments of the present invention can make decisions based upon observing biometrics sensors. Some embodiments according to the present invention provide for incorporating biometric information into the architecture-level decision making process.

Some embodiments of the present invention may be realized in hardware, software, or a combination of hardware and software. Some embodiments of the present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

Some embodiments of the present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While some embodiments of the present invention have been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system for controlling a computer, comprising:
a processor that runs user-centric applications;
one or more biometric input devices that are operatively coupled to the processor, the one or more biometric input devices providing information relating to physiological traits of a user of the computer, the physiological traits of the user being correlated to user satisfaction;
wherein the processor uses the information relating to the physiological traits of the user to provide a physiological traits-based power-management system, wherein the physiological traits-based power-management system is user-aware due to the information received from the one or more biometric input devices; and
wherein the physiological traits-based power-management system optimizes a power consumption of the processor via a dynamic voltage and frequency scaling scheme based on the determined correlation between the user satisfaction and changes in the physiological traits of the user to reduce the power consumption of the processor to a minimum level at which the user is still satisfied, wherein if the power consumption was reduced below the minimum level the user would become dissatisfied.

2. The system according to claim 1, wherein the one or more biometric input devices comprises an eye tracker, a galvanic skin response sensor and a force sensor.

3. The system according to claim 1, wherein the one or more biometric input devices comprises a galvanic skin response sensor that measures skin resistance or skin conductance.

4. The system according to claim 3, wherein low skin conductance indicates that the user is in a state of relaxation, and wherein high skin conductance indicates that the user is in a state of mental, emotional, or physical arousal.

5. The system according to claim 3, wherein the galvanic skin response sensor comprises a first probe attached to a first strip and a second probe attached to a second strip, the first strip and the second strip being wrapped around respective fingers of the user, and wherein the first probe and the second probe are wired in a voltage divider circuit.

6. The system according to claim 3, wherein a delta galvanic skin response is computed by taking a difference between consecutive samples from the galvanic skin response sensor and filtering out negative values.

7. The system according to claim 6, wherein the delta galvanic skin response is characterized by being a measure of short-term changes in user arousal and by filtering out long-term trends in user arousal.

8. The system according to claim 6, wherein, when summed over a period of time, the delta galvanic skin response serves as a metric for total user arousal for the time period.

9. The system according to claim 1, wherein the one or more biometric input devices comprises a force sensor that measures behavior.

10. The system according to claim 9, wherein the force sensor measures a force used to press down a key on a keyboard of the computer.

11. The system according to claim 10, wherein the force sensors are measured using a voltage divider circuit.

12. The system according to claim 1, wherein the one or more biometric input devices comprises an eye tracker that measures pupil dilation and eye movement.

13. The system according to claim 12, wherein the eye tracker uses video-based combined pupil and corneal reflection to track a focus of a user eye.

14. The system according to claim 1, wherein the physiological traits-based power-management system optimizes the dynamic voltage and frequency scaling scheme based on the determined correlation between the user satisfaction and the changes in the physiological traits of the user to reduce the power consumption of the processor to the minimum level at which the user is still satisfied.

15. A method for managing power consumption of a processor, comprising:
receiving dynamic physiological trait user information, generated by biometric input devices, the dynamic physiological trait user information being correlated to user satisfaction;
adjusting power consumption of the processor based on the received dynamic physiological trait user information;
measuring impact of computer performance on the dynamic physiological trait user information measured by biometric input devices after the power consumption of the processor is adjusted; and
in response to measuring the impact of the computer performance, reducing the power consumption of the processor via a dynamic voltage and frequency scaling scheme to a minimum level at which the user is satisfied based on the determined correlation between the user satisfaction and changes in the physiological trait user information, wherein if the power consumption was reduced below the minimum level the user would become dissatisfied.

16. The method according to claim 15, comprising:
making architecture-level decisions based on the received dynamic physiological trait user information generated by the biometric input devices.

17. The method according to claim 15, comprising:
detecting changes in the received dynamic physiological trait user information as the power consumption of the processor is adjusted.

18. The method according to claim 15, comprising: determining a pupil dilation, or a pupil movement.

19. The method according to claim 15, comprising: determining a galvanic skin response.

20. The method according to claim 15, comprising: determining an arrow key force.

* * * * *